United States Patent [19]

Koc et al.

[11] Patent Number: 5,790,686

[45] Date of Patent: Aug. 4, 1998

[54] DCT-BASED MOTION ESTIMATION METHOD

[75] Inventors: Ut-Va Koc, College Park; K. J. Ray Liu, Silver Spring, both of Md.

[73] Assignee: University of Maryland at College Park, College Park, Md.

[21] Appl. No.: 530,702

[22] Filed: Sep. 19, 1995

[51] Int. Cl.⁶ ..................................................... G06K 9/00
[52] U.S. Cl. ............................................. 382/107; 382/250
[58] Field of Search ..................................... 382/107, 236, 382/250; 348/155, 407, 415, 416

[56] References Cited

U.S. PATENT DOCUMENTS

| 5,025,482 | 6/1991 | Murakami et al. | 382/56 |
| 5,091,782 | 2/1992 | Krause et al. | 358/135 |
| 5,295,201 | 3/1994 | Yokohama | 382/48 |
| 5,339,265 | 8/1994 | Liu et al. | 364/725 |

OTHER PUBLICATIONS

Jain et al., "Displacement Measurement and Its Application in Intraframe Image Coding," IEEE Transactions on Communications, vol. COM-29, No. 12, Dec. 1981, pp. 1799–1808.

*Primary Examiner*—Andrew Johns
*Attorney, Agent, or Firm*—Hazel & Thomas

[57] ABSTRACT

A method for estimating the translational motion of an object is provided that first computes a plurality of DCT/DST coefficients for two sequential frames. These transform coefficients are then used to compute a pseudo phase function which is then fed into an inverse transform decoder. The output of the decoder is searched for peak values which are then used to determine the displacement of the object.

2 Claims, 44 Drawing Sheets

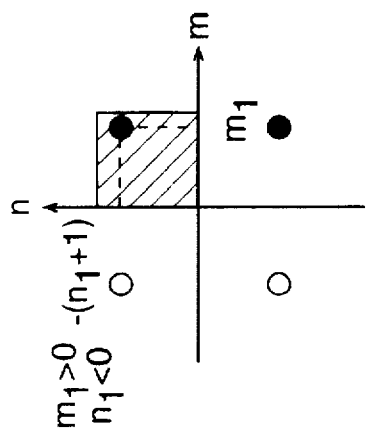
FIG. 6e
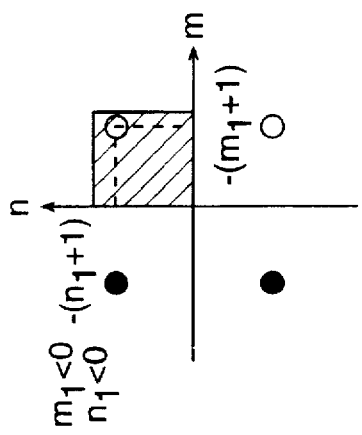
FIG. 6f
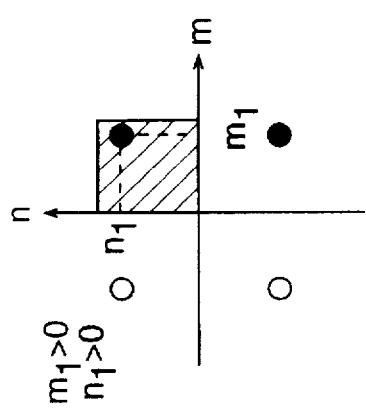
FIG. 6g
FIG. 6h

SCAR_1 AT SNR=0 dB

SCAR_2 AT SNR=0dB

DISPLACED FRAME DIFFERENCE

DCT-BASED MOTION ESTIMATION METHOD

CROSS-REFERENCE TO RELATED APPLICATIONS

This application makes reference to the following U.S. application Ser. No. 08/937,100, entitled "Optimal Unified Architectures for the Real-Time Computation of Time-Recusive Discrete Sinusoidal Transforms," filed Aug. 31, 1992, and issued as U.S. Pat. No. 5,339,265 on Aug. 16, 1994. This patent is hereby incorporated by reference.

BACKGROUND OF THE INVENTION

1. Field of the Invention

The present invention relates generally to a motion estimation system and method utilizing sinusoidal orthogonal principals to estimate displacements of moving objects in the transform domain based upon the concept of pseudo phases, and more particularly to an improved discrete cosine transform (DCT) based motion estimation system and method.

2. Description of the Prior Art

In recent years, great interests have been found in motion estimation due to its various promising applications in high-definition television (HDTV), multimedia, video telephony, target detection and tracking, computer vision, etc. Extensive research has been conducted over many years in developing new methods and designing cost-effective and massively parallel hardware architectures suitable for current VLSI technology.

The most commonly used motion estimation method in video coding is the Full Search Block Matching Method (BMA-ME) which searches for the best block among all the blocks in a search area of larger size in terms of either the mean-square error or the mean of the absolute frame difference. The computational complexity of this approach is very high, i.e., $O(N^4)$ for a N×N block. Even so, BMA-ME has been successfully implemented on VLSI chips. To reduce the number of computations, a number of suboptimal fast block matching methods have been proposed. However, these methods require three or more sequential steps to find suboptimal estimates. Recently, a correlation-based approach (CLT-ME) using Complex Lapped Transform (CLT) to avoid the block effect was proposed, but it still requires searching over a larger search area and, thus, results in a very high computational burden. Moreover, motion estimation using the CLT-ME is accurate on moving sharp edges but not on blurred edges.

In addition to block-based approaches, pel-based estimation methods such as the Pel Recursive Method (PRA-ME) and the Optical Flow Approach (OPA-ME), are very vulnerable to noise by virtue of their involving only local approaches and may suffer from the instability problem. For multiframe motion detecting, 3D-FFT has been successfully used to estimate motion in several consecutive frames based on the phenomenon that the spatial and temporal frequencies of a moving object lie on a plane of spatiotemporal space. However, this requires processing of several frames rather than two, and the Fast Fourier Transform (FFT) operates on complex numbers and is not used in most video standards.

SUMMARY OF THE INVENTION

It is therefore an object of the present invention to provide a DCT motion based estimation system which reduces the computational complexity from $O(N^4)$ to $O(N^2)$ for a N×N block.

It is a further object to provide a highly parallel pipelined architecture implementation of a DCT video coding-based system.

It is yet another object to provide improve system throughput by eliminating the need for an inverse-discrete cosine transform (IDCT).

It is yet another object to remove the discrete cosine transform from the feedback loop in order to provide a digital video system for high-end real-time applications.

According to one broad aspect of the present invention, there is provided a method for estimating the translational motion of an object, the method comrising the steps of:

computing DCT-I and DST-I coefficients of $x_1(n)$ and the DCT-II and DST-II coefficients of $x_2(n)$;

computing the pseudo phase $\hat{g}_m^S(k)$ for k=, . . . , N by solving this equation:

$$\hat{g}_{m}^{s}(k) = \begin{cases} \dfrac{Z_1^C(k) \cdot X_2^S(k) - Z_1^S(k) \cdot X_2^C(k)}{[Z_1^C(k)]^2 = [Z_1^S(k)]^2} & \text{for } k \neq N, \\ \dfrac{1}{\sqrt{2}} & \text{for } k = N. \end{cases}$$

feeding the computed pseud phase, $\{\hat{g}_m^s(k); k=1, \ldots, N\}$, into an IDST-II decoder to produce an output $\{d(n); n=0, \ldots, N-1\}$, searching for the peak value; and estimating the displacement $\hat{m}$ by substituting the peak position into:

$$\hat{m} = \begin{cases} i_p = i_{DCS}, & \text{if } d(i_p) > 0, \\ -(i_p + 1), & \text{if } d(i_p) < 0, \end{cases}$$

where $i_p = \arg\max_n |d(n)|$ is the index at which the peak value is located.

According to another broad aspect of the invention, there is provided a method for estimating the translational motion of an object, the method comrising the steps of:

providing previous frame $x_{t-1}$ and the current frame $x_t$ information into 2D-DCT-II and 2D-DCT-1 coders, respectively;

computing four coefficient, DCCTII, DCSTII, DCSTII and DSSTII, each of which is defined as a two-dimensional separable function formed by 1D-DCT/DST-II kernels:

$$X_t^{CC}(k, l) = \frac{4}{N^2} C(k)C(l) \sum_{m,n=0}^{N-1} x_t(m, n)\cos\left[\frac{k\pi}{N}(m + 0.5)\right]\cos\left[\frac{l\pi}{N}(n + 0.5)\right],$$

$k, l \in \{0, \ldots, N-1\}$, $$X_t^{CS}(k, l) = \frac{4}{N^2} C(k)C(l) \sum_{m,n=0}^{N-1} x_t(m, n)\cos\left[\frac{k\pi}{N}(m + 0.5)\right]\sin\left[\frac{l\pi}{N}(n + 0.5)\right],$$

$k \in \{0, \ldots, N-1\}, l \in \{1, \ldots, N\}$, $$X_t^{SC}(k, l) = \frac{4}{N^2} C(k)C(l) \sum_{m,n=0}^{N-1} x_t(m, n)\sin\left[\frac{k\pi}{N}(m + 0.5)\right]\cos\left[\frac{l\pi}{N}(n + 0.5)\right],$$

-continued $k \in \{1, \ldots, N\}, l \in \{0, \ldots, N-1\},$ $$X_t^{SS}(k, l) = \frac{4}{N^2} C(k)C(l) \sum_{m,n=0}^{N-1} x_t(m, n) \sin\left[\frac{k\pi}{N}(m+0.5)\right] \sin\left[\frac{l\pi}{N}(n+0.5)\right],$$

$k, l \in \{1, \ldots, N\},$ or symbolically, $X_t^{cc} = \text{DCCTII}(x_t), X_t^{cs} = \text{DCSTII}(x_t), X_t^{sc} = \text{DSCTII}(x_s), X_t^{ss} = \text{DSSTII}(x_t)$ computing four coefficients, the two-dimensional DCT coefficients of the first kind (2D-DCT-I) are calculated based on 1D–DCT/DST-I kernels:

$$Z_{t-1}^{CC}(k, l) = \frac{4}{N^2} C(k)C(l) \sum_{m,n=0}^{N-1} x_{t-1}(m, n) \cos\left[\frac{k\pi}{N}(m)\right] \cos\left[\frac{l\pi}{N}(n)\right],$$

$k, l \in \{0, \ldots, N\},$ $$Z_{t-1}^{CS}(k, l) = \frac{4}{N^2} C(k)C(l) \sum_{m,n=0}^{N-1} x_{t-1}(m, n) \cos\left[\frac{k\pi}{N}(m)\right] \sin\left[\frac{l\pi}{N}(n)\right],$$

$k \in \{0, \ldots, N\}, l \in \{1, \ldots, N-1\},$ $$Z_{t-1}^{SC}(k, l) = \frac{4}{N^2} C(k)C(l) \sum_{m,n=0}^{N-1} x_{t-1}(m, n) \sin\left[\frac{k\pi}{N}(m)\right] \cos\left[\frac{l\pi}{N}(n)\right],$$

$k \in \{1, \ldots, N-1\}, l \in \{0, \ldots, N\},$

-continued $$Z_{t-1}^{SS}(k, l) = \frac{4}{N^2} C(k)C(l) \sum_{m,n=0}^{N-1} x_{t-1}(m, n) \sin\left[\frac{k\pi}{N}(m)\right] \sin\left[\frac{l\pi}{N}(n)\right],$$

$k, l \in \{1, \ldots, N-1\},$ or symbolically,
$Z_{t-1}^{cc} = \text{DCCTI}(x_{t-1}), Z_{t-1}^{cs} = \text{DCSTI}(x_{t-1}), Z_{t-1}^{sc} = \text{DSCTI}(x_{t-1}), Z_{t-1}^{ss} = \text{DSSTI}(X_{t-1})$ determining the respective pseudo phase functions from the following equations:

$$f_{m_1 n_1}(k, l) = \begin{cases} \hat{g}_{m_1 n_1}^{CS}(k, l), & \text{for } k, l \in \{1, \ldots, N-1\}, \\ \frac{1}{\sqrt{2}} \frac{Z_{t-1}^{CC}(k, l) X_t^{CS}(k, l) - Z_{t-1}^{CS}(k, l) X_t^{CC}(k, l)}{(Z_{t-1}^{CC}(k, l))^2 + (Z_{t-1}^{CS}(k, l))^2}, & \text{for } k=0, l \in \{1, \ldots, N-1\}, \\ \frac{1}{\sqrt{2}} \frac{Z_{t-1}^{CC}(k, l) X_t^{CS}(k, l) + Z_{t-1}^{SC}(k, l) X_t^{SC}(k, l)}{(Z_{t-1}^{CC}(k, l))^2 + (Z_{t-1}^{SC}(k, l))^2}, & \text{for } l=N, k \in \{1, \ldots, N-1\}, \\ \frac{1}{2} \frac{X_t^{CS}(k, l)}{Z_{t-1}^{CC}(k,)}, & \text{for } k=0, l=N, \text{ and } Z_{t-1}^{CC}(k, l) \neq 0, \\ \frac{1}{2}, & \text{for } k=0, l=N, \text{ and } Z_{t-1}^{CC}(k, l) = 0 \end{cases} \quad (33)$$

$$g_{m_1 n_1}(k, l) = \begin{cases} \hat{g}_{m_1 n_1}^{SC}(k, l), & \text{for } k, l \in \{1, \ldots, N-1\}, \\ \frac{1}{\sqrt{2}} \frac{Z_{t-1}^{CC}(k, l) X_t^{CS}(k, l) - Z_{t-1}^{SS}(k, l) X_t^{CC}(k, l)}{(Z_{t-1}^{CC}(k, l))^2 + (Z_{t-1}^{CS}(k, l))^2}, & \text{for } l=0, k \in \{1, \ldots, N-1\}, \\ \frac{1}{\sqrt{2}} \frac{Z_{t-1}^{CC}(k, l) X_t^{SC}(k, l) + Z_{t-1}^{CS}(k, l) X_t^{SS}(k, l)}{(Z_{t-1}^{CC}(k, l))^2 + (Z_{t-1}^{SC}(k, l))^2}, & \text{for } k=N, l \in \{1, \ldots, N-1\}, \\ \frac{1}{2} \frac{X_t^{SC}(k, l)}{Z_{t-1}^{CC}(k,)}, & \text{for } k=N, l=0, \text{ and } Z_{t-1}^{CC}(k, l) \neq 0, \\ \frac{1}{2}, & \text{for } k=N, l=0, \text{ and } Z_{t-1}^{CC}(k, l) = 0 \end{cases} \quad (34)$$

passing these two pseudo phase functions through 2D-IDCT-II coders (IDCSTII and IDSCTII) to generate two functions, DCS(•,•) and DSC(•,•):

$$\begin{aligned} DCS(m, n) &= \text{IDCSTII}(f_{m_1 n_1}) \\ &= \frac{4}{N^2} \sum_{k=0}^{N-1} \sum_{l=1}^{N} C(k)C(l) f_{m_1 n_1}(k, l) \cos\frac{k\pi}{N}\left(m + \frac{1}{2}\right) \sin\frac{l\pi}{N}\left(n + \frac{1}{2}\right) \\ &= [\delta(m - m_1) + \delta(m + m_1 + 1)] \cdot \\ &\quad [\delta(n - n_1) - \delta(n + n_1 + 1)], \end{aligned}$$

$$\begin{aligned} DSC(m, n) &= \text{IDSCTII}(g_{m_1 n_1}) \\ &= \frac{4}{N^2} \sum_{k=1}^{N} \sum_{l=0}^{N-1} C(k)C(l) g_{m_1 n_1}(k, l) \sin\frac{k\pi}{N}\left(m + \frac{1}{2}\right) \cos\frac{l\pi}{N}\left(n + \frac{1}{2}\right) \\ &= [\delta(m - m_1) - \delta(m + m_1 + 1)] \cdot \\ &\quad [\delta(n - n_1) + \delta(n + n_1 + 1)]. \end{aligned}$$

searching for the peak values; and estimating the displacement by substituting the peak positions into:

$$\hat{m}_1 = \begin{cases} i_{DSC} = i_{DCS}, & \text{if } DSC(i_{DSC}, j_{DSC}) > 0, \\ -(i_{DSC} + 1) = -(i_{DCS} + 1), & \text{if } DSC(i_{DSC}, j_{DSC}) < 0, \end{cases} \quad (39)$$

$$\hat{n}_1 = \begin{cases} j_{DCS} = j_{DSC}, & \text{if } DCS(i_{DCS}, j_{DCS}) > 0, \\ -(j_{DCS} + 1) = -(j_{DSC} + 1), & \text{if } DCS(i_{DCS}, j_{DCS}) < 0, \end{cases}$$

where $$(i_{DCS}, j_{DCS}) = \arg\max_{m, n \in \Phi} |DCS(m, n)|,$$

$$(i_{DSC}, j_{DSC}) = \arg\max_{m, n \in \Phi} |DSC(m, n)|,$$

Other objects and features of the present invention will be apparent from the following detailed description of the preferred embodiment.

BRIEF DESCRIPTION OF THE DRAWINGS

The invention will be further described in conjunction with the accompanying drawings, in which:

FIGS. 3a to 3f illustrate a right shift motion of a random signal, with noise;

FIGS. 3g to 3l illustrate a left shift motion of a random signal with noise;

FIGS. 6e to 6h are graphs of DSC functions representing the associated pseudo phase functions;

The invention will now be described in conjunction with the accompanying drawings wherein like numerals represent like parts.

DETAILED DESCRIPTION OF THE PREFERRED EMBODIMENT

Figure 1A:
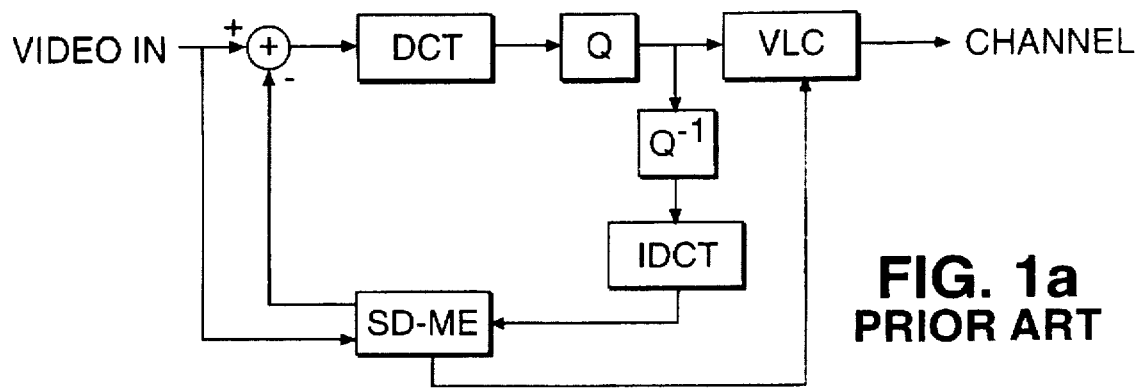
FIG. 1a is a prior art MPEG-compliant coder.

In most international video coding standards such as CCITT H.261, MPEG, as well as the proposed HDTV standard, Discrete Cosine Transform (DCT) and block-based motion estimation are the essential elements to achieve spatial and temporal compression, respectively. Most implementations of a standard-compliant coder adopt the structure as shown in FIG. 1a. The DCT is located inside the loop of temporal prediction, which also includes an Inverse DCT (IDCT) and a spatial-domain motion estimator (SD-ME) which is usually the BMA-ME. The IDCT is needed solely for transforming the DCT coefficients back to the spatial domain in which the SD-ME estimates motion vectors and performs motion compensated prediction. This is an undesirable coder architecture for the following reasons. In addition to the additional complexity added to the overall architecture, the DCT and IDCT must be put inside the feedback loop which has long been recognized as the major bottleneck of the entire digital video system for high-end real-time applications. The throughput of the coder is limited by the processing speed of the feedback loop, which is roughly the total time for the data stream to go through each component in the loop. Therefore the DCT (or IDCT) must be designed to operate at least twice as fast as the incoming data stream. A compromise is to remove the loop and perform open-loop motion estimation based upon original images instead of reconstructed images in sacrifice of the performance of the coder.

Figure 1B:
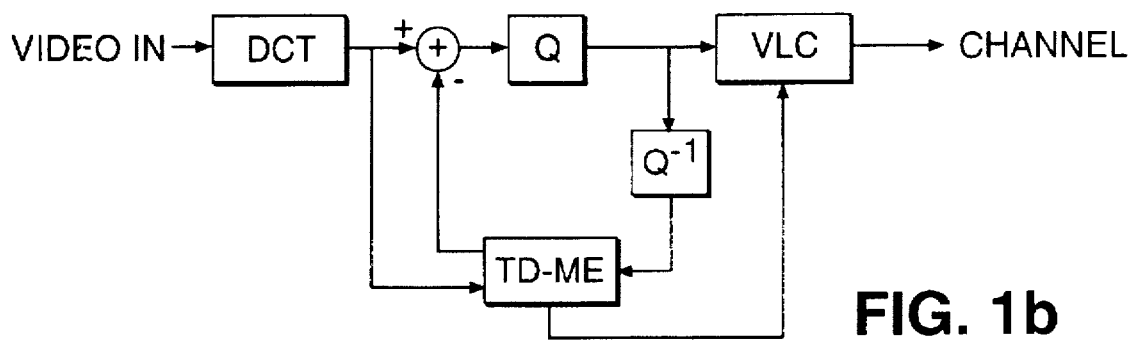
FIG. 1b is a motion-compensated DCT hybrid coder with motion estimation constructed in accordance with a preferred embodiment of the invention.

An alternative solution without degradation of the performance is to develop a motion estimation method which may work in the DCT transform domain. In this way, the DCT may be moved out of the loop as depicted in FIG. 1b and thus the operating speed of this DCT may be reduced to the data rate of the incoming stream. Moreover, the IDCT is removed from the feedback loop which now has only two simple components Q and $Q^{-1}$ (the quantizers) in addition to the transform-domain motion estimator (TD-ME). This not only reduces the complexity of the coder but also resolves the bottleneck problem without any trade-off of the performance. Furthermore, different components may be jointly optimized if they operate in the same transform domain.

A novel method for motion estimation, called the DCT-Based Motion Estimation (DXT-ME) to estimate motion in the discrete cosine transform or discrete sine transform (DCT/DST or DXT, for short) domain is disclosed herein. DXT-ME is based on the principle of orthogonality of sinusoidal functions. This new method has certain merits over conventional methods. It has very low computational complexity (on the order of N2 compared to N4 for BMA-ME) and is robust even in a noisy environment. This method takes DCT coefficients of images as input to estimate motions and therefore may be incorporated efficiently with the DCT-based coders used for most current video compression standards. As explained before, this combination of both the DCT and motion estimation into a single component reduces the coder complexity and, at the same time, increases the system throughput. Finally, due to the fact that the computation of pseudo phases is inherently highly local operation, a highly parallel pipelined architecture for this method is possible.

As is well known, Fourier transform (FT) of a signal, x(t) is related to T of its shifted (or delayed if t represents time) version, x(t−4) by this equation:

$$F\{x(t-r)\}=e^{j\omega r}F\{x(t)\},$$

where F{•} denotes Fourier transform. The phase of Fourier transform of the shifted signal contains the information about the amount of the shift r, which may easily be extracted. However, Discrete Cosine Transform (DCT) or its counterpart, Discrete Sine Transform, (DST) do not have any phase components as usually found in discrete Fourier transform (DFT), but DCT (or DST) coefficients of a shifted signal also carry this shift information. To facilitate explanation of the idea behind DXT-ME, one must first consider the case of one-dimensional discrete signals. Suppose that the signal $\{x_1(n); n \in \{0, \ldots, N-1\}\}$ is right shifted by an amount m (in our convention, a right shift mean that m>0) to generate another signal $\{x_2(n); n \in \{0, \ldots, N-1\}\}$. The values of $x_1(n)$ are all zeros outside the support region $S(x_1)$. Therefore, $$x_2(n) = \begin{cases} x_1(n-m), & \text{for } n - m \in S(x_1), \\ 0, & \text{elsewhere,} \end{cases} \quad (2)$$

implies that both signals have resemblance to each other except that the signal is shifted. It may be shown that, for k=1, ..., N−1, $$X_2^C(k) = Z_1^C(k)\cos\left[\frac{k\pi}{N}\left(m+\frac{1}{2}\right)\right] - Z_1^S(k)\sin\left[\frac{k\pi}{N}\left(m+\frac{1}{2}\right)\right], \quad (3)$$

$$X_2^S(k) = Z_1^S(k)\cos\left[\frac{k\pi}{N}\left(m+\frac{1}{2}\right)\right] + Z_1^C(k)\sin\left[\frac{k\pi}{N}\left(m+\frac{1}{2}\right)\right], \quad (4)$$

Here $X_2^S$ and $X_2^C$ are DST (DST-II) and DCT (DCT-II) of the second kind of $x_2(n)$, respectively, whereas $Z_1^S$ and $Z_1^C$ are DST (DST-I) and DCT (DCT-I) of the first kind of $x_1(n)$, respectively as defined as follows:

$$X_2^C(k) = \frac{2}{N} C(k) \sum_{n=0}^{N-1} x_2(n)\cos\left[\frac{k\pi}{N}(n+0.5)\right]; k \in \{0, \ldots, N-1\}, \quad (5)$$

$$X_2^S(k) = \frac{2}{N} C(k) \sum_{n=0}^{N-1} x_2(n)\sin\left[\frac{k\pi}{N}(n+0.5)\right]; k \in \{1, \ldots, N\}, \quad (6)$$

$$Z_1^C(k) = \frac{2}{N} C(k) \sum_{n=0}^{N-1} x_1(n)\cos\left[\frac{k\pi}{N}(n)\right]; k \in \{0, \ldots, N\}, \quad (7)$$

$$Z_1^S(k) = \frac{2}{N} C(k) \sum_{n=0}^{N-1} x_1(n)\sin\left[\frac{k\pi}{N}(n)\right]; k \in \{1, \ldots, N-1\}, \quad (8)$$

where $$C(k) = \begin{cases} \frac{1}{\sqrt{2}}, & \text{for } k = 0 \text{ or } N, \\ 1, & \text{otherwise,} \end{cases}$$

The displacement, m is embedded solely in the terms $$g_m^s(k) = \sin\left[\frac{k\pi}{N}\left(m+\frac{1}{2}\right)\right] \text{ and}$$

$$g_m^c(k) = \cos\left[\frac{k\pi}{N}\left(m+\frac{1}{2}\right)\right],$$

which are called pseudo phases analogous to phases in Fourier transform of shifted signals. To find out m, we first solve equations (3) and (4) for the pseudo phases and then use the sinusoidal orthogonal principles as follows:

$$\frac{2}{N} \sum_{k=1}^{N} C^2(k)\sin\left[\frac{k\pi}{N}\left(m+\frac{1}{2}\right)\right]\sin\left[\frac{k\pi}{N}\left(n+\frac{1}{2}\right)\right] = \quad (9)$$

$$\delta(m-n) - \delta(m+n+1),$$

$$\frac{2}{N} \sum_{k=0}^{N-1} C^2(k)\cos\left[\frac{k\pi}{N}\left(m+\frac{1}{2}\right)\right]\cos\left[\frac{k\pi}{N}\left(n+\frac{1}{2}\right)\right] = \quad (10)$$

$$\delta(m-n) - \delta(m+n+1),$$

Here δ(n) is the discrete impulse function.

Indeed, if we replace $$\sin\left[\frac{k\pi}{N}\left(m+\frac{1}{2}\right)\right] \text{ and } \cos\left[\frac{k\pi}{N}\left(m+\frac{1}{2}\right)\right]$$

by the computed sine and cosine pseudo phase components, $\hat{g}_m^s(k)$ and $\hat{g}_m^c(k)$ in (9) and (10), both equations simply become IDST-II and IDCT operations on $\hat{g}_m^s(k)$ and $\hat{g}_m^c(k)$:

$$IDSTII(\hat{g}_m^s) = \frac{2}{N} \sum_{k=1}^{N} C^2(k)\hat{g}_m^s(k)\sin\left[\frac{k\pi}{N}\left(n+\frac{1}{2}\right)\right], \quad (11)$$

$$IDSTII(\hat{g}_m^c) = \frac{2}{N} \sum_{k=0}^{N} C^2(k)\hat{g}_m^c(k)\cos\left[\frac{k\pi}{N}\left(n+\frac{1}{2}\right)\right], \quad (12)$$

the notation $\hat{g}$ is used to distinguish the computed pseudo phase from the one in a noiseless situation (i.e., $$\sin\left[\frac{k\pi}{N}\left(m+\frac{1}{2}\right)\right] \text{ or } \cos\left[\frac{k\pi}{N}\left(m+\frac{1}{2}\right)\right].$$

Figure 2A:
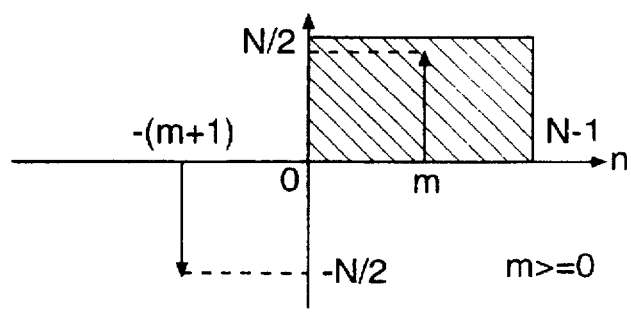
FIGS. 2a and 2b illustrate a right and left shift motion of an object, without noise, respectively.
Figure 2B:
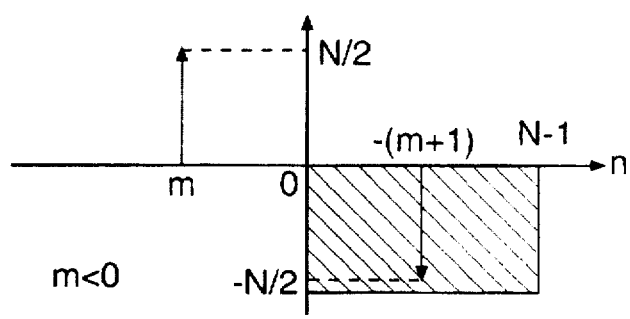

A closer look at the right-hand side of equation (9) tells us that δ(m−n) and δ(m+n+1) have opposite signs. This property will help us detect the directions of a motion. If we perform an IDST-II operation on the pseudo phases found, then the observable window of the index space in the inverse DST domain will be limited to {0, ..., N−1}. As illustrated in FIG. 2a, for a right-shift motion, one spike (generated by the positive δ function) is pointing upwards at the location n=m in the gray region (i.e., the observable index space), while the other δ point downwards at the n=−(m+1) outside the gray region. In contrary, for a left-shift motion, FIG. 2b, the negative spike at n=−(m+1)>0 falls in the gray region, but the positive δ function at n=m stays out of the observable index space. It may easily be seen that a positive peak value in the gray region implies a right shift and a negative one means a left shift. This enables one to determine from the sign of the peak value the direction of the movement of a signal.

Figure 3:
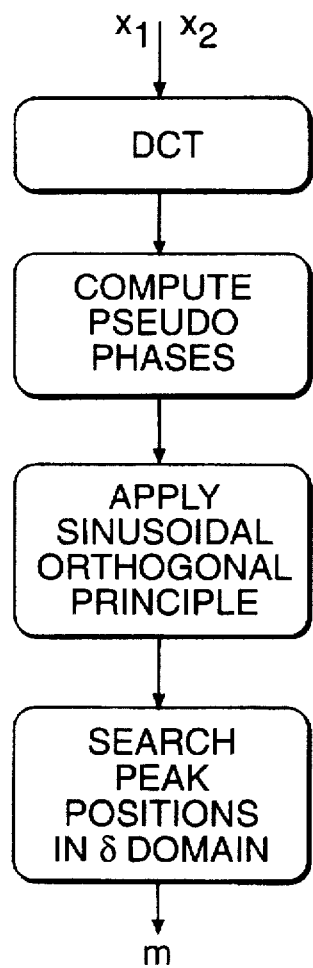

The concept of pseudo phases plus the application of the sinusoidal orthogonal principles leads to a new approach to estimate the translational motion as depicted in FIG. 3:

1. Compute the DCT-I and DST-I coefficients of $x_1(n)$ and the DCT-II and DST-II coefficients of $x_2(n)$.
2. Compute the pseudo phase $\hat{g}_m^s(k)$ for k=, ..., N by solving this equation:

$$\hat{g}_m^s(k) = \begin{cases} \dfrac{Z_1^C(k) \cdot X_2^S(k) - Z_1^S(k) \cdot X_2^C(k)}{[Z_1^C(k)]^2 = [Z_1^S(k)]^2} & \text{for } k \neq N, \\ \dfrac{1}{\sqrt{2}} & \text{for } k = N. \end{cases} \quad (13)$$

3. Feed the computed pseud phase, $\{\hat{g}_m^s(k); k=1, ..., N\}$, into an IDST-II decoder to produce an output $\{d(n); n=0, ..., N−1\}$, and search for the peak value. The estimated displacement $\hat{m}$ may be found by:

$$\hat{m} = \begin{cases} i_p = i_{DCS}, & \text{if } d(i_p) > 0, \\ -(i_p + 1), & \text{if } d(i_p) < 0, \end{cases} \quad (14)$$

where $i_p$=arg max$_n$ |d(n)| is the index at which the peak value is located.

In Step 1, the DCT and DST may be generated simultaneously with only 3N multipliers and the computation of DCT may be easily obtained from DCT-II with minimal overhead as will be shown later. In Step 2, if noise is absent and there is only purely translational motion, $\hat{g}_m(k)$ will be equal to $$\sin\frac{k\pi}{N}(m+0.5).$$

The output d(n) will then be an impulse function in the observation window. This procedure is illustrated by two examples in FIGS. 3a to 3f and 3g to 3l with a randomly generated signal input at SNR=20 dB. From these two examples, it is obvious that the motion estimation is accurate even though strong noise is present.

Two-Dimensional System

Figure 4:
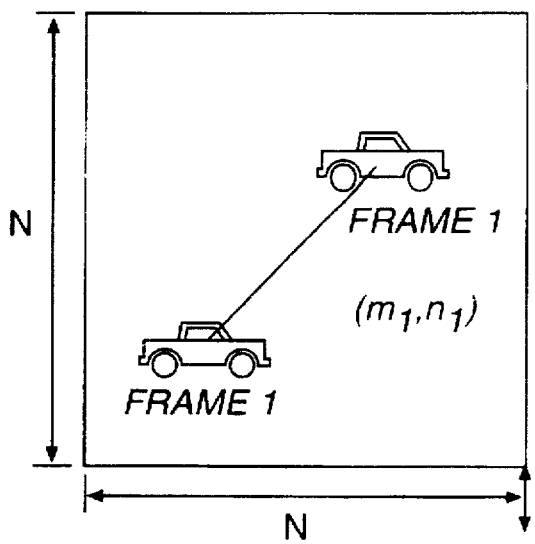
FIG. 4 is an illustration of an object which moves translationally by $m_1$ in X direction and $n_1$ in Y direction as viewed on a camera plane and within the scope of a camera in a noiseless environment.
Figure 3A:
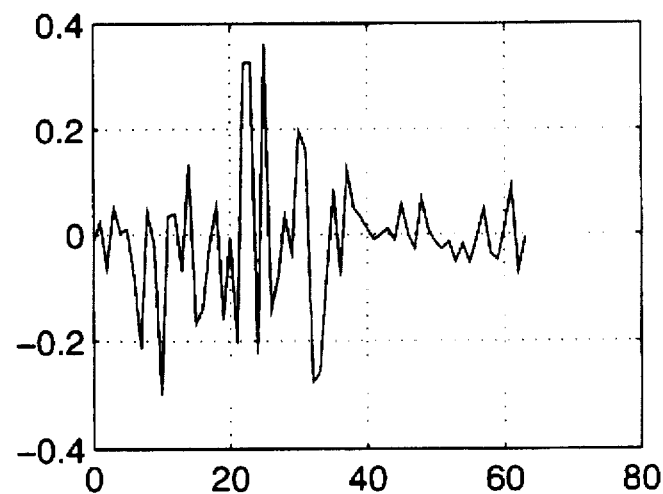
FIG. 3a is a logic flow diagram of the method associated with a 1-dimensional DCT motion estimation system constructed in accordance with a preferred embodiment of the invention.
Figure 3B:
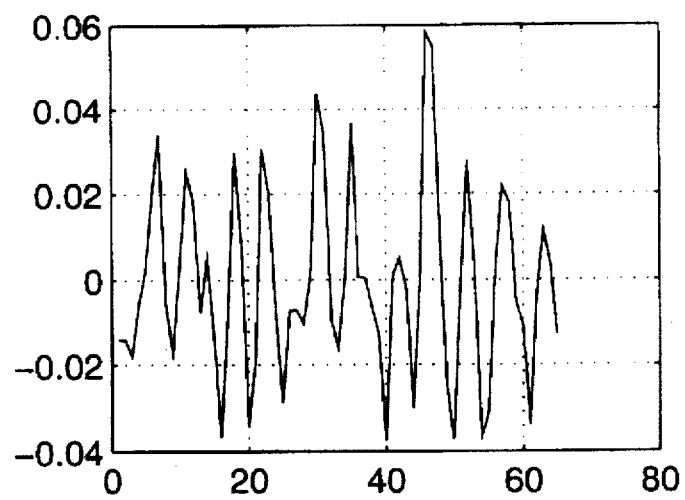
Figure 3C:
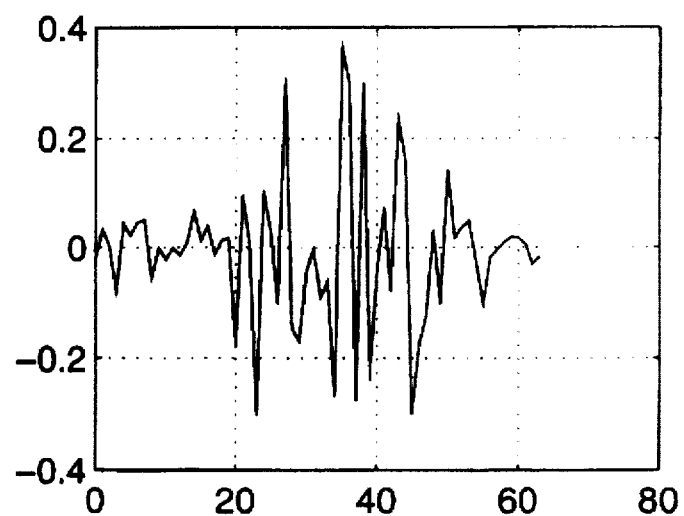
Figure 3D:
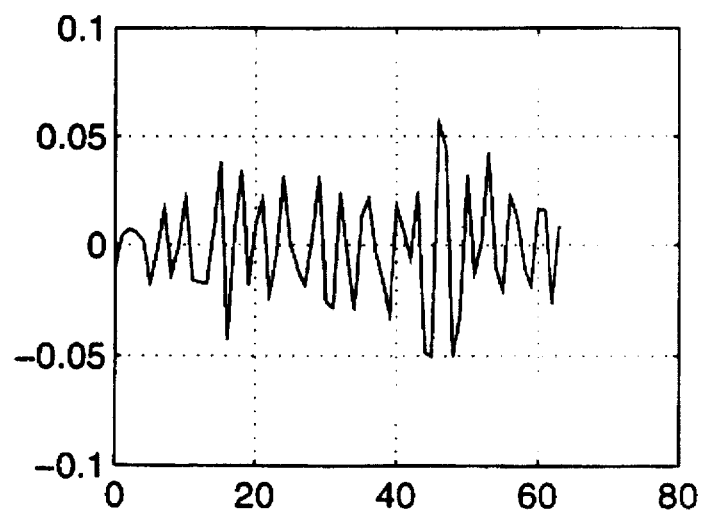
Figure 3E:
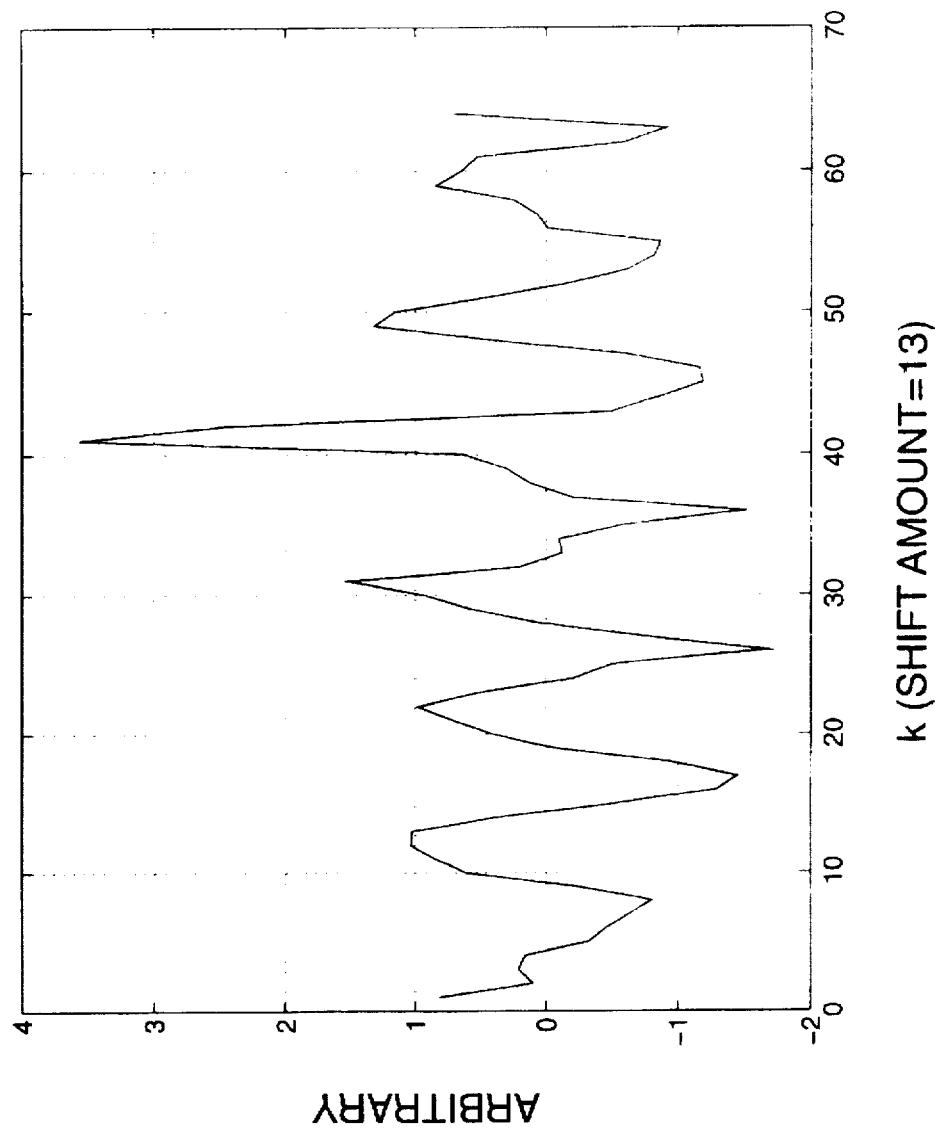
Figure 3F:
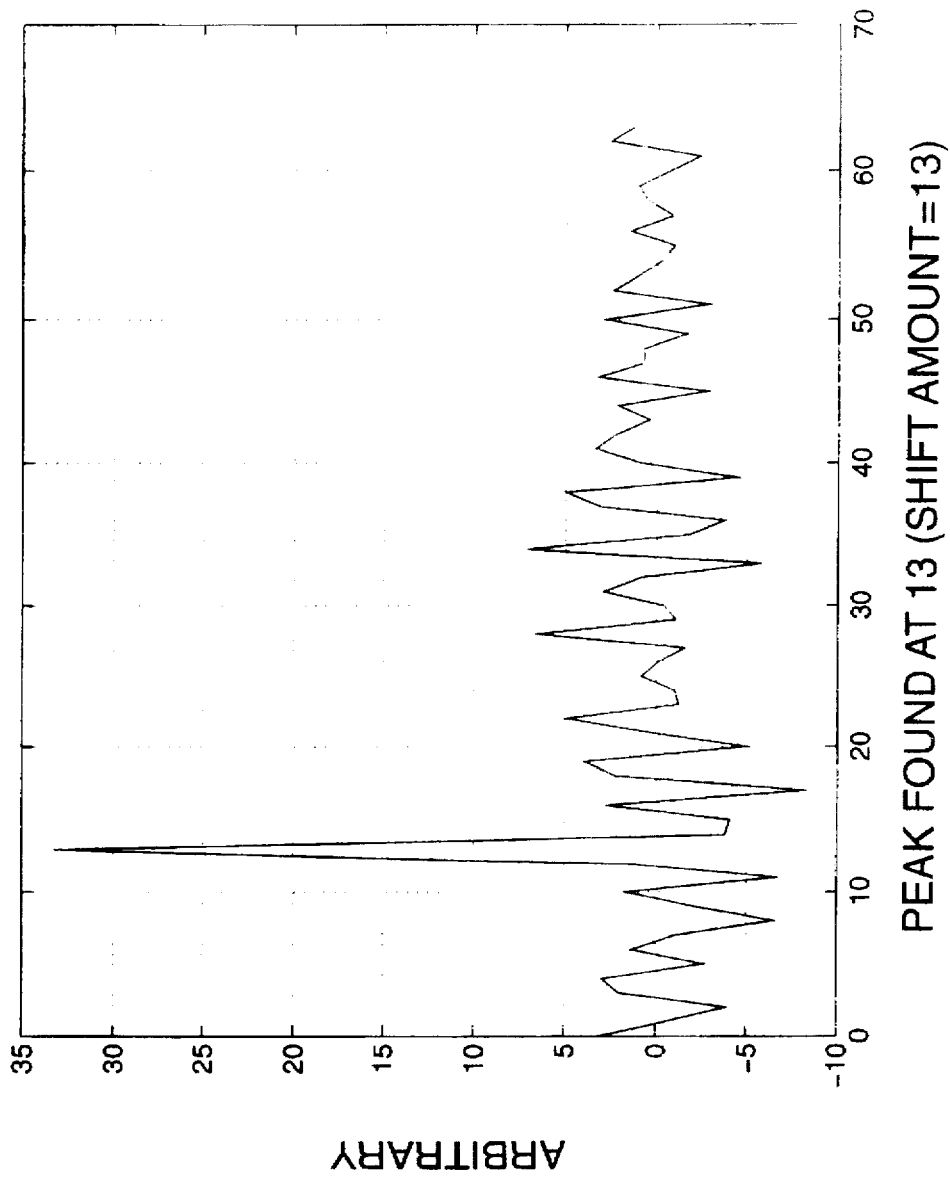
Figure 3G:
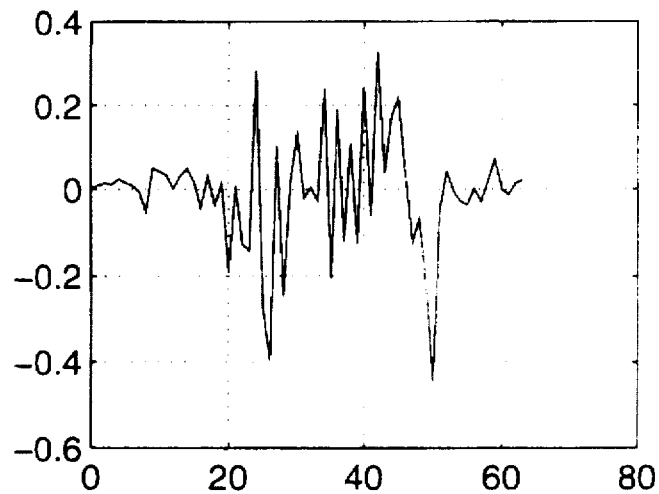
Figure 3H:
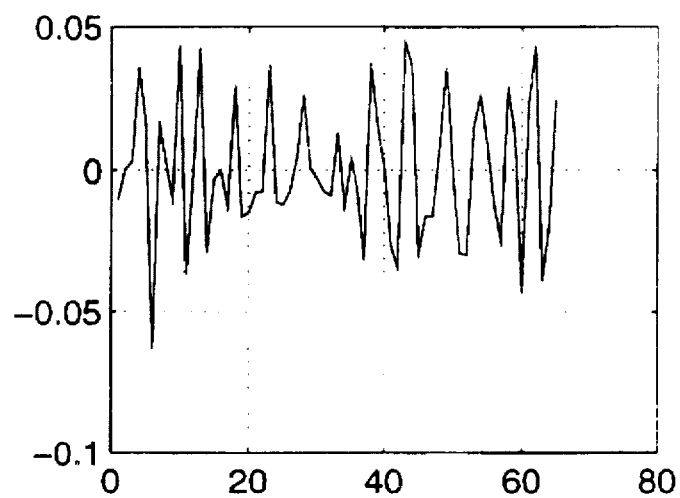
Figure 3I:
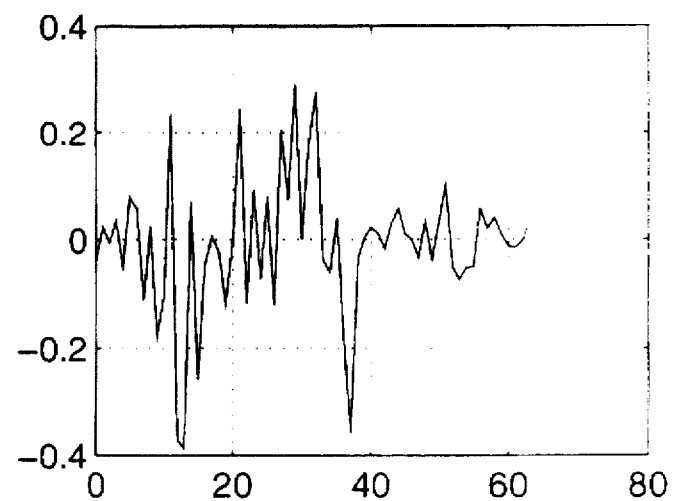
Figure 3J:
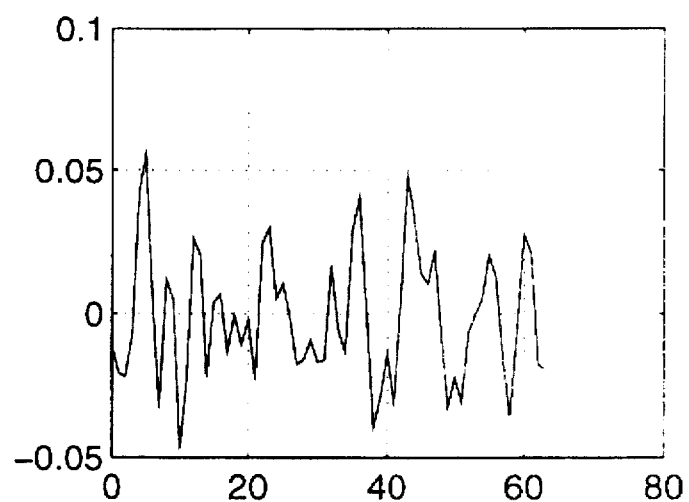
Figure 3K:
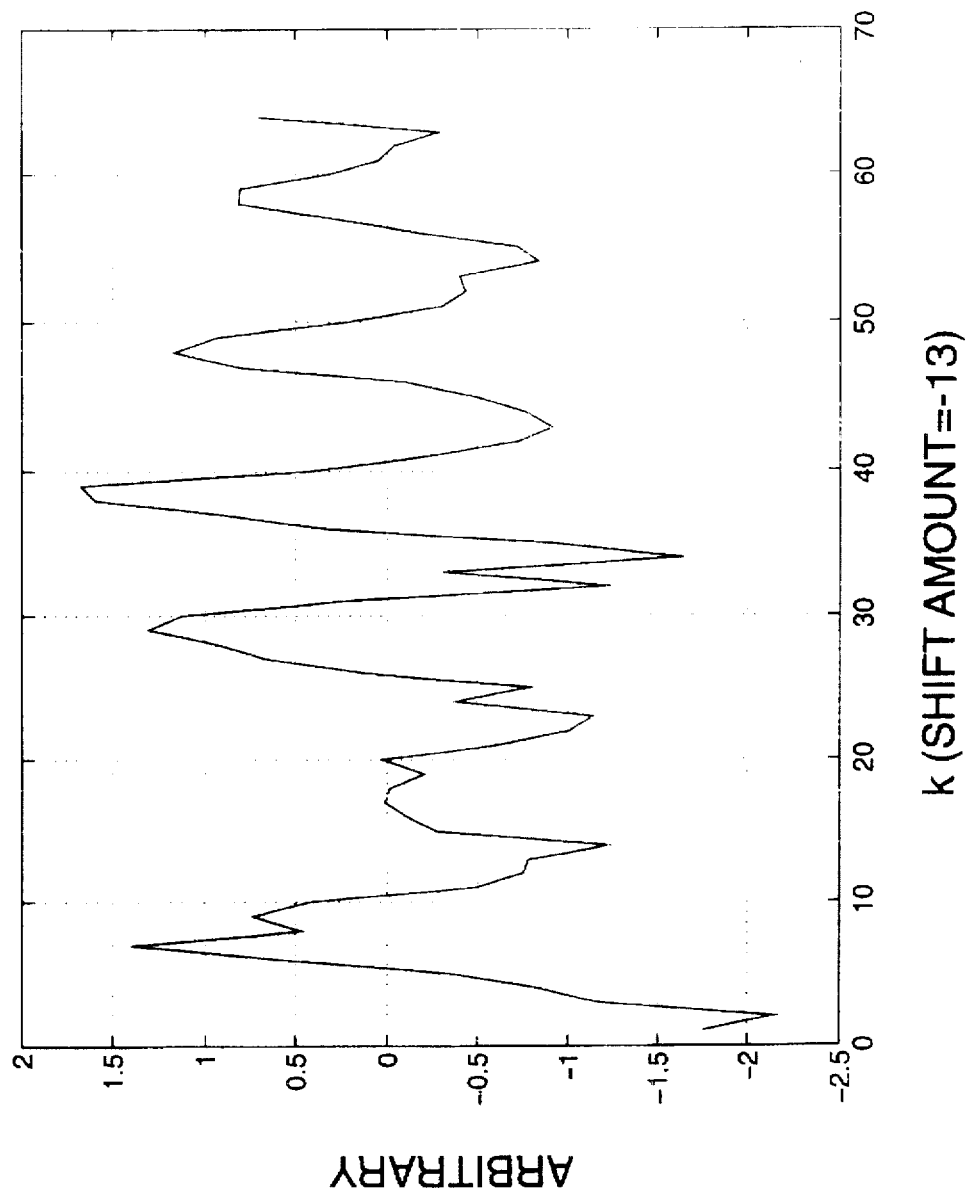
Figure 31:
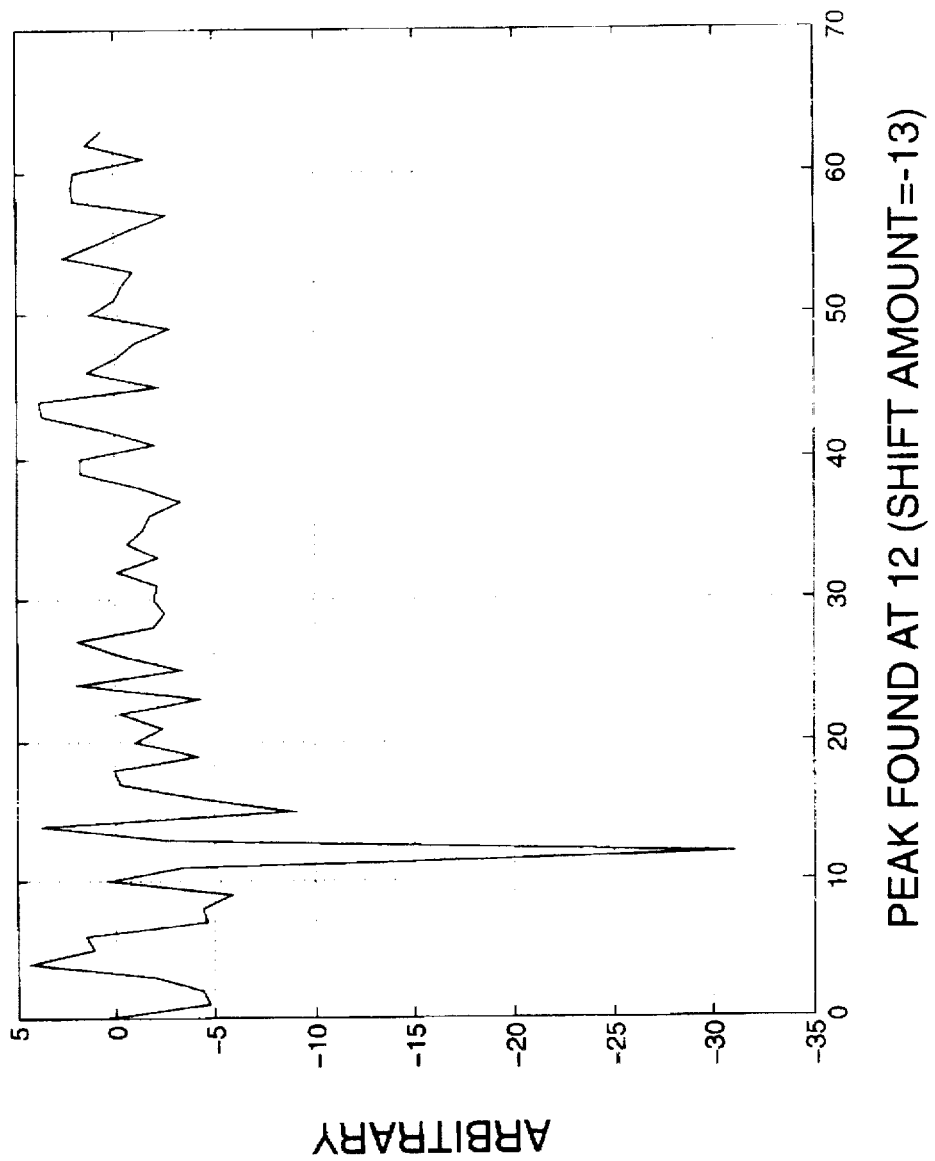

The concept of how to extract shift values from the pseudo phases of one-dimensional signals, as explained above, may be extended to provide the basis of a new DCT-based motion estimation scheme for two-dimensional images, which is called DXT-ME Motion Estimation Scheme. Before going into details of this new method, let us confine the problem of motion estimation to the scenario in which an object moves translationally by $m_1$ in X direction and $n_1$ in Y direction as viewed on a camera plane and within the scope of a camera in a noiseless environment as shown in FIG. 4. Then one may extract the motion vector out of the two consecutive frames of the images of that moving object by making use of the sinusoidal orthogonal principles (9) and (10).

Figure 5B:
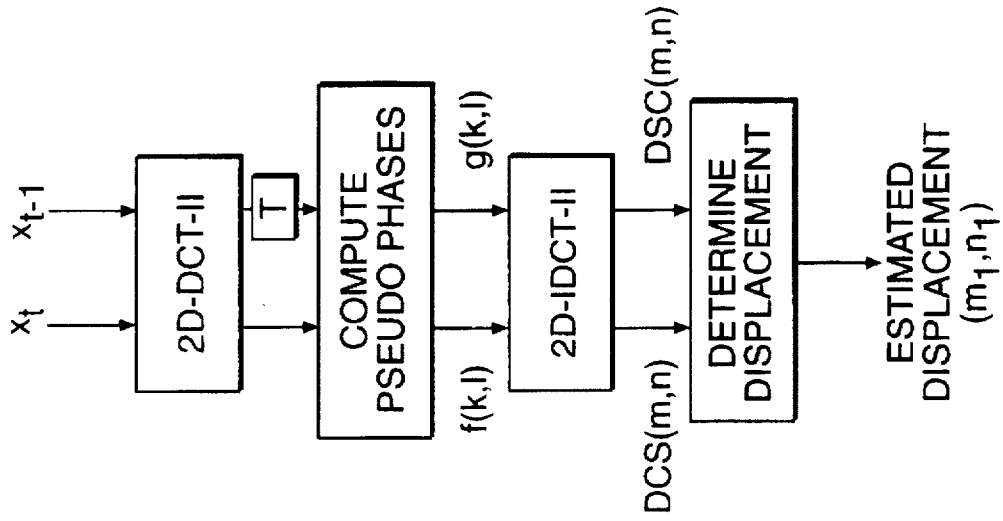
FIG. 5b is a two-dimensional motion-compensated DCT hybrid coder with motion estimation constructed in accordance with a preferred embodiment of the invention.
Figure 5A:
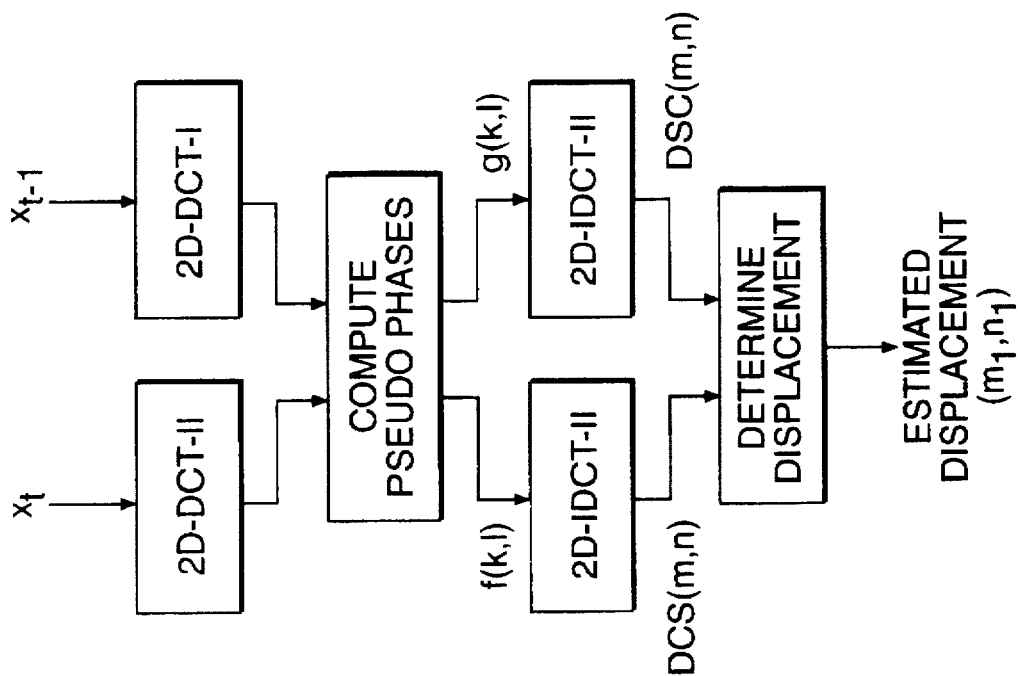
FIG. 5a is a logic flow diagram of the method associated with a 2 dimensional DCT motion estimation system constructed in accordance with a preferred embodiment of the invention.
Figure 6A:
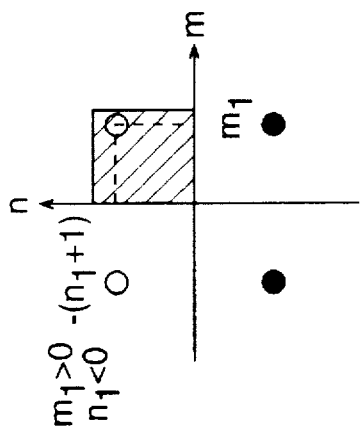
FIGS. 6a to 6d are graphs of DCS functions which represent the associated pseudo phase functions.
Figure 6B:
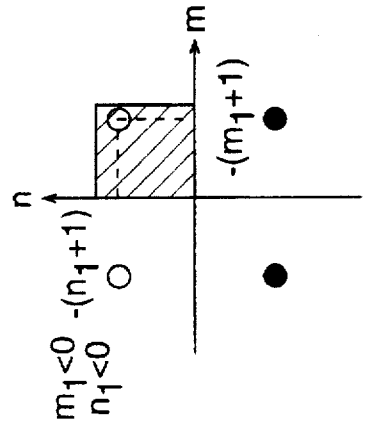
Figure 6C:
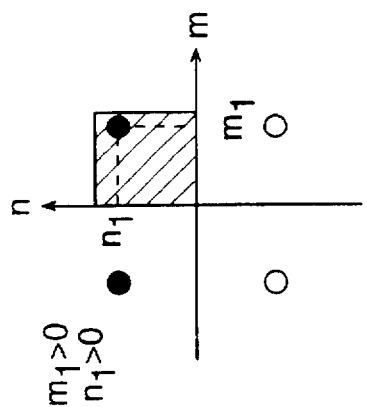
Figure 6D:
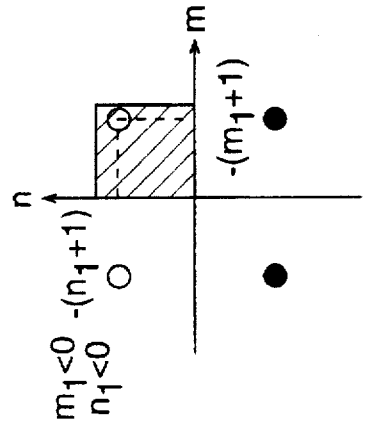
Figure 7A:
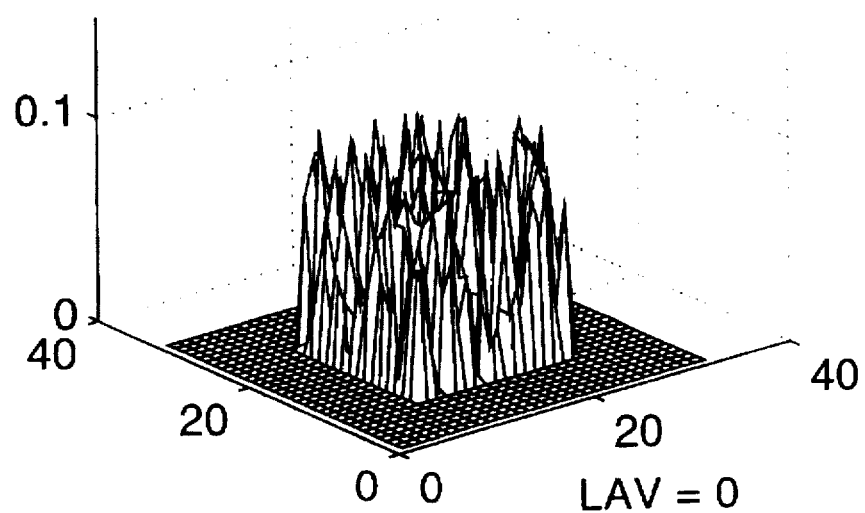
FIGS. 7a and 7b are images of a rectangularly-shaped moving object with arbitrary texture.
Figure 7B:
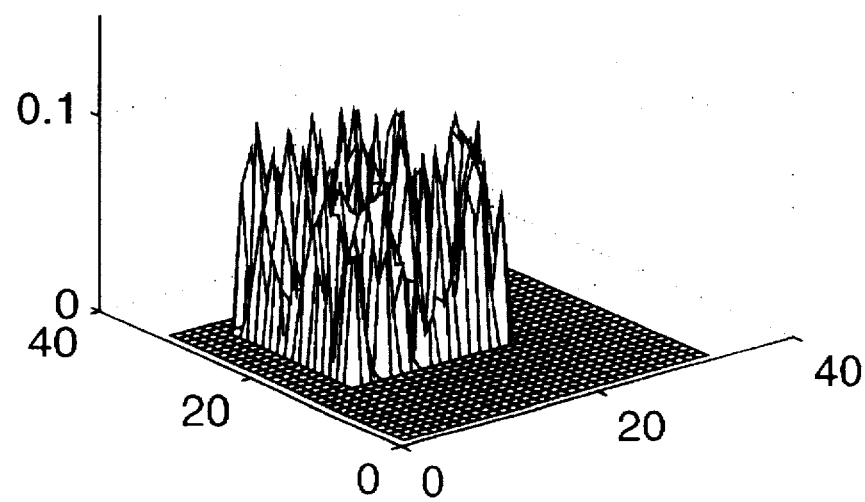
Figure 7C:
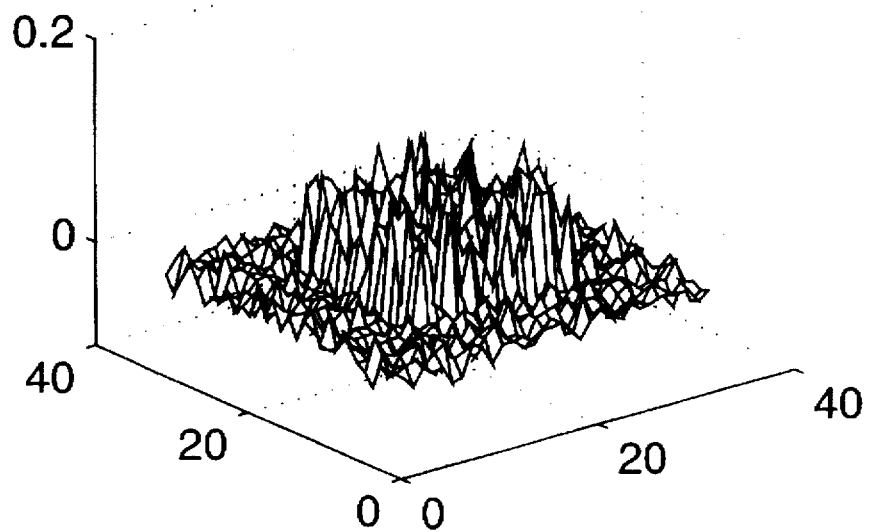
FIGS. 7c and 7d are illustrations of FIGS. 7a and 7b, respectively, which are corrupted by additive white Gaussian noise at SNR=10 dB.
Figure 7D:
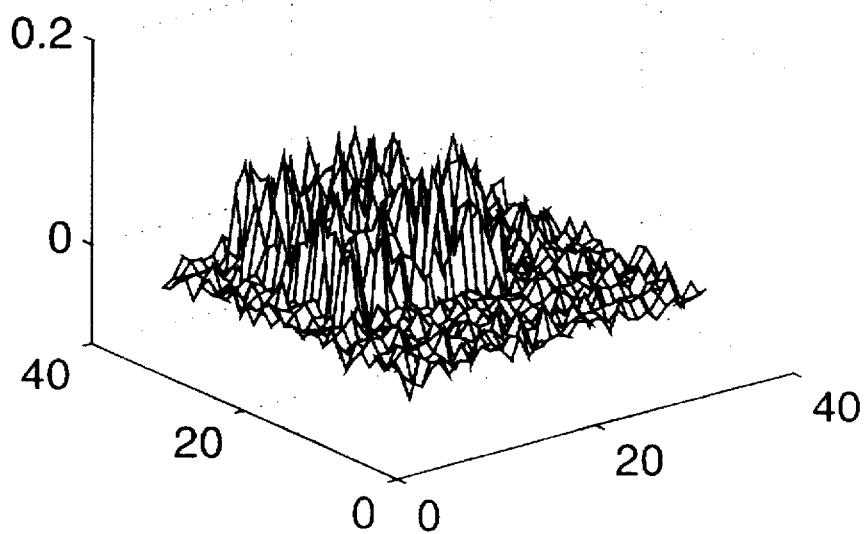
Figure 7E:
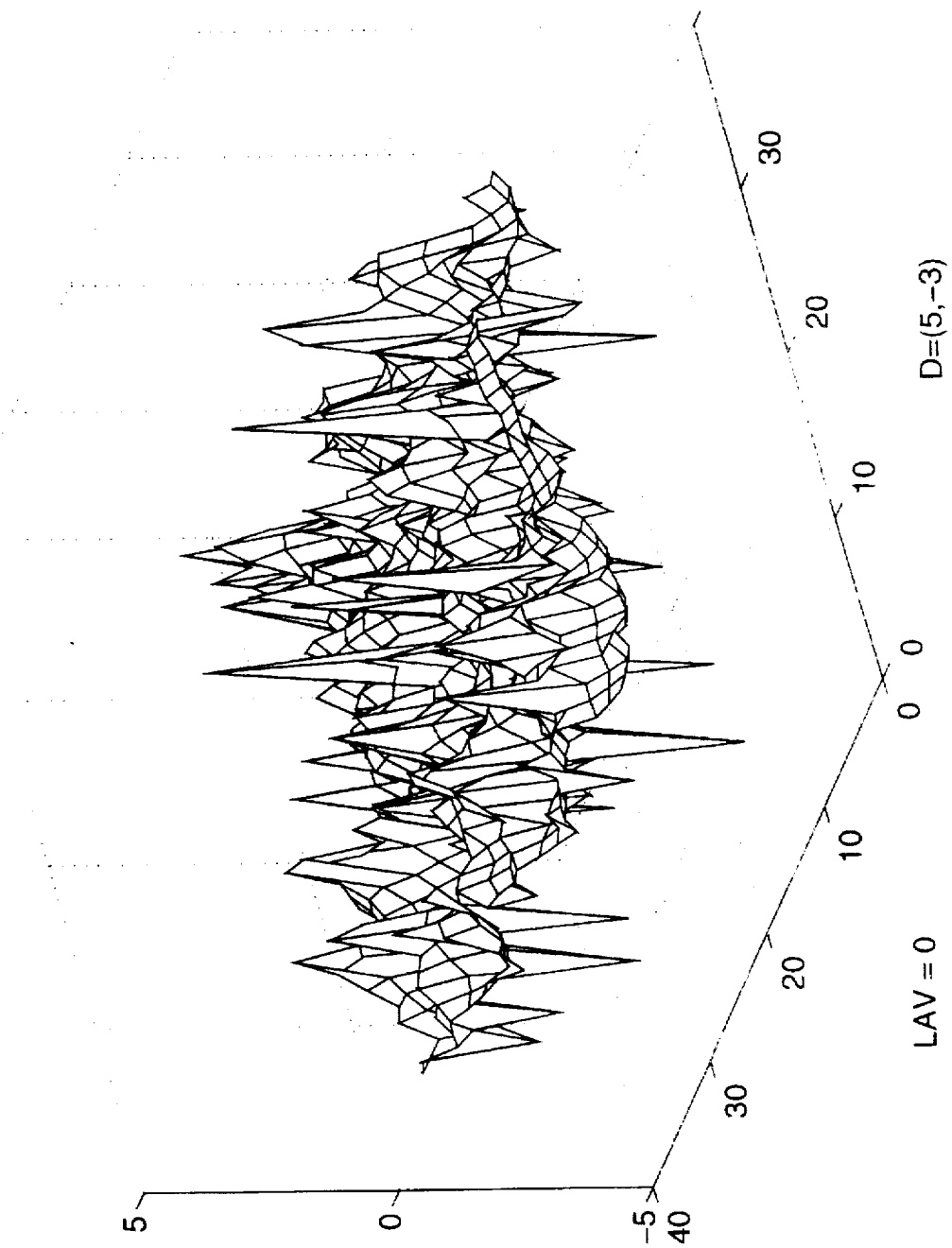
FIGS. 7e and 7f are graphs of the resulted pseudo phase functions f and g.
Figure 7F:
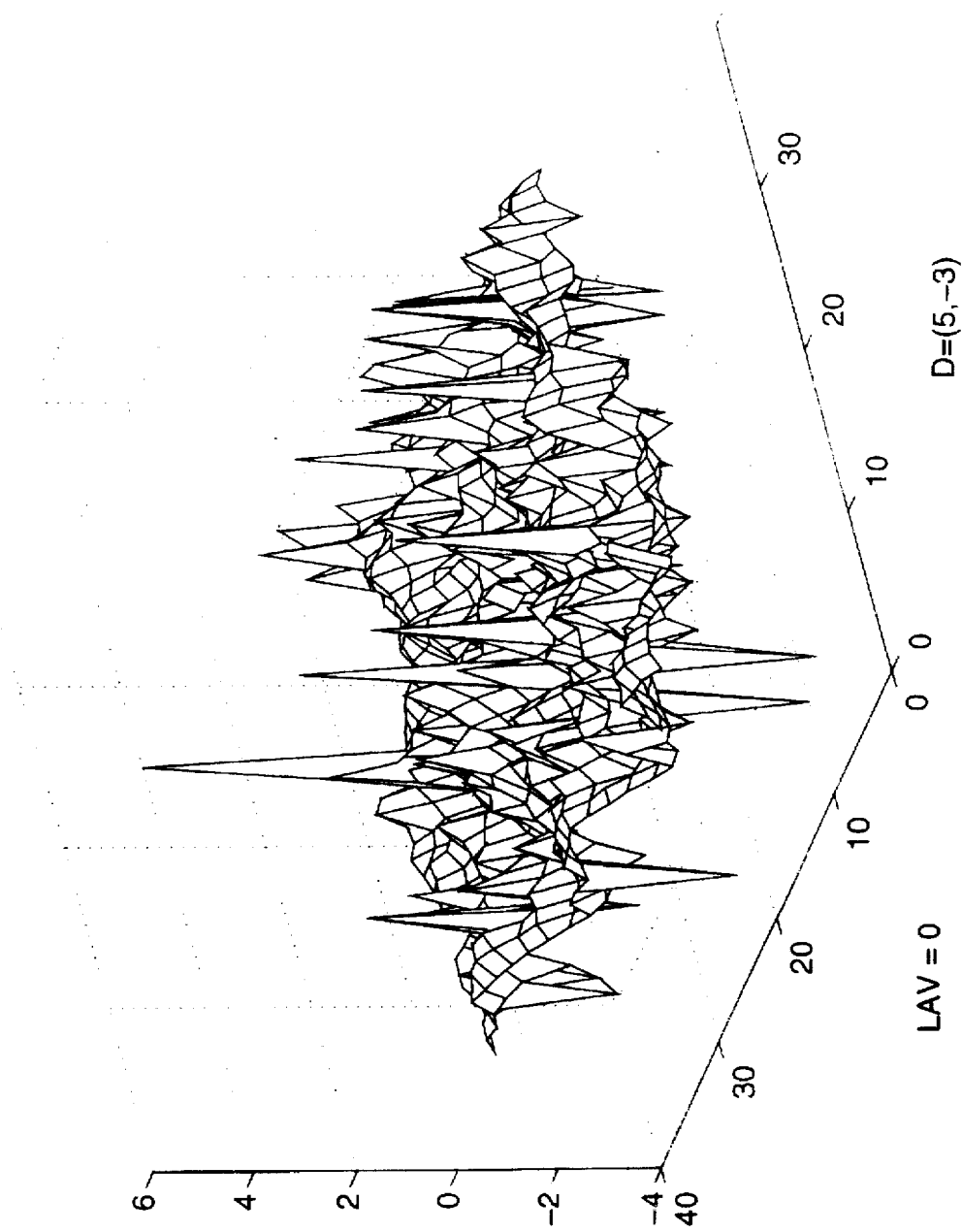
Figure 7G:
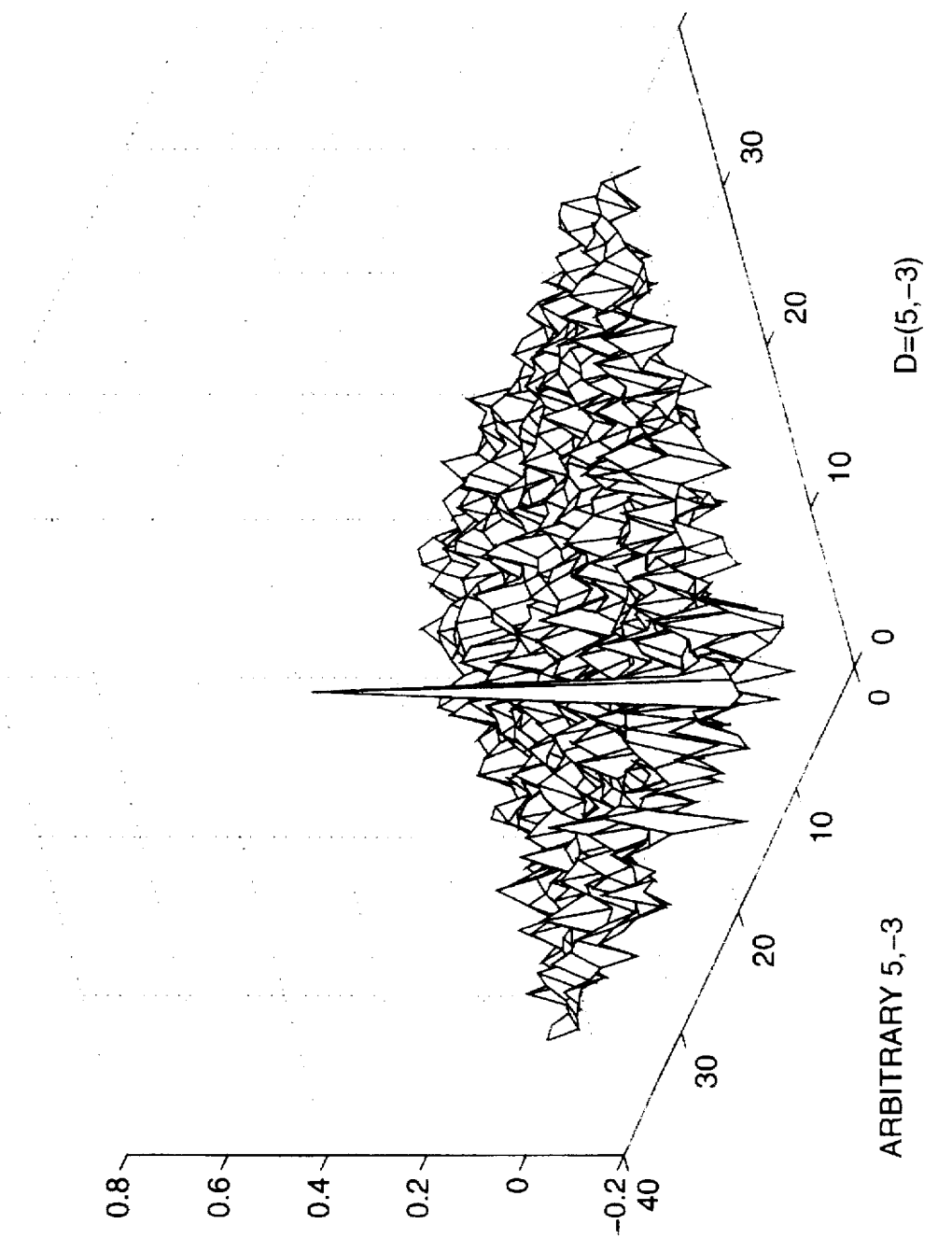
FIGS. 7g and 7h are graphs of the DCS and DSC functions.
Figure 7H:
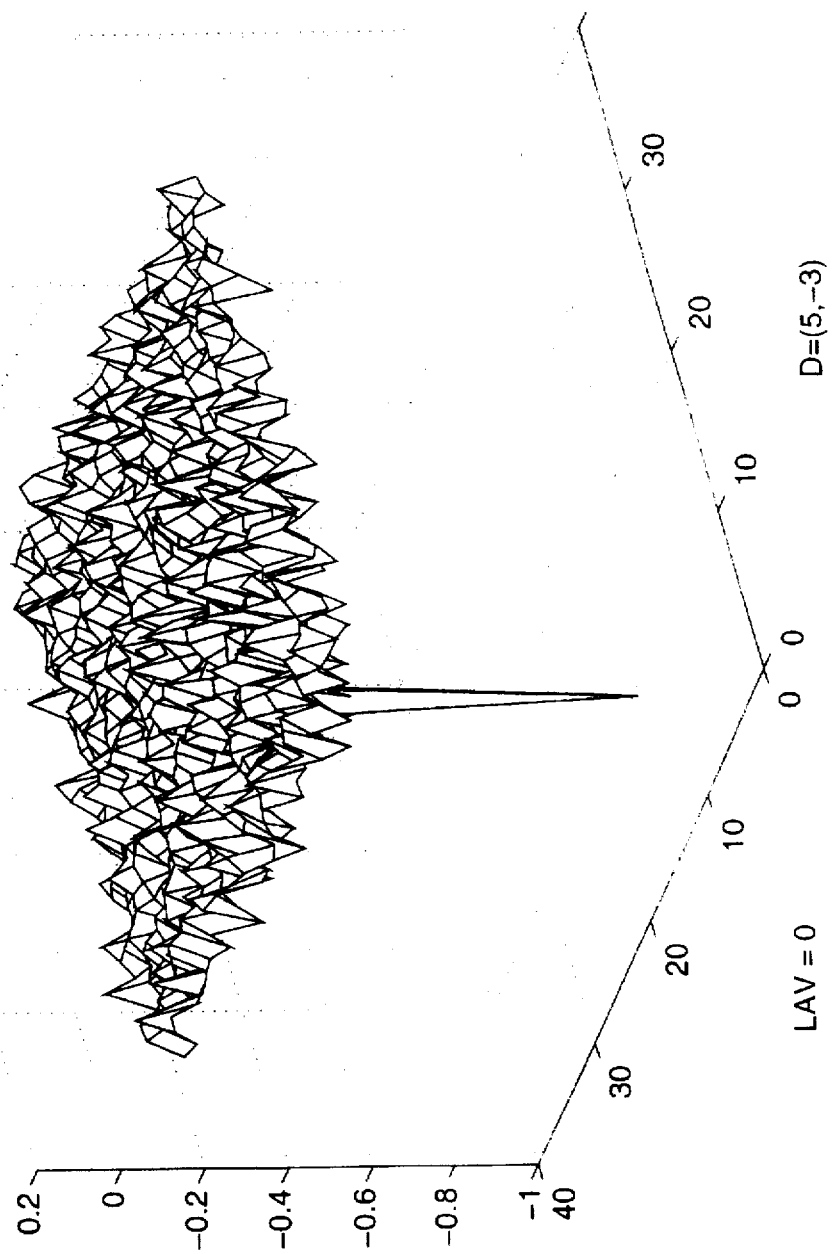
Figure 8A:
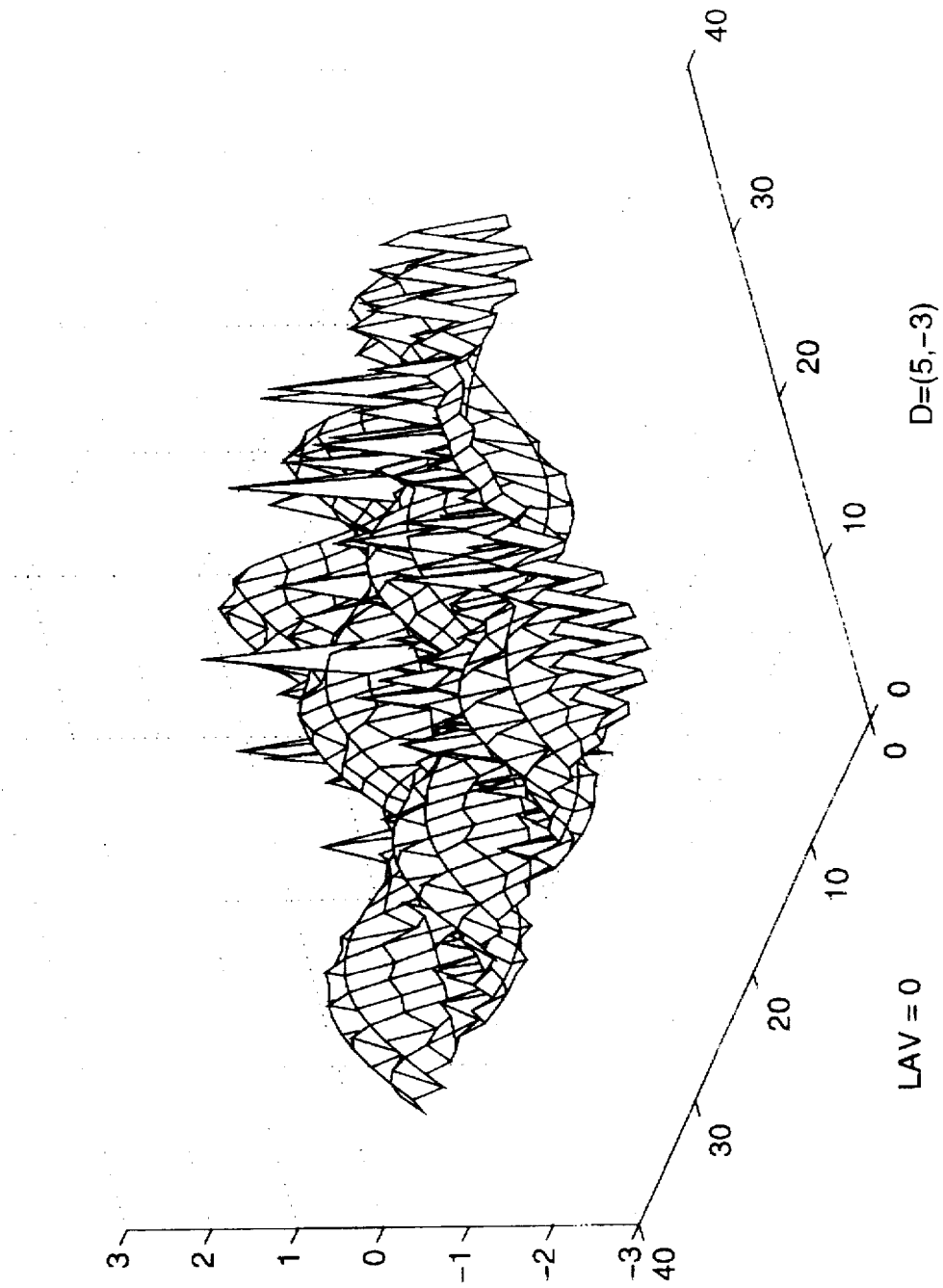
FIGS. 8a and 8b are graphs of the resulted pseudo phase functions, f and g, for motion in the direction (5, −3) in a uniformly bright background (c=3).
Figure 8B:
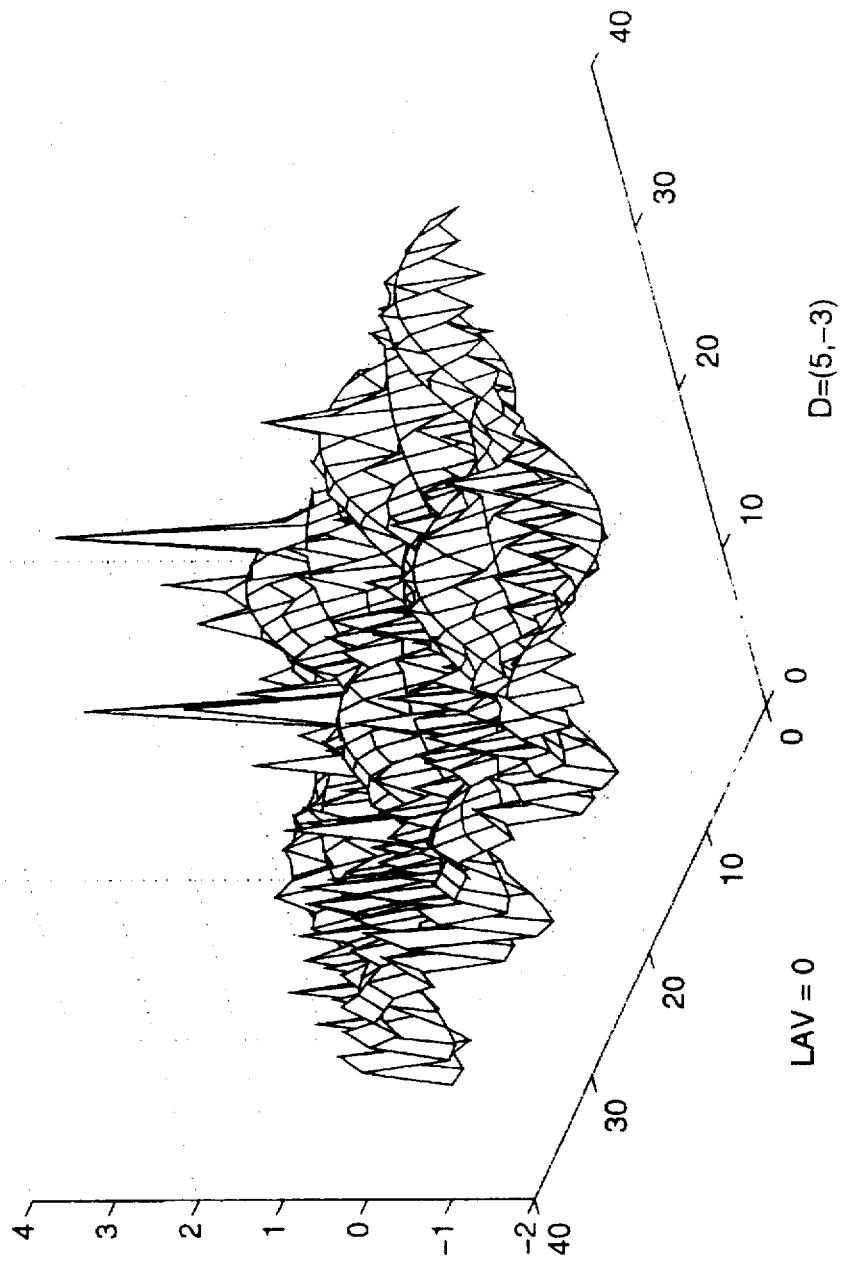
Figure 8C:
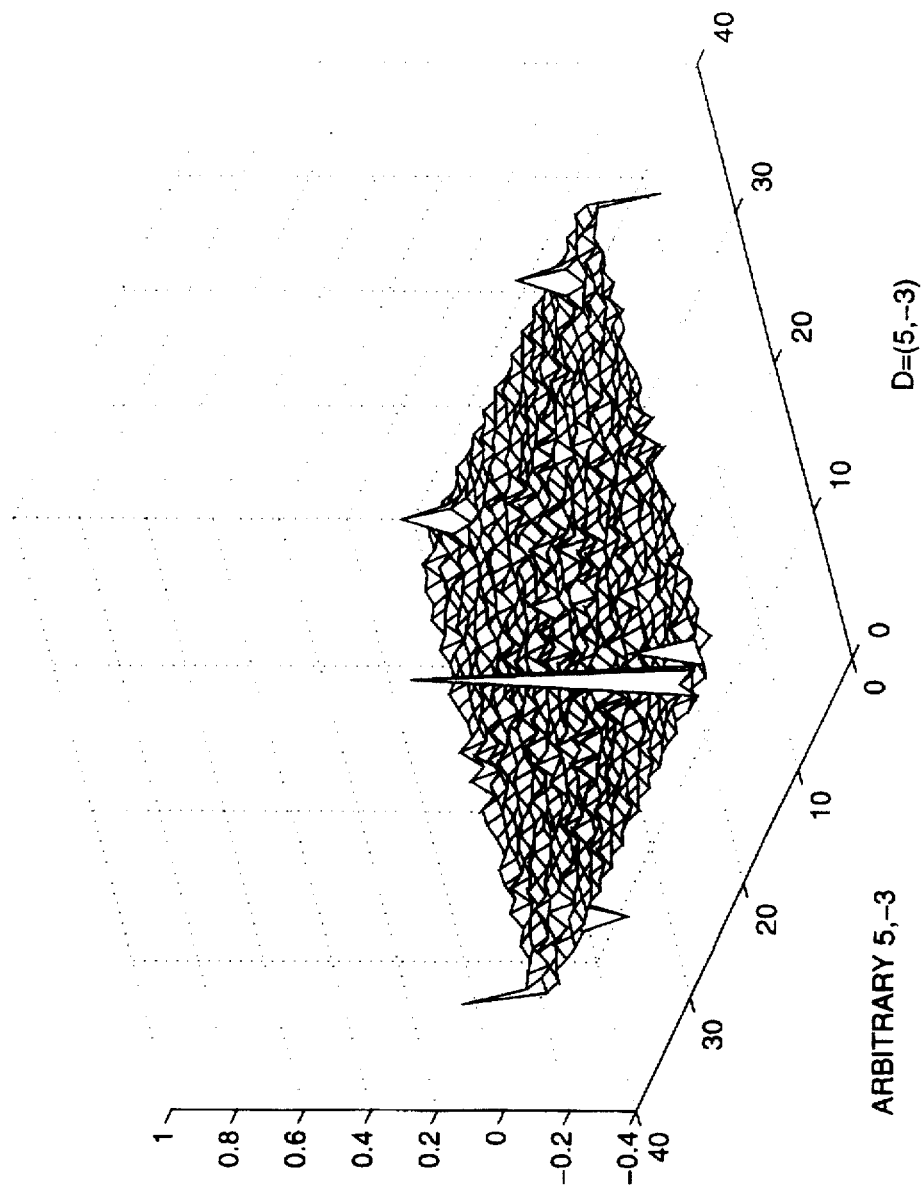
FIGS. 8c and 8d are graphs of the DCS and DCS functions for motion in the direction (5, −3) in a uniformly bright background (c=3)
Figure 8D:
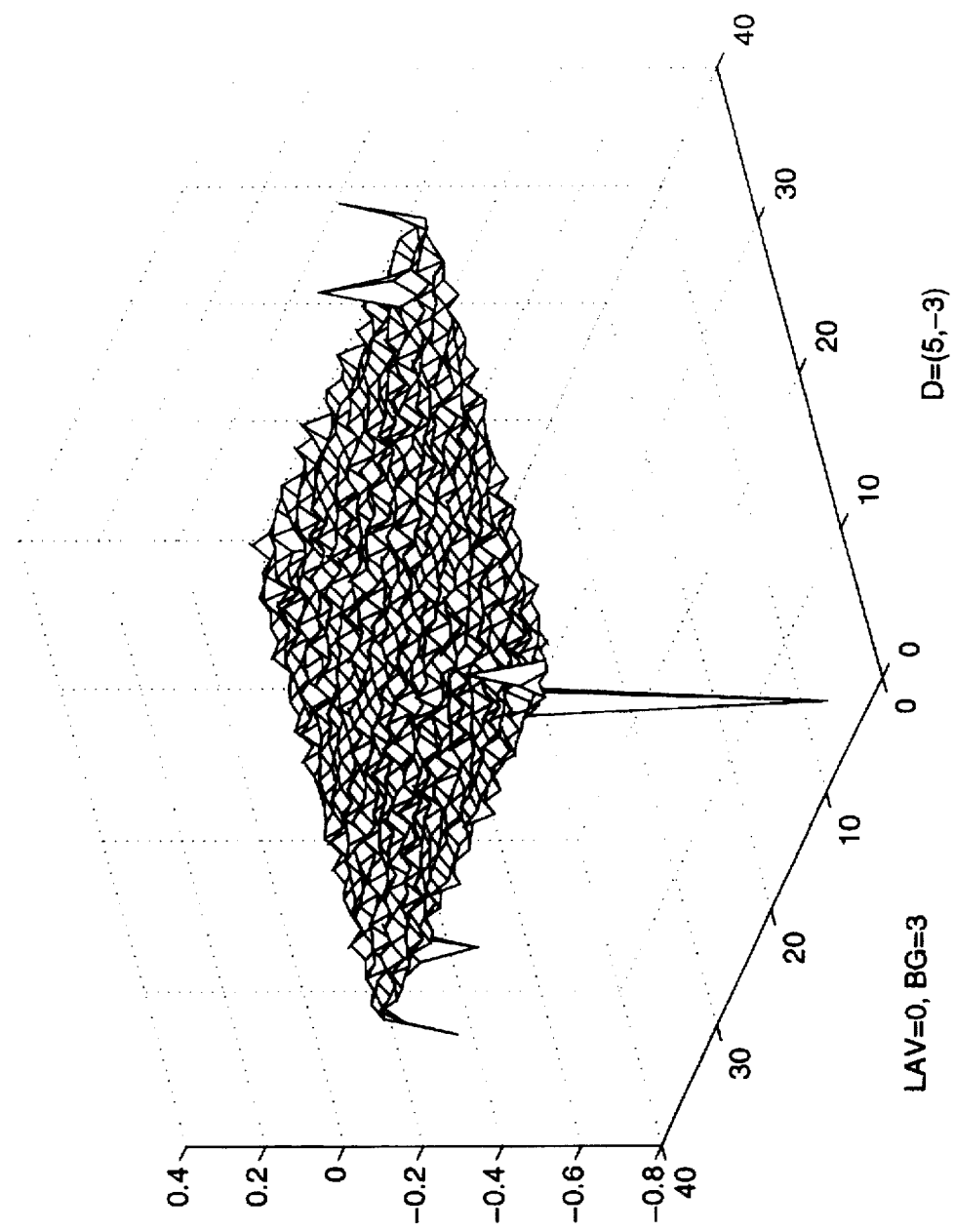
Figure 8E:
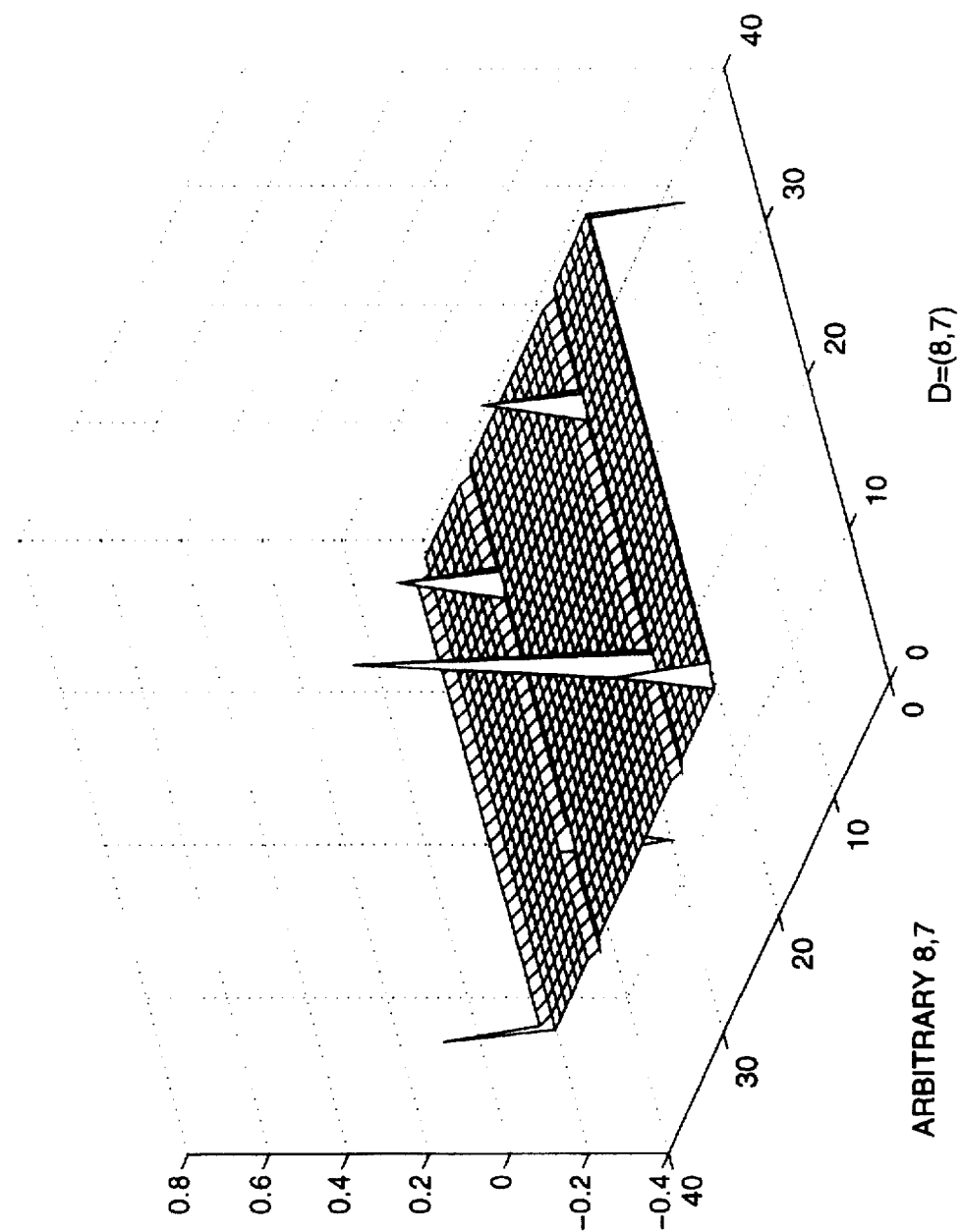
FIGS. 8e and 8f are the graphs of DCS and DSC for the motion (8, 7) with background pixel level, c=255.
Figure 8F:
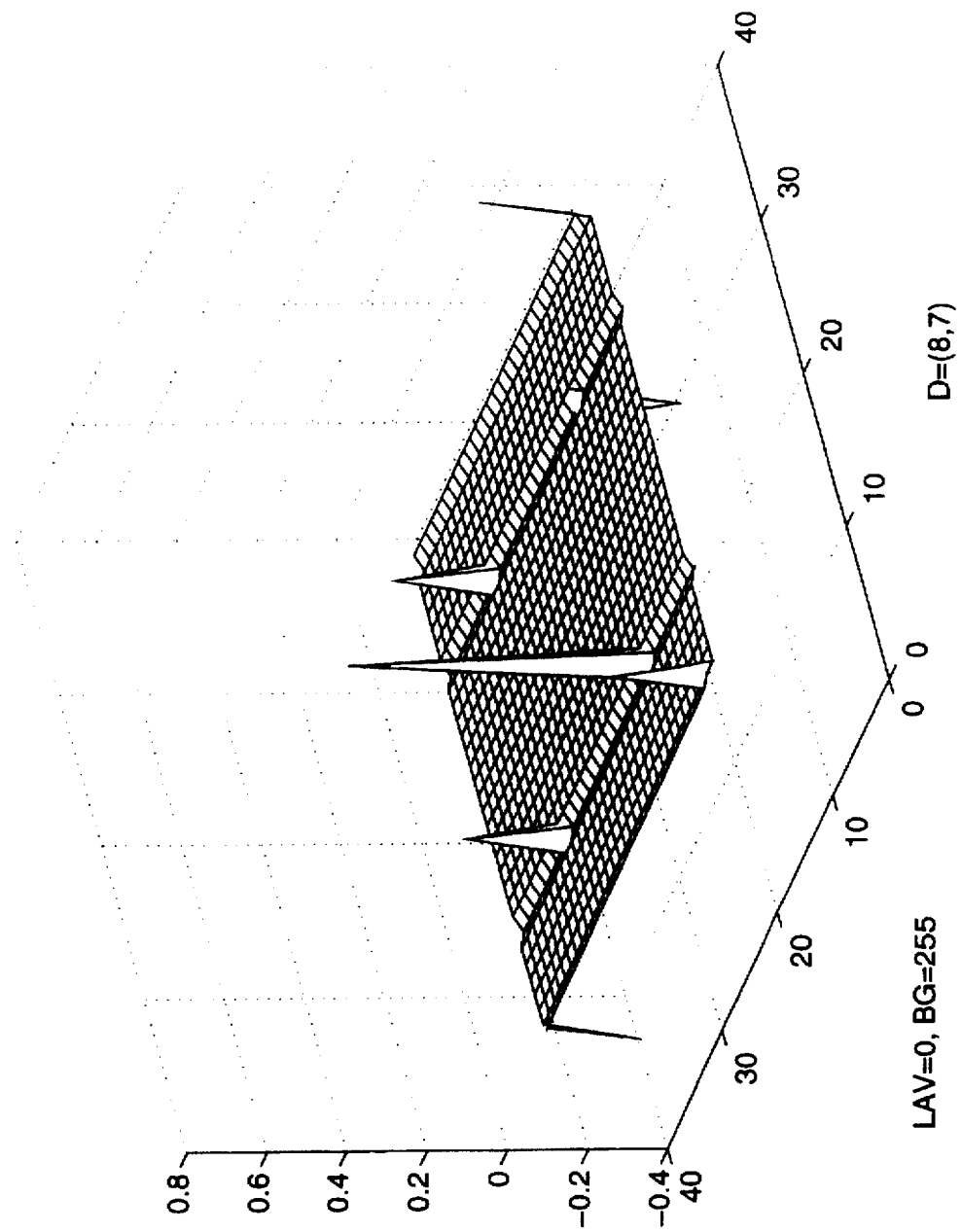

The method of this DCT-based motion estimation scheme is depicted in FIG. 5a. The previous frame $x_{t-1}$ and the current frame $x_t$ are fed into 2D–DCT-II and 2D–DCT-1 coders, respectively. A 2D–DCT-II coder computes four coefficient, DCCTII, DCSTII, DCSTII and DSSTII, each of which is defined as a two-dimensional separable function formed by 1D–DCT/DST-II kernels:

$$X_r^{CC}(k, l) = \frac{4}{N^2} C(k)C(l) \sum_{m,n=0}^{N-1} x_t(m, n)\cos\left[\frac{k\pi}{N}(m + \quad (15)$$

$$0.5)\right] \cos\left[\frac{l\pi}{N}(n+0.5)\right], k, l \in \{0, ..., N-1\},$$

$$X_r^{CS}(k, l) = \frac{4}{N^2} C(k)C(l) \sum_{m,n=0}^{N-1} x_t(m, n)\cos\left[\frac{k\pi}{N}(m + \quad (16)$$

$$0.5)\right] \sin\left[\frac{l\pi}{N}(n+0.5)\right], k \in \{0, ..., N-1\}, l \in \{1, ..., N\},$$

$$X_r^{SC}(k, l) = \frac{4}{N^2} C(k)C(l) \sum_{m,n=0}^{N-1} x_t(m, n)\sin\left[\frac{k\pi}{N}(m + \quad (17)$$

$$0.5)\right] \cos\left[\frac{l\pi}{N}(n+0.5)\right], k \in \{1, ..., N\}, l \in \{0, ..., N-1\},$$

$$X_r^{SS}(k, l) = \frac{4}{N^2} C(k)C(l) \sum_{m,n=0}^{N-1} x_t(m, n)\sin\left[\frac{k\pi}{N}(m + \quad (18)$$

$$0.5)\right] \sin\left[\frac{l\pi}{N}(n+0.5)\right], k, l \in \{1, ..., N\},$$

or symbolically, $X_r^{CC}$=DCCTII($x_t$), $X_r^{CS}$=DCSTII($x_t$), $X_r^{SC}$=DSCTII($x_t$), $X_r^{SS}$= DSSTII($x_t$)

In the same fashion, the two-dimensional DCT coefficients of the first kind (2D–DCT-I) are calculated based on 1D–DCT/DST-I kernels:

$$Z_{t-1}^{CC}(k, l) = \tag{19}$$

$$\frac{4}{N^2} C(k)C(l) \sum_{m,n=0}^{N-1} x_{t-1}(m, n)\cos\left[\frac{k\pi}{N}(m)\right] \cos\left[\frac{l\pi}{N}(n)\right],$$

$$k, l \in \{0, \ldots, N\},$$

$$Z_{t-1}^{CS}(k, l) = \tag{20}$$

$$\frac{4}{N^2} C(k)C(l) \sum_{m,n=0}^{N-1} x_{t-1}(m, n)\cos\left[\frac{k\pi}{N}(m)\right] \sin\left[\frac{l\pi}{N}(n)\right],$$

$$k \in \{0, \ldots, N\}, l \in \{1, \ldots, N-1\},$$

$$Z_{t-1}^{SC}(k, l) = \tag{21}$$

$$\frac{4}{N^2} C(k)C(l) \sum_{m,n=0}^{N-1} x_{t-1}(m, n)\sin\left[\frac{k\pi}{N}(m)\right] \cos\left[\frac{l\pi}{N}(n)\right],$$

$$k \in \{1, \ldots, N-1\}, l \in \{0, \ldots, N\},$$

$$Z_{t-1}^{SS}(k, l) = \tag{22}$$

$$\frac{4}{N^2} C(k)C(l) \sum_{m,n=0}^{N-1} x_t(m, n)\sin\left[\frac{k\pi}{N}(m)\right] \sin\left[\frac{l\pi}{N}(n)\right],$$

$$k, l \in \{1, \ldots, N-1\},$$

or symbolically, $$Z_{t-1}{}^{CC} = \text{DCCTI}(x_{t-1}), Z_{t-1}{}^{CS} = \text{DCSTI}(x_{t-1}), Z_{t-1}{}^{SC} = \text{DSCTI}(x_{t-1}), Z_{t-1}{}^{SS} = \text{DSSTI}(X_{t-1})$$

Similar to the one dimensional case, assuming that only translational motion is allowed, one may derive a set of equations to relate DCT coefficients of $x_{t-1}(m,n)$ with those of $x_t(m,n)$ in the same way as in (3) and (4).

$$Z_{t-1}(k,l) \cdot \vec{\theta}(k,l) = \vec{x}_t(k,l), \text{ for } k,l \in N, \tag{23}$$

where $N = \{1, \ldots, N-1\}$, $$Z_{t-1}(k, l) = \begin{bmatrix} Z_{t-1}^{CC}(k, l) & -Z_{t-1}^{CS}(k, l) & -Z_{t-1}^{SC}(k, l) & Z_{t-1}^{SS}(k, l) \\ Z_{t-1}^{CS}(k, l) & Z_{t-1}^{CC}(k, l) & -Z_{t-1}^{SS}(k, l) & -Z_{t-1}^{SC}(k, l) \\ Z_{t-1}^{SC}(k, l) & -Z_{t-1}^{SS}(k, l) & Z_{t-1}^{CC}(k, l) & -Z_{t-1}^{CS}(k, l) \\ Z_{t-1}^{SS}(k, l) & Z_{t-1}^{SC}(k, l) & Z_{t-1}^{CS}(k, l) & Z_{t-1}^{CC}(k, l) \end{bmatrix}, \tag{24}$$

$$\vec{\theta}(k, l) = \begin{bmatrix} g_{m_1 n_1}^{CC}(k, l) \\ g_{m_1 n_1}^{CS}(k, l) \\ g_{m_1 n_1}^{SC}(k, l) \\ g_{m_1 n_1}^{SS}(k, l) \end{bmatrix} = \begin{bmatrix} \cos\frac{k\pi}{N}(m_1+0.5)\cos\frac{l\pi}{N}(n_1+0.5) \\ \cos\frac{k\pi}{N}(m_1+0.5)\sin\frac{l\pi}{N}(n_1+0.5) \\ \sin\frac{k\pi}{N}(m_1+0.5)\cos\frac{l\pi}{N}(n_1+0.5) \\ \sin\frac{k\pi}{N}(m_1+0.5)\sin\frac{l\pi}{N}(n_1+0.5) \end{bmatrix}, \tag{25}$$

$$\vec{x}_t(l, l) = [X_t^{CC}(k, l) \ X_t^{CS}(k, l) \ X_t^{SC}(k, l) \ X_t^{SS}(k, l)]^T \tag{26}$$

Here, $Z_{t-1}(k,l) \in \mathbb{R}^{4 \times 4}$ is the system matrix of DXT-ME at $(k,l)$. At the boundaries of each block in the transform domain, the DCT coefficients of $x_{t-1}(m,n)$ and $x_t(m,n)$ have a one-dimensional relationship as given below:

$$\begin{bmatrix} Z_{t-1}^{CC}(k,l) & -Z_{t-1}^{CS}(k,l) \\ Z_{t-1}^{CS}(k,l) & Z_{t-1}^{CC}(k,l) \end{bmatrix} \begin{bmatrix} \cos\frac{l\pi}{2N}(n_1+0.5) \\ \sin\frac{l\pi}{2N}(n_1+0.5) \end{bmatrix} = \begin{bmatrix} X_t^{CC}(k,l) \\ X_t^{CS}(k,l) \end{bmatrix}, k=0, l \in N, \tag{27}$$

$$\begin{bmatrix} Z_{t-1}^{CC}(k,l) & -Z_{t-1}^{SC}(k,l) \\ Z_{t-1}^{SC}(k,l) & Z_{t-1}^{CC}(k,l) \end{bmatrix} \begin{bmatrix} \cos\frac{k\pi}{2N}(m_1+0.5) \\ \sin\frac{k\pi}{2N}(m_1+0.5) \end{bmatrix} = \begin{bmatrix} X_t^{CC}(k,l) \\ X_t^{SC}(k,l) \end{bmatrix}, l=0, k \in N, \tag{28}$$

$$\begin{bmatrix} Z_{t-1}^{CC}(k,l) & -Z_{t-1}^{CS}(k,l) \\ Z_{t-1}^{CS}(k,l) & Z_{t-1}^{CC}(k,l) \end{bmatrix} \begin{bmatrix} \cos\frac{l\pi}{2N}(n_1+0.5) \\ \sin\frac{l\pi}{2N}(n_1+0.5) \end{bmatrix} = \tag{29}$$

$$(-1)^{m_1} \begin{bmatrix} X_t^{SC}(k,l) \\ X_t^{SS}(k,l) \end{bmatrix}, k=N, l \in N,$$

$$\begin{bmatrix} Z_{t-1}^{CC}(k,l) & -Z_{t-1}^{SC}(k,l) \\ Z_{t-1}^{SC}(k,l) & Z_{t-1}^{CC}(k,l) \end{bmatrix} \begin{bmatrix} \cos\frac{k\pi}{2N}(m_1+0.5) \\ \sin\frac{k\pi}{2N}(m_1+0.5) \end{bmatrix} = \tag{30}$$

$$(-1)^{n_1} \begin{bmatrix} X_t^{CS}(k,l) \\ X_t^{SS}(k,l) \end{bmatrix}, l=N, k \in N,$$

$$(-1)^{m_1} Z_{t-1}^{CC}(k,l) = X_t^{CS}(k,l), k = 0 \ l = N, \tag{31}$$

$$(-1)^{n_1} Z_{t-1}^{CC}(k,l) = X_t^{SC}(k,l), k = N \ l = N \tag{32}$$

In a two-dimensional space, an object may move in four possible directions: northeast (NE: $m_1 > 0$, $n_1 > 0$); northwest (NW: $m_1 < 0$, $n_1 < 0$); southeast (SE: $m_1 > 0$, $n_1 > 0$); and southwest (SW: $m_1 < 0$, $n_1 < 0$). As explained above, the orthogonal equation for the DST-II kernel in Equation (9) may be applied to the pseudo phase $\hat{g}_m{}^s(k)$ to determine the sign of m (i.e., the direction of the shift). In order to detect the signs of both $m_1$ and $n_1$ (or equivalently the direction of motion), from the observation in the one-dimensional case, it is necessary to compute the pseudo phases $\hat{g}_{m_1 n_1}{}^{SC}(\cdot,\cdot)$ and $\hat{g}_{m_1 n_1}{}^{CS}(\cdot,\cdot)$ so that the signs of $m_1$ and $n_1$ may be determined from $\hat{g}_{m_1 n_1}{}^{SC}(\cdot, \cdot)$ and $\hat{g}_{m_1 n_1}{}^{CS}(\cdot,\cdot)$, respectively. By taking the block boundary equations (27)–(32) into consideration, we define the two pseudo phase functions as follows:

$$f_{m_1 n_1}(k,l) = \begin{cases} \hat{g}_{m_1 n_1}^{CS}(k,l), & \text{for } k, l \in \{1, \ldots, N-1\}, \\ \frac{1}{\sqrt{2}} \frac{Z_{r-1}^{CC}(k,l)X_r^{CS}(k,l) - Z_{r-1}^{CS}(k,l) X_r^{CC}(k,l)}{(Z_{r-1}^{CC}(k,l))^2 + (Z_{r-1}^{CS}(k,l))^2}, & \text{for } k = 0, l \in \{1, \ldots, N-1\}, \\ \frac{1}{\sqrt{2}} \frac{Z_{r-1}^{CC}(k,l)X_r^{CS}(k,l) + Z_{r-1}^{SC}(k,l)X_r^{SC}(k,l)}{(Z_{r-1}^{CC}(k,l))^2 + (Z_{r-1}^{SC}(k,l))^2}, & \text{for } l = N, k \in \{1, \ldots, N-1\}, \\ \frac{1}{2} \frac{X_r^{CS}(k,l)}{Z_{r-1}^{CS}(k)}, & \text{for } K = 0, l = N, \text{ and } Z_{r-1}^{CC}(k,l) \neq 0, \\ \frac{1}{2}, & \text{for } k = 0, l = N, \text{ and } Z_{r-1}^{CC}(k,l) = 0 \end{cases} \quad (33)$$

$$g_{m_1 n_1}(k,l) = \begin{cases} \hat{g}_{m_1 n_1}^{SC}(k,l), & \text{for } k, l \in \{1, \ldots, N-1\}, \\ \frac{1}{\sqrt{2}} \frac{Z_{r-1}^{CC}(k,l)X_r^{CS}(k,l) - Z_{r-1}^{SS}(k,l)X_r^{CC}(k,l)}{(Z_{r-1}^{CC}(k,l))^2 + (Z_{(r-1)}^{CS}(k,l))^2}, & \text{for } l = 0, k \in \{1, \ldots, N-1\}, \\ \frac{1}{\sqrt{2}} \frac{Z_{r-1}^{CC}(k,l)X_r^{SC}(k,l) + Z_{r-1}^{CS}(k,l)X_r^{SS}(k,l)}{(Z_{r-1}^{CC}(k,l))^2 + (Z_{r-1}^{SC}(k,l))^2}, & \text{for } k = N, l \in \{1, \ldots, N-1\}, \\ \frac{1}{2} \frac{X_r^{SC}(k,l)}{Z_{r-1}^{CC}(k)}, & \text{for } k = N, l = 0, \text{ and } Z_{r-1}^{CC}(k,l) \neq 0, \\ \frac{1}{2}, & \text{for } k = N, l = 0, \text{ and } Z_{r-1}^{CC}(k,l) = 0 \end{cases} \quad (34)$$

These two pseudo phase functions pass through 2D–IDCT-II coders (IDCSTII and IDSCTII) to generate two functions, DCS(·,·) and DSC(·,·) in view of the orthogonal property of DCT-II and DST-II in (9) and (10):

$$DCS(m,n) = IDCSTII(f_{m_1 n_1}) \quad (35)$$

$$= \frac{4}{N^2} \sum_{k=0}^{N-1} \sum_{l=0}^{N} C(k)C(l) f_{m_1 n_1}(k,l) \cos \frac{k\pi}{N} \left( m + \frac{1}{2} \right) \sin \frac{l\pi}{N} \left( n + \frac{1}{2} \right)$$

$$= [\delta(m - m_1) + \delta(m + m_1 + 1)] \cdot [\delta(n - n_1) - \delta(n + n_1 + 1)],$$

$$DSC(m,n) = IDSCTII(g_{m_1 n_1}) \quad (36)$$

$$= \frac{4}{N^2} \sum_{k=1}^{N} \sum_{l=0}^{N-1} C(k)C(l) g_{m_1 n_1}(k,l) \sin \frac{k\pi}{N} \left( m + \frac{1}{2} \right) \cos \frac{l\pi}{N} \left( n + \frac{1}{2} \right)$$

$$= [\delta(m - m_1) - \delta(m + m_1 + 1)] \cdot [\delta(n - n_1) + \delta(n + n_1 + 1)].$$

By the same argument as in the one-dimensional case, the 2D–IDCT-II coders limit the observable index space {(i, j):i, j=0, . . . , N−1} of DCS and DSC to the first quadrant of the entire index space as shown as gray regions in FIGS. 6a and 6d and 6e to 6h, respectively which depict (35) and (36). Similar to the one-dimensional case, if $m_1$ is positive, the observable peak value of DSC(m, n) will be positive regardless of the sign $n_1$ since DSC(m, n)=δ(m−$m_1$)·[δ(n−$n_1$)+δ(n+$n_1$+1)] in the observable index space. Likewise, if $m_1$ is negative, the observable peak value of DSC(m, n) will be negative because DSC(m, n)=δ(m+$m_1$+1)·[δ(n−$n_1$)+δ(n+$n_1$+1)] in the gray region. As a result, the sign of the observable peak value of DSC determines the sign of $m_1$. The same reasoning may apply to DCS in the determination of the sign of $n_1$. The estimated displacement, $\hat{d}=(\hat{m}_1, \hat{n}_1)$, may thus be found by locating the peaks of DCS and DSC over $\{0, \ldots, N-1\}^2$ or over an index range of interest, usually, $\Phi = \{0, \ldots, n/2\}^2$ for slow motion. How the peak signs determine the movement is summarized in Table I. Once the direction is found, $\hat{d}$ a may be estimated accordingly:

$$\hat{m}_1 = \begin{cases} i_{DSC} = i_{DCS}, & \text{if } DSC(i_{DSC}, j_{DSC}) > 0, \\ -(i_{DSC} + 1) = -(i_{DCS} + 1), & \text{if } DSC(i_{DSC}, j_{DSC}) < 0, \end{cases} \quad (37)$$

$$\hat{n}_1 = \begin{cases} j_{DCS} = j_{DSC}, & \text{if } DCS(i_{DCS}, j_{DCS}) > 0, \\ -(j_{DCS} + 1) = -(j_{DSC} + 1), & \text{if } DCS(i_{DCS}, j_{DCS}) < 0, \end{cases} \quad (38)$$

where $$(i_{DCS}, j_{DCS}) = \arg \max_{m, n \in \Phi} |DCS(m,n)|, \quad (39)$$

TABLE I

Determination of Direction of Movement ($m_1$, $n_1$) from the signs of DSC and DCS

| Sign of DSC Peak | Sign of DCS Peak | Peak Index | Direction of Motion |
|---|---|---|---|
| + | + | ($m_1$, $n_1$) | northeast |
| + | − | ($m_1$, −($n_1$ + 1)) | southeast |
| − | + | (−($m_1$ + 1), $n_1$) | northwest |
| − | − | (−($m_1$ + 1), −($n_1$ + 1)) | southwest |

$$(i_{DSC}, j_{DSC}) = \arg \max_{m, n \in \Phi} |DSC(m,n)|, \quad (40)$$

Normally, these two peak indices are consistent, but in noisy circumstances they may not agree. In this case, an arbitration rule must be made to pick the best index ($i_D$, $j_D$) in terms of minimum non-peak-to-peak ratio (NPR):

$$
(i_D, j_D) = \begin{cases} (i_{DSC}, j_{DSC}), & \text{if } NPR(DSC) < NPR(DCS), \\ (i_{DCS}, j_{DCS}), & \text{if } NPR(DSC) > NPR(DCS). \end{cases} \quad (41)
$$

This index $(i_D, j_D)$ will then be used to determine $\vec{d}$ by (37) and (38). Here NPR is defined as the ratio of the average of all absolute non-peak values to the absolute peak value. Thus $0 \leq NPR \leq 1$, and for a pure impulse function, NPR=0. Such an approach to choose the best index among the two indices is found empirically to improve the noise immunity of this estimator.

In situations where slow motion is preferred, it is better to search the peak value in a zigzag way as widely used in DCT-based hybrid video coding. Starting from the index (0,0), zigzagly smay all the DCS or (DSC) values and mark the point as the new peak index if the value at that point (i, j) is larger than the current peak value by more than a present threshold $\theta$:

$$(i_{DCS}, j_{DCS}) = (i, j) \text{ if } DCS(i, j) > DCS(i_{DCS}, j_{DCS}) + \theta, \quad (42)$$

$$(i_{DSC}, j_{DSC}) = (i, j) \text{ if } DSC(i, j) > DSC(i_{DSC}, j_{DSC}) + \theta. \quad (43)$$

In this way, large spurious spikes at the higher index points will not affect the performance of the estimator and thus improve its noise immunity further.

FIGS. 7a to 7h demonstrate this DXT-ME method. Images of a rectangularly-shaped moving object with arbitrary texture are generated as in FIG. 7a and corrupted by additive white Gaussian noise at SNR=10 dB as in FIGS. 7c and 7d. The resulted pseudo phase functions f and g, as well as DCS and DSC, are depicted in FIGS. 7e to 7h. Large peaks may be seen clearly in FIGS 7g and 7h on rough surfaces caused by noise in spite of noisy input images. The positions of these peaks give us an accurate motion estimate $(5, -3)$.

The stability of this motion estimator depends upon the property of the determinant of the system matrix $|Z_{t-1}(k, l)|$ in (23). A zero or near-zero value of $|Z_{t-1}(k, l)|$ may jeopardize the performance. However, it may be shown analytically that this determinant will rarely be zero. Some algebraic manipulations on the determinant of $Z_{t-1}(k, l)$ give us this close form of $|Z_{t-1}(k, l)|$:

$$
|Z_{t-1}(k,l)| = \begin{vmatrix} Z^{CC}_{t-1}(k,l) & -Z^{CS}_{t-1}(k,l) & -Z^{SC}_{t-1}(k,l) & Z^{SS}_{t-1}(k,l) \\ Z^{CS}_{t-1}(k,l) & Z^{CC}_{t-1}(k,l) & -Z^{SS}_{t-1}(k,l) & -Z^{SC}_{t-1}(k,l) \\ Z^{SC}_{t-1}(k,l) & -Z^{SS}_{t-1}(k,l) & Z^{CC}_{t-1}(k,l) & -Z^{CS}_{t-1}(k,l) \\ Z^{SS}_{t-1}(k,l) & -Z^{SC}_{t-1}(k,l) & Z^{CS}_{t-1}(k,l) & Z^{CC}_{t-1}(k,l) \end{vmatrix}
$$

$$(Z^{CS}_{t-1}(k,l)^2 - Z^{SC}_{t-1}(k,l)^2)^2 + (Z^{CC}_{t-1}(k,l)^2 - Z^{SS}_{t-1}(k,l)^2)^2$$

$$= 2(Z^{CS}_{t-1}(k,l)Z^{CC}_{t-1}(k,l) + Z^{SC}_{t-1}(k,l)Z^{SS}_{t-1}(k,l))^2$$

$$2(Z^{CC}_{t-1}(k,l)Z^{SC}_{t-1}(k,l) + Z^{CS}_{t-1}(k,l)Z^{SS}_{t-1}(k,l))^2$$

in which $|Z_{t-1}(k, l)|=0$ implies that:

$$Z_{t-1}{}^{CS}(k,l) = \pm Z_{t-1}{}^{SC}(k,l),$$

$$Z_{t-1}{}^{CC}(k,l) = \pm Z_{t-1}{}^{SS}(k,l),$$

$$Z_{t-1}{}^{CC}(k,l)Z_{t-1}{}^{CS}(k,l) = -Z_{t-1}{}^{SC}(k,l)Z_{t-1}{}^{SS}(k,l),$$

$$Z_{t-1}{}^{CC}(k,l)Z_{t-1}{}^{SC}(k,l) = -Z_{t-1}{}^{CS}(k,l)Z_{t-1}{}^{SS}(k,l).$$

However, the last two equalities allow only two possible conditions:

either $Z_{t-1}{}^{CS}(k,l) = Z_{t-1}{}^{SC}(k,l), Z_{t-1}{}^{CC}(k,l) = -Z_{t-1}{}^{SS}(k,l),$ (45)

or $Z_{t-1}{}^{CS}(k,l) = -Z_{t-1}{}^{SC}(k,l), Z_{t-1}{}^{CC}(k,l) = Z_{t-1}{}^{SS}(k,l).$ (46)

Alternatively, in their explicitly compact forms, $$\sum_{m,n=0}^{N-1} x_{t-1}(m,n) \sin\left[\frac{\pi}{N}(km \mp ln)\right] = 0, \quad (47)$$

$$\sum_{m,n=0}^{N-1} x_{t-1}(m,n) \cos\left[\frac{\pi}{N}(km \mp ln)\right] = 0, \quad (48)$$

Here the minus signs in (47) and (48) correspond to the first condition in (45) and the plus signs correspond to (46). Satisfying either condition requires $x_{t-1}(m, n) \equiv 0$. Therefore, it is very unlikely that this determinant is zero and as such, the DXT-ME is a stable estimator. Even so, if $Z_{t-1}(k, l)=0$ really happens or $Z_{t-1}(k, l)$ is less than a threshold, then we may let $f(k, l)=g(k, l)=1$, which is equivalent to the situation when $x_{t-1}(m, n) \equiv 0$. In this way, the catastrophical effect of computational precision of a certain implementation on the stability of DXT-ME will be kept to a minimum or even eliminated.

What if an object is moving in a uniformly bright background instead of a completely dark environment? It may be shown analytically and empirically that uniformly bright background introduces only very small spikes which does not affect the accuracy of the estimate. Suppose that $\{x_{t-1}(m, n)\}$ and $\{x_t(m, n)\}$ are pixel values of two consecutive frames of an object displaced by $(m_1, n_1)$ on a uniformly bright background. Then let $y_t(m, n)$ and $y_{t-1}(m, n)$ be the pixel value of $x_t(m, n)$ and $x_{t-1}(m, n)$ subtracted by the background pixel value $c(c>0)$ respectively:

$$y_t(m, n) = x_t(m, n) - c, \quad (49)$$

$$y_{t-1}(m, n) = x_{t-1}(m, n) - c. \quad (50)$$

In this way, $\{x_{t-1}(m, n)\}$ and $\{x_t(m, n)\}$ may be considered as the images of an object moving in a dark environment. Denote $Z_{t-1}(k, l)$ as the system matrix of the input image $x_{t-1}$ and $U_{t-1}(k, l)$ as that of $y_{t-1}$ for $k, l \in N$. Also let $\vec{x}_t(k,l)$ be the vector of the 2D–DCT-II coefficients of $x_t$ and $\vec{y}_t(k,l)$ be the vector for $y_t$. Applying the DXT-ME method to both situations, we have, for $k, l \in N$, $$Z_{t-1}(k,l) \cdot \vec{\theta}_{m_1 n_1}(k,l) = \vec{x}_t(k,l), \quad (51)$$

$$U_{t-1}(k,l) \cdot \vec{\varnothing}_{m_1 n_1}(k,l) = \vec{y}_t(k,l), \quad (52)$$

Here $\vec{\varnothing}_{m_1 n_1}(k,l)$ is the vector of the computed pseudo phases for the case of dark background and thus $$\vec{\varnothing}_{m_1 n_1}(k, l) = [g^{CC}_{m_1 n_1}(k, l), g^{CS}_{m_1 n_1}(k, l), g^{SC}_{m_1 n_1}(k, l), g^{SS}_{m_1 n_1}(k, l)]^T$$

TABLE II

COMPUTATIONAL COMPLEXITY OF EACH STAGE IN DXT-ME

| Stage | Component | Computational Complexity |
|---|---|---|
| 1 | 2D-DCT-II | $O_{dct} = O(N)$ |
|   | Coeff. Transformation Unit (T) | $O_{dct} = O(N^2)$ |
| 2 | Pseudo Phase Computation | $O(N^2)$ |
| 3 | 2D-IDCT-II | $O_{dct} = O(N)$ |
| 4 | Peak Searching | $O(N^2)$ |
|   | Estimation | $O(1)$ | but $\vec{\Theta}_{m_1 n_1}(k,l)$ is for uniformly bright background and $\vec{\theta}_{m_1n_1}(k,l) = [\hat{g}_{m_1n_1}{}^{CC}(k,l), \hat{g}_{m_1n_1}{}^{CS}(k,l), \hat{g}_{m_1n_1}{}^{SC}(k,l), \hat{g}_{mn_1}{}^{SS}(k,l)]^T \neq \sqrt{\vec{\varnothing}_{m_1n_1}(k,l)}.$ Starting from the definition of each element in $Z_{t-1}(k, l)$ and $\vec{x}_t(k,l)$, we obtain $$Z_{t-1}(k,l) = U_{t-1}(k,l) + c \cdot D(k,l), \quad (53)$$

$$\vec{x}_t(k,l) = \vec{y}_t(k,l) + c \cdot \vec{c}_t(k,l), \quad (54)$$

where $D(k, l)$ is the system matrix with $\{d(m, n)=1, \forall m, n=\{0, \ldots, N-1\}\}$ as input and $\vec{c}(k,l)$ is the vector of the 2D–DCT-II coefficients of $d(m, n)$. Substituting (53) and (54) into (52) we get $$Z_{t-1}(k,l) \cdot \vec{\theta} 1_{mn}(k,l) = Z_{t-1}(k,l) \cdot \vec{\varnothing}_{m_1n_1}(k,l) + c \cdot [\vec{c}(k,l) - D(k,l) \cdot \vec{\varnothing}_{m_1n_1}(k,l)]. \quad (55)$$

Since $\vec{c}(k,l) = D(k,l) \cdot \vec{\varnothing}_{00}(k,l)$, (55) becomes $$\vec{\theta}_{m_1n_1}(k,l) = \vec{\varnothing}_{m_1n_1}(k,l) + c Z_{t-1}^{-1}(k,l) D(k,l) [\vec{\varnothing}_{00}(k,l) - \vec{\varnothing}_{m_1n_1}(k,l)], \quad (56)$$

provided that $|Z_{t-1}(k, l)| \neq 0$. Similar results may also be found at block boundaries. Referring to (24), we know that $D(k, l)$ is composed of $D^{CC}(k, l)$, $D^{CS}(k, l)$, $D^{SC}(k, l)$, and $D^{SS}(k, l)$, each of which is a separable function made up by $$D^C(k) \equiv \frac{2}{N} C(k) \sum_{m=0}^{N-1} \cos\left[\frac{k\pi}{N} m\right] = \frac{2}{N} C(k) \{0.5[1-(-1)^k] + N \cdot \delta(k)\},$$

$$D^S(k) \equiv \frac{2}{N} C(k) \sum_{m=0}^{N-1} \sin\left[\frac{k\pi}{N} m\right] =$$

$$\begin{cases} \frac{2}{N} C(k) \dfrac{1-(-1)^k}{2\tan\frac{k\pi}{2N}}, & \text{for } k \neq 0, \\ 0, & \text{for } k = 0. \end{cases}$$

From the above equations, we may see that $D^C(k) = D^S(k) = 0$ if $k$ is even, and for odd $k > 0$, $D^C(k) = 2/N$ while $$D^S(k) = \frac{2}{N\tan\frac{k\pi}{2n}}.$$

Hence, $D^{CC}(k, l) = D^{CS}(k, l) = D^{SC}(k, l) = D^{SS}(k, l) = 0$ if either $k$ or $l$ is even. As a result, $\vec{\Theta}_{m_1n_1}(k,l) = \vec{\phi}_{m_1n_1}(k,l)$ if either $k$ or $l$ is even. For odd indices $k$ and $l$, it is possible to find a constant $s$ and a matrix $N(k, l) \in R^{4 \times 4}$ such that $U_{t-1}(k, l) = s[D(k, l) - N(k, l)]$ and $|N(k, l)D^{-1}(k, l)| < 1$ for $|D(k, l)| \neq 0$. Therefore, for $$\left| \frac{s}{s+c} N(k,l)D^{-1}(k,l) \right| < 1,$$

-continued $$c\vec{z}_{t-1}(k,l)D(k,l) = \frac{c}{s+c}\left[I - \frac{s}{s+c} N(k,l)D^{-1}(k,l)\right]^{-1} \quad (57)(58)$$

$$= \frac{c}{s+c}\left\{I + \frac{s}{s+c} N(k,l)D^{-1}(k,l) + \left[\frac{s}{s+c} N(k,l)D^{-1}(k,l)\right]^2 = \ldots \right\}.$$

If we lump all the high-order terms of $$\frac{s}{s+c} N(k,l)D^{-1}(k,l)$$

in one term $H(k, l)$, then $$\vec{\theta}_{m_1n_1}(k,l) = \vec{\varnothing}_{m_1n_1}(k,l) + \left[\frac{c}{s+c} + H(k,l)\right] [\vec{\varnothing}_{00}(k,l) - \vec{\varnothing}_{m_1n_1}(k,l)]. \quad (59)$$

Usually, $0 \leq c$, $s \leq 255$ for the maximum gray level equal to 255. Typically, $s=1$. For moderately large $c$, $H(k, l)$ is very small. Define the subsampled version of the pseudo phase function $\vec{\phi}_{ab}(k,l)$ as $$\vec{\lambda}_{ab}(k,l) \equiv \begin{cases} \vec{\varnothing}_{ab}(k,l) & \text{if both } k \text{ and } l \text{ are odd}, \\ 0, & \text{otherwise}. \end{cases} \quad (60)$$

Then $$\vec{\theta}_{m_1n_1}(k,l) = \vec{\varnothing}_{m_1n_1}(k,l) + \left[\frac{c}{s+c} + H(k,l)\right] \{\vec{\lambda}_{00} - \vec{\lambda}_{m_1n_1}\}. \quad (61)$$

Recall that a 2D–IDCT-II operation on $\vec{\phi}_{m_1n_1}(k,l)$ or $\vec{\phi}_{00}(k,l)$ produces $\vec{\delta}_{m_1n_1}$ or $\vec{\delta}_{00}$, respectively, where $$\delta_{ab}(m,n) = \begin{bmatrix} (\delta(m-a) + \delta(m+a+1))(\delta(n-b) + \delta(n+b+1)) \\ (\delta(m-a) + \delta(m+a+1))(\delta(n-b) - \delta(n+b+1)) \\ (\delta(m-a) - \delta(m+a+1))(\delta(n-b) + \delta(n+b+1)) \\ (\delta(m-a) - \delta(m+a+1))(\delta(n-b) - \delta(n+b+1)) \end{bmatrix}.$$

Therefore, $$\vec{d}(m,n) \equiv 2D - DCT - II\{\vec{\theta}_{m_1n_1}\} = \quad (62)$$

$$\vec{\delta}_{m_1n_1}(m,n) + \frac{c}{s+c} 2D - DCT - II\{\vec{\delta}_{00} - \vec{\delta}_{m_1n_1}\} = \vec{n}(m,n),$$

where $\vec{n}$ is the noise term contributed from 2D-DCT-II$\{H(k,l)[\vec{\lambda}_{00} - \vec{\lambda}_{m_1n_1}]\}$. Because $\vec{\lambda}_{ab}$ is equivalent to downsampling $\vec{\phi}_{ab}$ in a 2D index space and it is known that downsampling produces in the transform domain mirror images of magnitude only one-fourth of the original and of sign depending on the transform function, we obtain $$\vec{E}_{m_1n_1} \equiv \quad (63)$$

$$2D - DCT - II\{\vec{\lambda}_{m_1n_1}\} = \frac{1}{4} [\vec{\delta}_{m_1n_1}(m,n) + diag(\vec{\zeta}_1) \cdot \vec{\delta}_{(N-1)m_1n_1}(m,n) + diag(\vec{\zeta}_2) \cdot \vec{\delta}_{m_1(N-1-n_1)}(m,n) + diag(\vec{\zeta}_3) \cdot \vec{\delta}_{(N-1-m_1)(N-1-n_1)}(m,n)],$$

where $diag(\cdot)$ is the diagonal matrix of a vector and $\vec{\zeta}$ $(i=1,2,3)$ is a vector consisting of $\pm 1$. A similar expression may also be established for 2D-DCT-II$\{\vec{\lambda}_{00}\}$. In conclusion, $$\vec{d}(m,n) = \vec{\delta}_{m_1 n_1}(m,n) + \frac{c}{4(s+c)} [\vec{E}_{00}(m,n) - \vec{E}_{m_1 n_1}(m,n)] = \vec{n}(m,n). \quad (64)$$

The above equation predicts the presence of a very small noise term $\vec{n}$ and several small spikes, $\vec{E}_{00}$ and $\vec{E}_{m_1 n_1}$, of magnitude moderated by $$\frac{c}{4(s+c)}$$

which are much smaller than the displacement peak, as displayed in FIGS. 8c to 8f where $\vec{n}$ for the case of c=3 in (b) is observable but very small and may be regarded as noise whereas $\vec{n}$ is practically absent as in (c) when c=255.

The block diagram in FIG. 5a shows that a separate 2D-DCT-I is needed in addition to the standard DCT (2D-DCT-II). This is undesirable from the complexity viewpoint. However, this problem may be circumvented by considering the point-to-point relationship between 2D-DCT-I and 2D-DCT-II coefficients in the frequency domain for k, l∈N:

$$\begin{bmatrix} Z_{t-1}^{CC}(k,l) \\ Z_{t-1}^{CS}(k,l) \\ Z_{t-1}^{SC}(k,l) \\ Z_{t-1}^{SS}(k,l) \end{bmatrix} = \begin{bmatrix} \cos\frac{k\pi}{2n}\cos\frac{l\pi}{2N} & \cos\frac{k\pi}{2n}\sin\frac{l\pi}{2N} & \sin\frac{k\pi}{2n}\cos\frac{l\pi}{2N} & \sin\frac{k\pi}{2n}\sin\frac{l\pi}{2N} \\ -\cos\frac{k\pi}{2n}\sin\frac{l\pi}{2N} & \cos\frac{k\pi}{2n}\cos\frac{l\pi}{2N} & -\sin\frac{k\pi}{2n}\sin\frac{l\pi}{2N} & \sin\frac{k\pi}{2n}\cos\frac{l\pi}{2N} \\ -\sin\frac{k\pi}{2n}\cos\frac{l\pi}{2N} & -\sin\frac{k\pi}{2n}\sin\frac{l\pi}{2N} & \cos\frac{k\pi}{2n}\cos\frac{l\pi}{2N} & \cos\frac{k\pi}{2n}\sin\frac{l\pi}{2N} \\ \sin\frac{k\pi}{2n}\sin\frac{l\pi}{2N} & -\sin\frac{k\pi}{2n}\cos\frac{l\pi}{2N} & -\cos\frac{k\pi}{2n}\sin\frac{l\pi}{2N} & \cos\frac{k\pi}{2n}\cos\frac{l\pi}{2N} \end{bmatrix} \begin{bmatrix} X_{t-1}^{CC}(k,l) \\ X_{t-1}^{CS}(k,l) \\ X_{t-1}^{SC}(k,l) \\ X_{t-1}^{SS}(k,l) \end{bmatrix} \quad (65)$$

where $X_{t-1}^{CC}$, $X_{t-1}^{CS}$, $X_{t-1}^{SC}$, and $X_{t-1}^{SS}$ are the 2D-DCT-II coefficients of the previous frame. Similar relation also exists for the coefficients at block boundaries. This observation results in the simple structure in FIG. 5b, where Block T is a coefficient transformation unit realizing (65).

If the DCT has computational complexity $O_{dct}$, the overall complexity of DXT-ME is $O(N^2)+O_{dct}$ with the complexity of each component summarized in Table II. The computational complexity of the pseudo phase computation component is only $O(N^2)$ for an N×N block and so is the unit to determine the displacement. For the computation of the pseudo phase functions f(·,·) in (33) and g(·,·) in (34), DSCT, DCST and DSST coefficients (regarded as DST coefficients) must be calculated in addition to DCCT coefficients (i.e., the usual 2D DCT). However, all of these coefficients may be generated with little overhead in the course of computing 2DDCT coefficients. As a matter of fact, a parallel and fully-pipelined 2d DCT lattice structure has been developed to generate 2D DCT coefficients at a cost of O(N) operations. This DCT coder computes DCT and DST coefficients dually due to its internal lattice architecture. These internally generated DST coefficients may be output to the DXT-ME module for pseudo phase computation. This same lattice structure may also be modified as a 2D IDCT which also has O(N) complexity. To summarize, the computation complexity of this DXT-ME is only $O(N^2)$, much lower than the $O(N^4)$ complexity of BMA-ME.

A closer look reveals that the operations of pseudo phase computation and coefficient transformation are performed independently at each point (k, l) in the transform domain and therefore are inherently highly parallel operations. Since most of the operations in the DXT-ME method involve mainly pseudo phase computation and coefficient transformation in addition to DCT and Inverse DCT operations which have been studied extensively, the DXT-ME method may easily be implemented on highly parallel array processors or dedicated circuits. This is very different from BMA-ME which requires shifting of pixels and summation of differences of pixel values and hence discourages parallel implementation.

For complicated video sequences in which objects may move across the border of blocks in non-uniform background, preprocessing may be employed to enhance the features of motion objects and avoid violation of the assumption made for DXT-ME before feeding the images into the DXT-ME motion estimator. Intuitively speaking, the DXT-ME method tries to match the features of any object on two consecutive frames to that any translation motion may be estimated regardless of the shape and texture of the object as long as these two frames contain significant energy level of the object features. Due to this feature matching property of the DXT-ME method, effective preprocessing will improve the performance of motion estimation if preprocessing may enhance the object features in the original sequence. In order to keep the computational complexity of the overall motion estimator low, the chosen preprocessing function must be simple but effective in the sense that unwanted features will not affect the accuracy of estimation.

Our study found that both edge extraction and frame differentiation are simple and effective schemes for extraction of motion information.

Edges of an object may represent the object itself in motion estimation as its features and contain the information of motion without violating the assumption for DXT-ME. The other advantage of edge extraction is that any change in the illumination condition does not alter the edge information and, in turn, makes no false motion estimates by the DXT-ME method. Since we only intend to extract the main features of moving objects while keeping the overall complexity low, we employ a very simple edge detection by convolving horizontal and vertical Sobel operators of size 3×3

$$H_3 \begin{bmatrix} 1 & 0 & -1 \\ 2 & 0 & -2 \\ 1 & 0 & -1 \end{bmatrix}, V_3 = H_3^T \quad (66)$$

with the image to obtain horizontal and vertical gradients respectively and then combine both gradients by taking the square root of the sum of the squares of both gradients. Edge detection provides us the features of moving objects but also the features of the background (stationary objects) which is undesirable. However, if the features of the background have smaller energy than those of moving objects within every block containing moving objects, then the background features will not affect the performance of DXT-ME. The computational complexity of this preprocessing step is only $O(N^2)$ and thus the overall computational complexity is still $O(N^2)$.

Frame differentiation generates an image of the difference of two consecutive frames. This frame differentiated image contains no background objects but the difference of moving objects between two frames. The DXT-ME estimator operates directly on this frame differentiated sequence to predict motion in the original sequence. The estimate will be good if the moving objects are moving constantly in one direction in three consecutive frames. For thirty frames per second, the standard NTSC frame rate, objects may usually be viewed as moving at a constant speed in three consecutive frames. Obviously this step also has only $O(N^2)$ computational complexity.

Figure 9A:
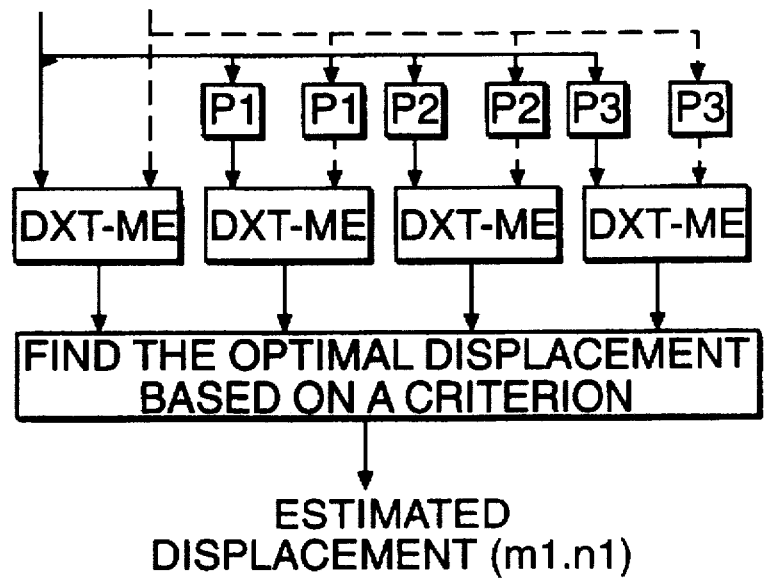
FIG. 9a is a block diagram of an Extended DXT-ME Estimator (E-DXT-ME)

Alternatively, instead of using only one preprocessing function, we may employ several simple operators in the preprocessing step to extract features of images as shown in FIG. 9a, in which four DXT-ME estimators generate four candidate estimates of which one may be chosen as the final estimated displacement based upon either the mean squared error per pixel (MSE) or the mean of absolute differences per pixel (MAD) criteria.

Figure 9B:
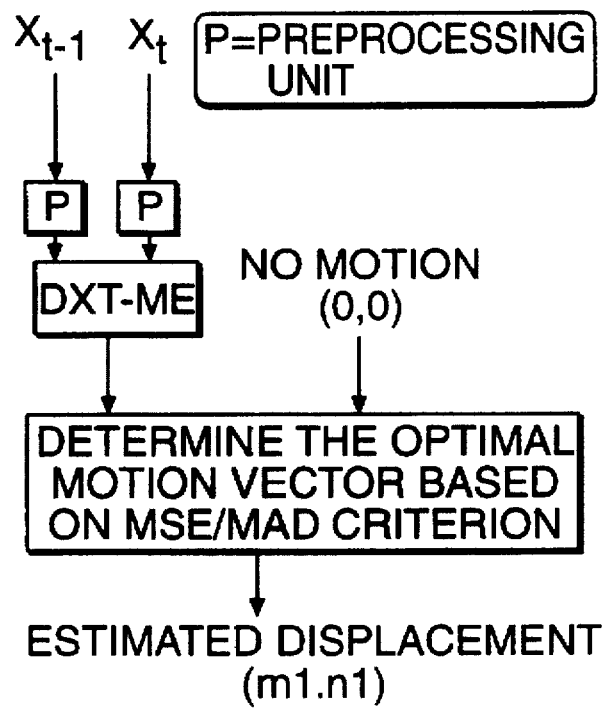
FIG. 9b is a block diagram of a Simplified Extended DXT-ME Estimator (SE-DXT-ME)

Preferably, a simple decision rule similar to the one used in the MPEG-standard 21, as depicted in FIG. 9b is used to choose among the DXT-ME estimate and no motion. This simplified extended DXT-ME motion estimator works very well as will be shown in the next section.

Figure 10A:
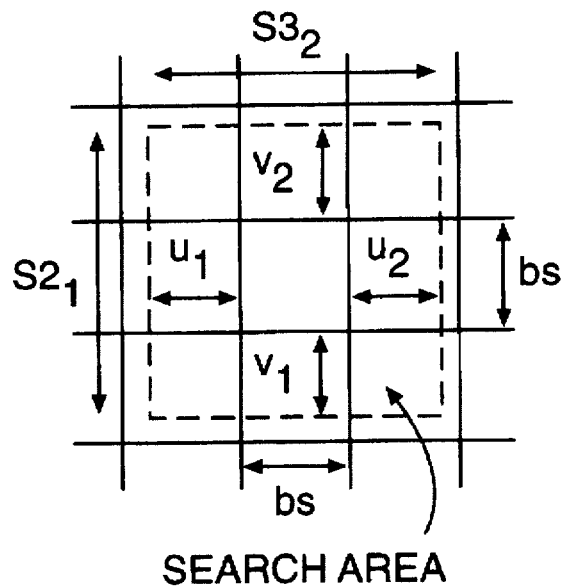
FIGS. 10a, 10b, and 10c are graphs of the reference block and search area, the search range and DCS/DSC for the overlapping approach, respectively.
Figure 10B:
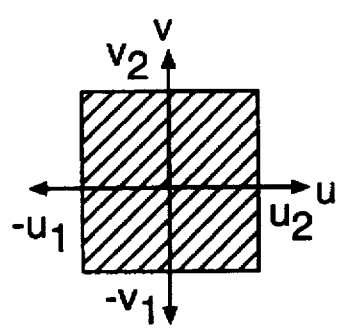
Figure 10C:
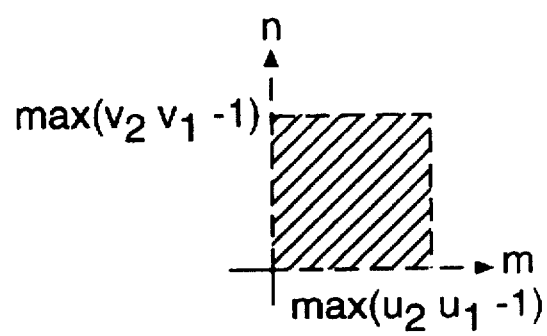
Figure 11A:
FIGS. 11a to 11p are comparisons of DXT-ME of size 64 by 64 with a Full Search Block matching Method (BMA-ME) of block size (bs=16 pels) but different search areas on a noisy small car with the noise being either 10 dB or 0 dB, respectively.
Figure 11B:
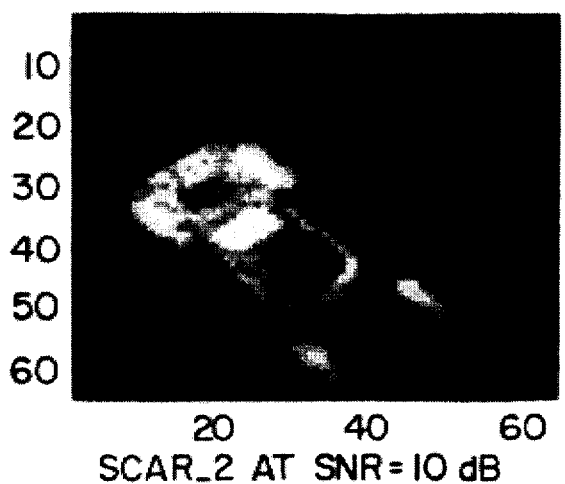
Figure 11C:
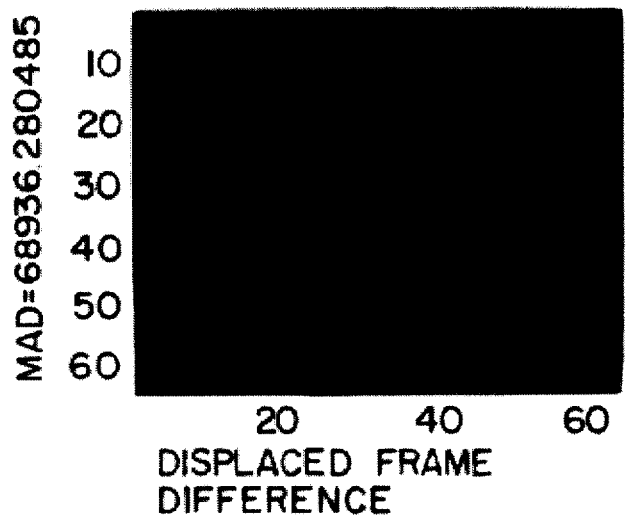
Figure 11E:
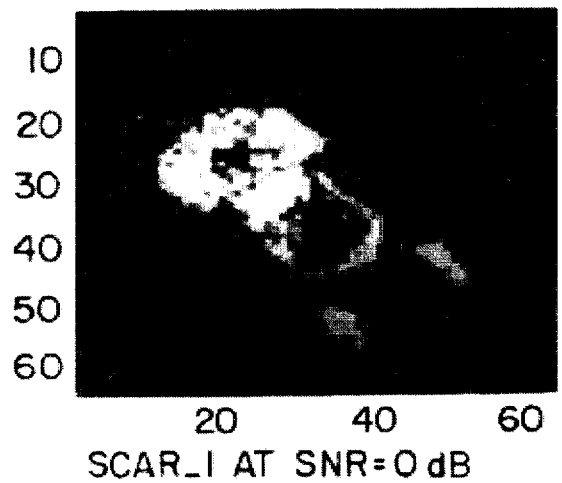
Figure 11F:
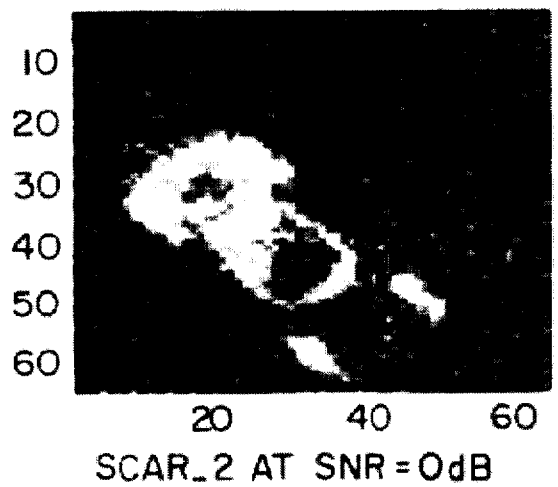
Figure 11G:
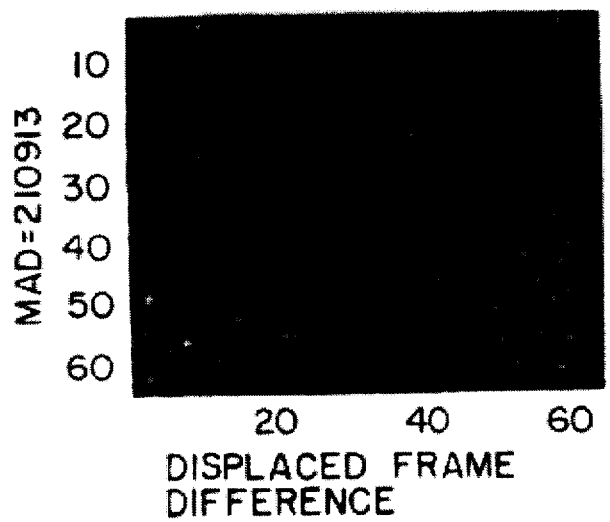
Figure 11D:
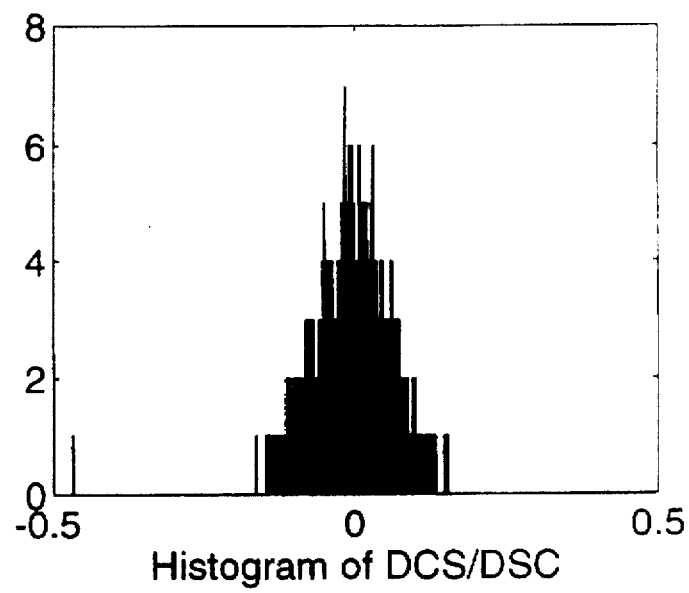
Figure 11H:
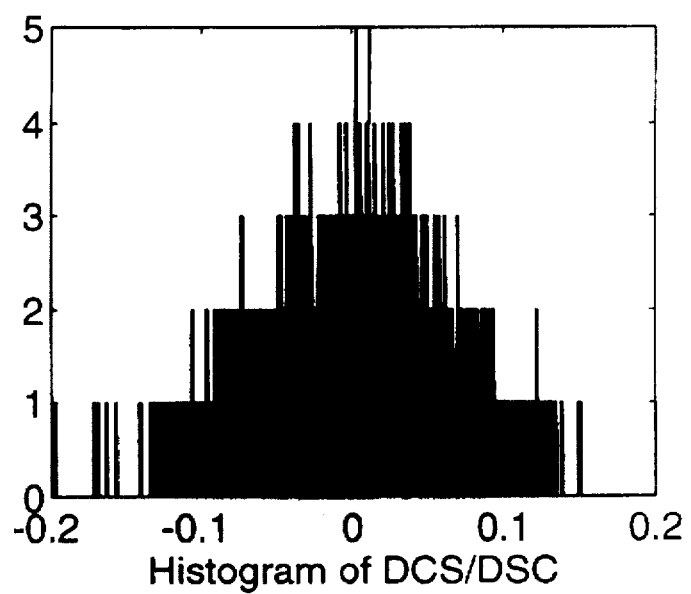
Figure 11I:
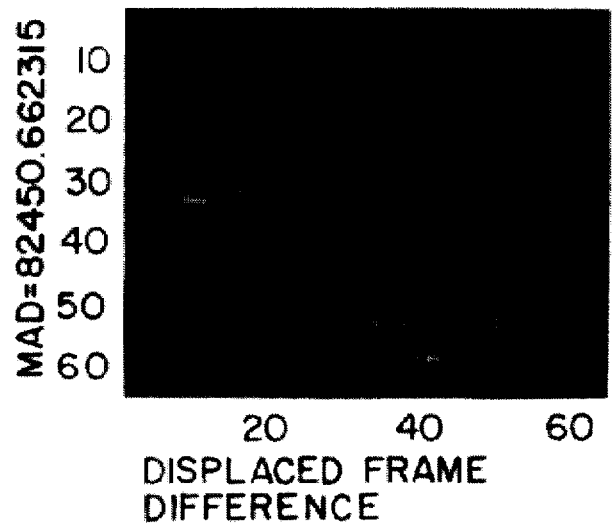
Figure 11K:
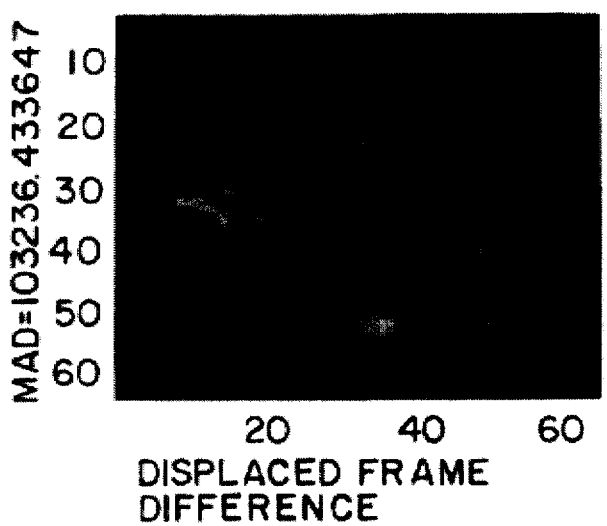
Figure 11J:
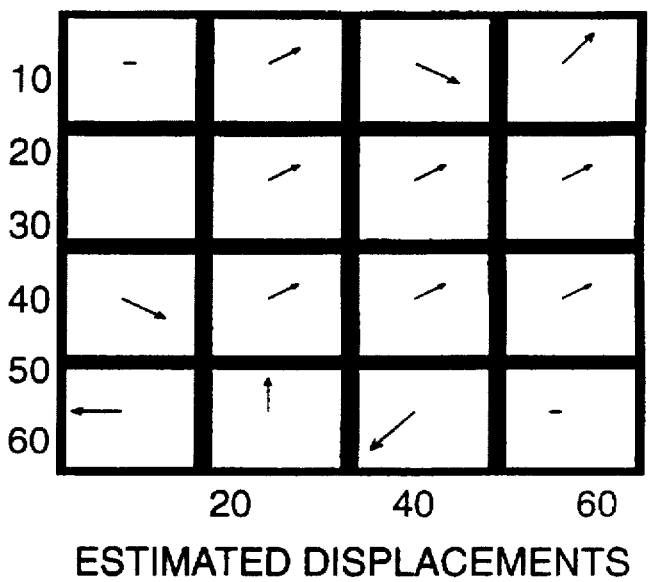
Figure 11L:
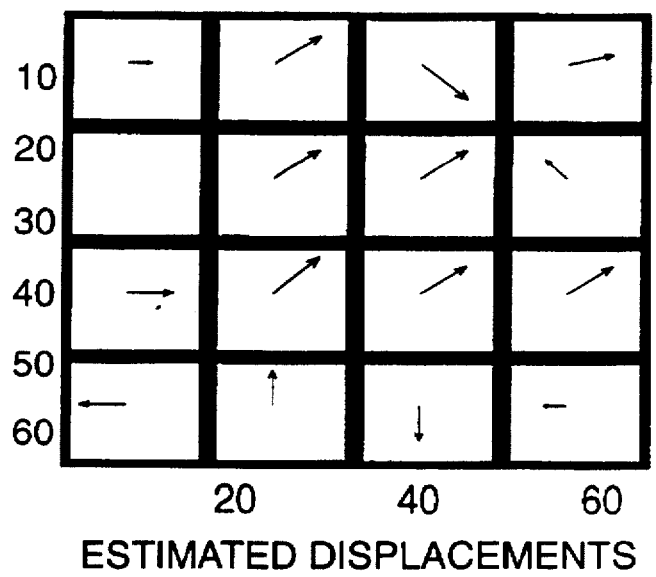
Figure 11M:
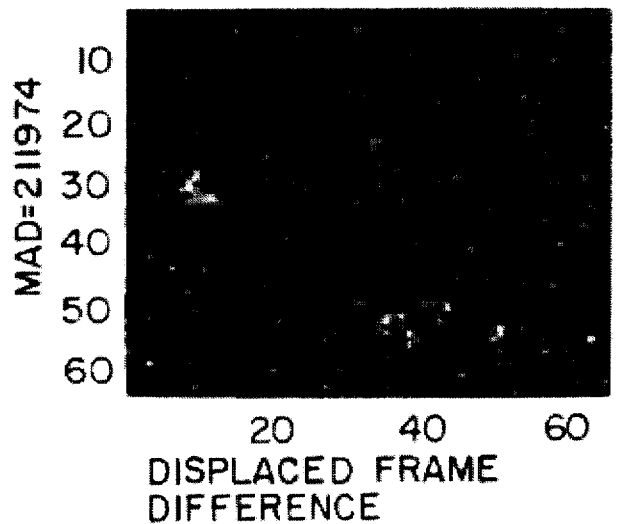
Figure 11O:
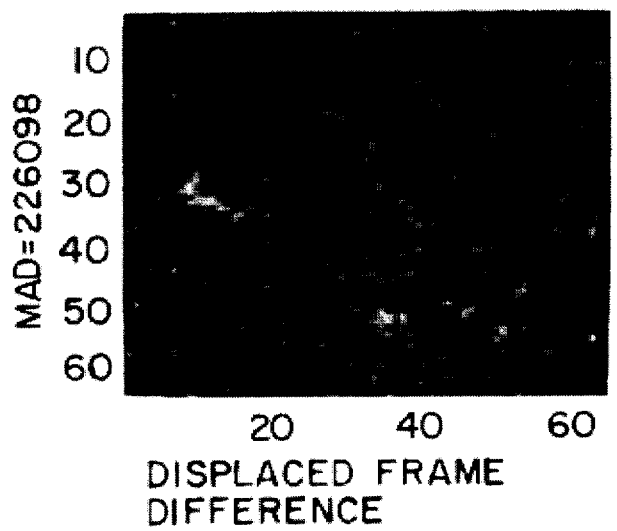
Figure 11N:
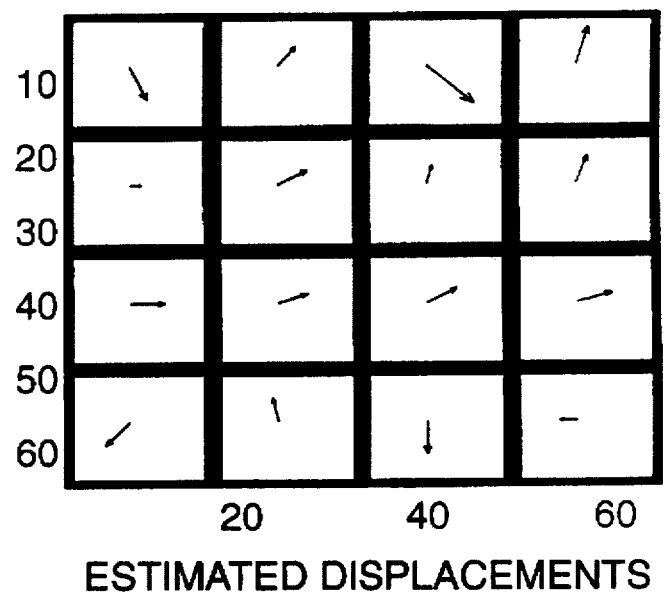
Figure 11P:
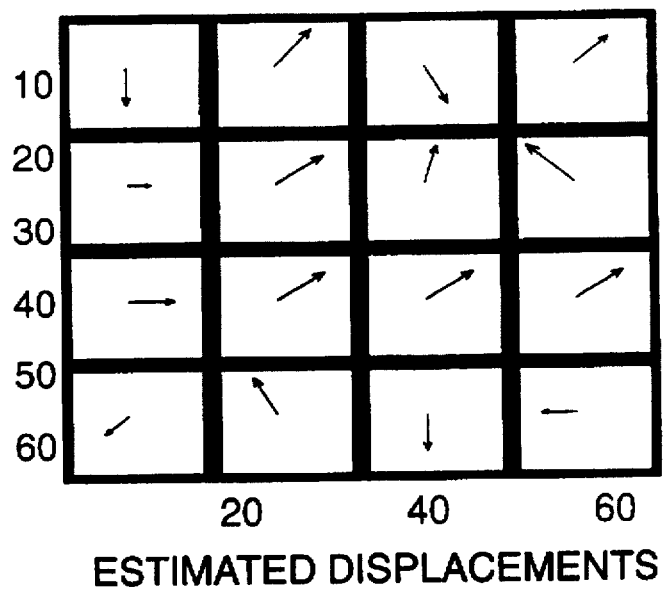

Above, it was mentioned that peaks of DSC and DCS are searched over a fixed index range of interest $\Phi=\{0, \ldots, N/2\}^2$. However, if we follow the partitioning approach used in BMA-ME, then we may dynamically adjust $\Phi$. At first, partition the whole current frame into bs×bs nonoverlapping reference blocks shown as the shaded area in FIG. 10a. Each reference block is associated with a larger search area (of size sa) in the previous frame (the dotted region in the same figure) in the same way as for BMA-ME. From the position of a reference block and its associated search area, a search range $D=\{(u, v):-u_1 \leq u \leq u_2, -v_1 \leq v \leq v_2\}$ may then be determined as in FIG. 10b. Differing from BMA-ME, DXT-ME requires that the reference block size and the search area size must be equal. Thus, instead of using the reference block, we use the block of the same size and position in the current frame as the search area of the previous frame. The peak values of DSC and DCS are searched in a zigzag way as described in Section III over this index range $\Phi=\{0, \ldots, \max(u_2, u_1-1)\} \times \{0, \ldots, \max(v_2, v_1-1)\}$. In addition to the requirement that the new peak value must be larger than the current peak value by a preset threshold, it is necessary to examine if the motion estimate determined by the new peak index lies in the search region D. Since search areas overlap on one another, the SE-DXT-ME architecture utilizing this approach is called Overlapping SE-DXT-ME.

Simulations have been performed on a number of video sequences with different characteristics. The performance of the DXT-ME scheme is evaluated in terms of MSE (mean squared error per pel) defined as $$MSE = \frac{\Sigma_{m,n}[\vec{r}(m,n) - x(m,n)]^2}{N^2},$$

and compared with that of the full search block matching method (BMA-ME), which minimizes the MSE function over the whole search area:

$$\hat{d} = (\hat{u},\hat{v}) = \arg\min_{u,v} \frac{\Sigma_{m,n}[x_2(m,n) - x_1(m-u,n-v)]^2}{N^2}.$$

The MSE values of two consecutive frames without motion compensation (DIF) are also computed for comparison. The MSE value of DXT-ME is expected to be upper bounded by the MSE value without motion compensation.

To test the performance of DXT-ME on noisy images, an image of a small car (SCAR.1) is manually shifted to produce the second frame (SCAR.2) with a known displacement and additive Gaussian noise is added to attain a desired signal-to-ratio (SNR) level. Since the object (small car) moves within the boundary of the frame in a completely darkened background, no preprocessing is required. As may be seen in FIGS. 11a to 11d and 11i to 11l, DXT-ME is performed on the whole image of block size 64×64 and estimates the motion correctly at SNR level even down to 0 dB, whereas BMA-ME as shown in FIGS. 11e to 11h and 11m to 11p, produces some wrong motion estimates for boundary blocks and blocks of low signal energy. The values of MAD also indicate better overall performance of DXT-ME over BMA-ME for this sequence. Furthermore, DXT-ME may perform on the whole frame while BMA-ME needs division of the frame into sub-blocks due to the requirement of larger search areas than reference blocks. This is one of the reasons that BMA-ME does not work as well as DXT-ME because smaller block size makes BMA-ME more susceptible to noise and operation of DXT-ME on the whole frame instead of on smaller blocks lends itself to better noise immunity. Even though the Culmen filtering approach 30 may also estimate velocity accurately for a sequence of noisy images, it requires iterative complicated computations while DXT-ME may estimate motion based upon two consecutive frames in one step, requiring low-complexity computations.

The first sequence is the "Flower Garden" (FG) sequence where the camera is moving before a big tree and a flower garden in front of a house. Each frame has 720×486 pixels. Simple preprocessing is applied to this sequence: edge extraction on frame differentiation. Simulation of SE-DXT-ME of block size 8, 16, 32 as well as 64, was performed on 100 frames of this sequence. The results were compared with those of BMA-ME of block sizes 8, 16, 32 with the search area being twice as large as the block as shown in FIGS. 13a and 13b.

Figure 12A:
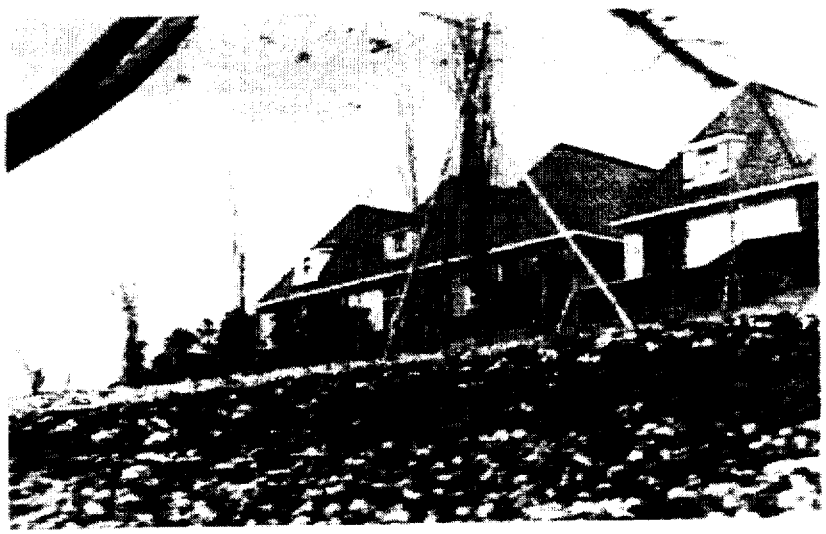
FIGS. 12a, 12b, and 12c are graphs of the original, the edge extracted and the frame differentiated images of Frame 57 in the sequence "Flower Garden"
Figure 12B:
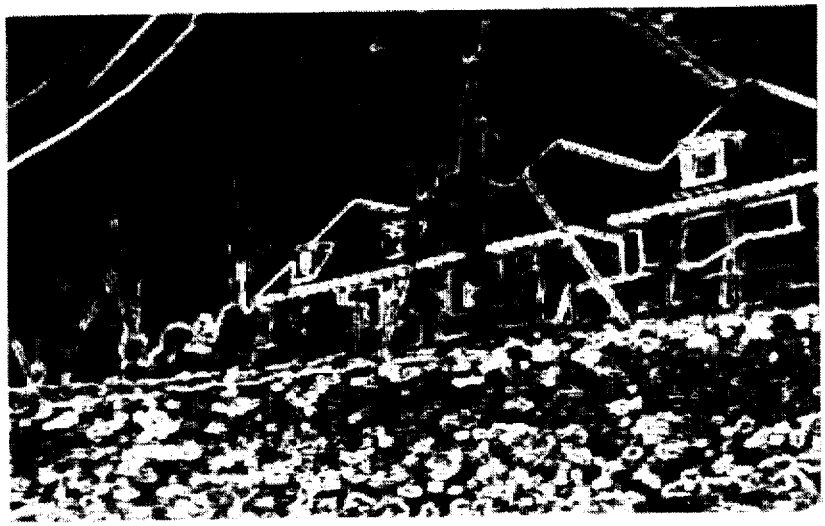
Figure 12C:
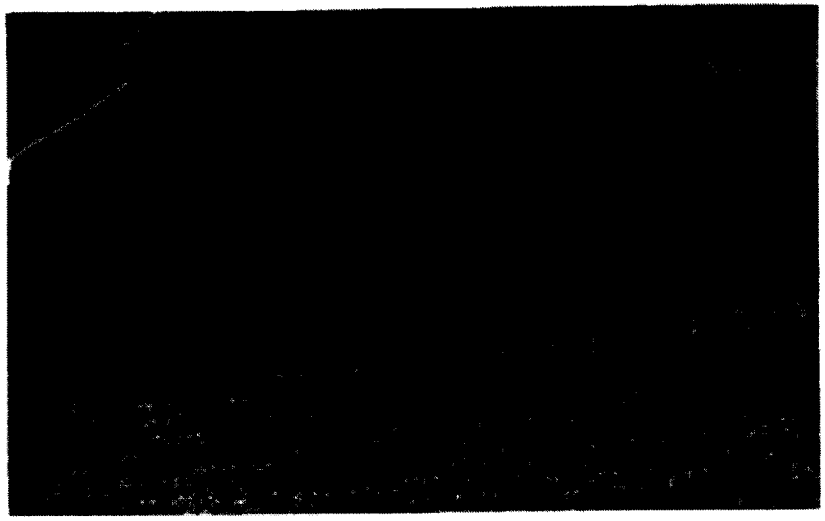

As may be seen in FIG. 12b, the edge extracted frames contain significant features of moving objects in the original frames so that DXT-ME may estimate the movement of objects based upon the information provided by the edge extracted frames. Because the camera is moving at a constant speed in a one direction, the moving objects occupy almost the whole scene. Therefore, the background features do not interfere with the operation of DXT-ME. The frame differentiated images of the "Flower Garden" sequence, one of which is shown in FIG. 12c, have the residual energy strong enough for DXT-ME to estimate the motion directly on this frame differentiated sequence due to the constant movement of the camera.

Figure 13A:
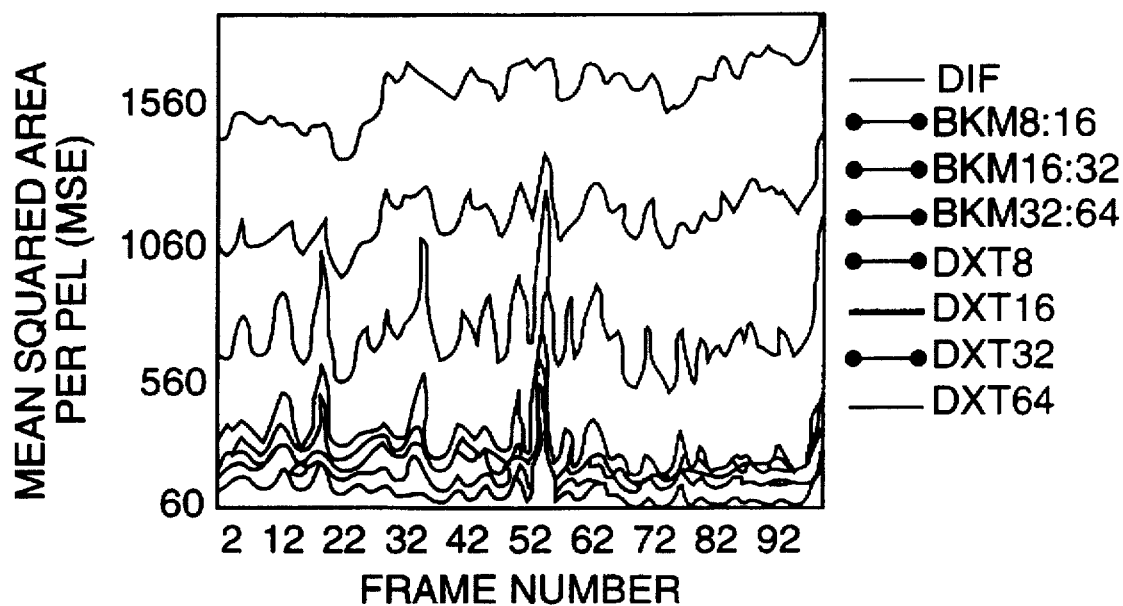
FIGS. 13a and 13b are comparisons of SE-DXT-ME with BMA-ME on the sequence "Flower Garden" for different block sizes and preprocessing functions.
Figure 13B:
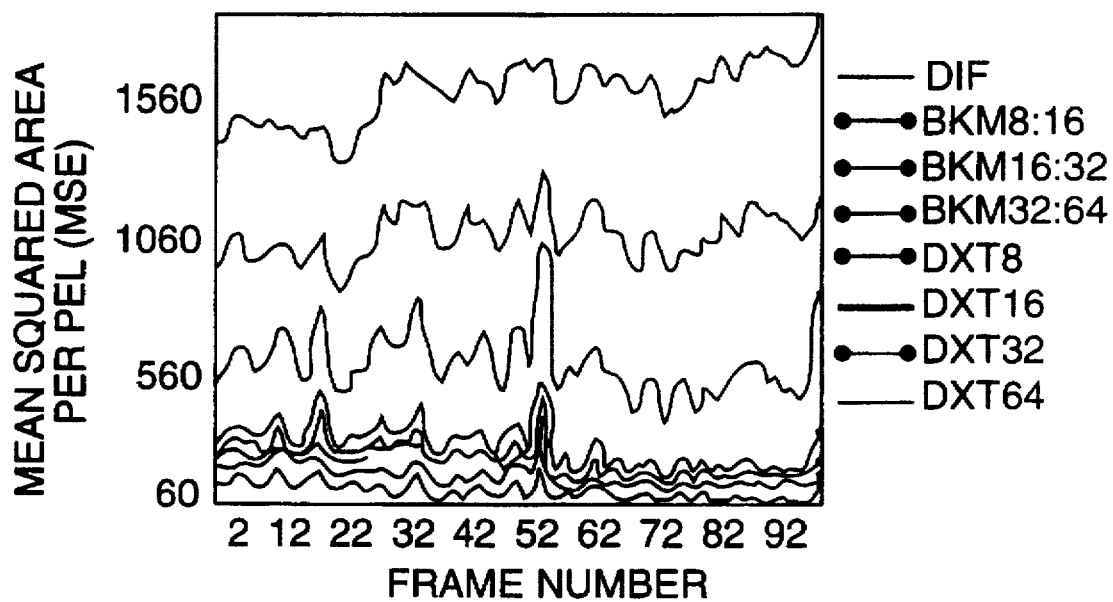

Observable in FIGS. 13a and 13b, a large reference block hampers the performance of BMA-ME indicated by high MSE values whereas increasing block size may boost up the performance of DXT-ME with smaller MSE values. The reason is that a block of larger size for DXT-ME contains more features of objects, which enables DXT-ME to find a better estimate due to its feature matching property, and also a block of larger size means a larger search area because the size of a search area is the same as the block size for DXT-ME. As a matter of fact, BMA-ME is supposed to perform better than DXT-ME if both methods use the same block size because BMA-ME requires a larger search area and thus BMA-ME has more information available before processing than DXT-ME. Therefore, it is not faire to compare BMA-ME with DXT for the same block size. Instead, it is more reasonable to compare BMA-ME with DXT-ME of the block size equal to the size of the search area of BMA-ME. As shown in FIGS. 13a and 13b, the MSE values for DXT-ME of block size 32 (DXT32) preprocessed by either edge extraction or frame differentiation are comparable with or even better than those for BMA-ME of block size 32 and search size 64.

Figure 14A:
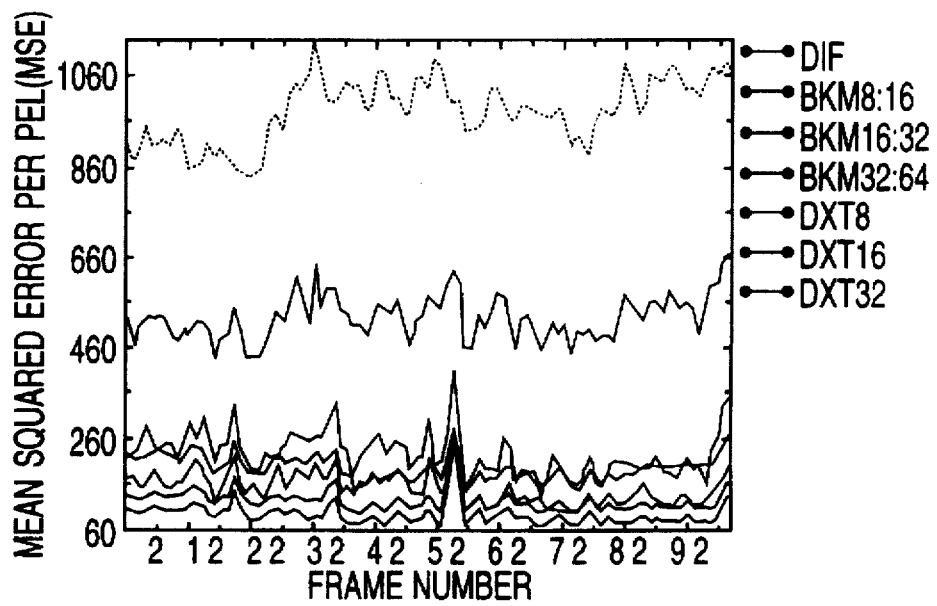
FIGS. 14a to 14d are comparisons of SE-DXT-ME and Overlapping SE-DXT-ME with BMA-ME, respectibely, on the small "Flower Garden" for different block sizes and preprocessing functions.
Figure 14B:
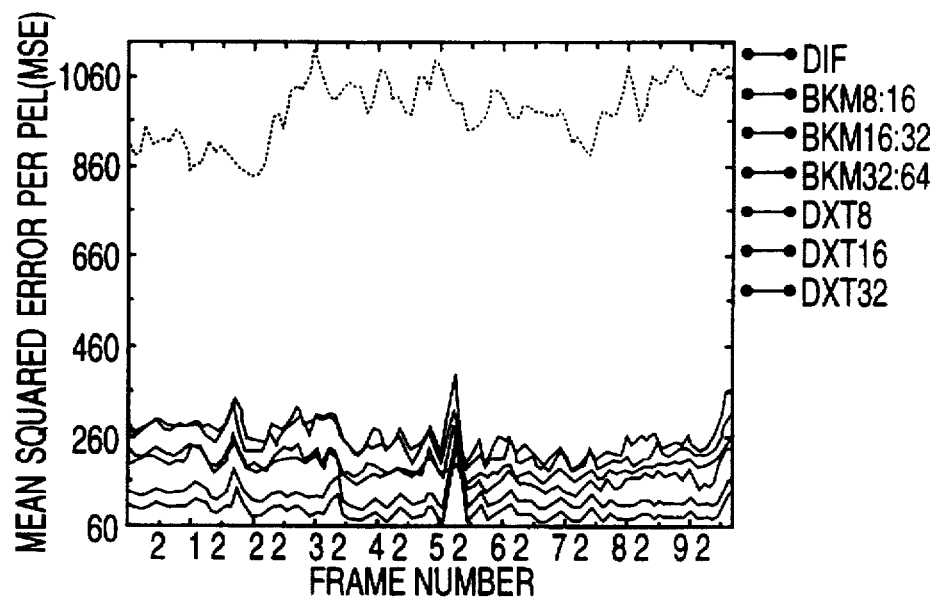
Figure 14C:
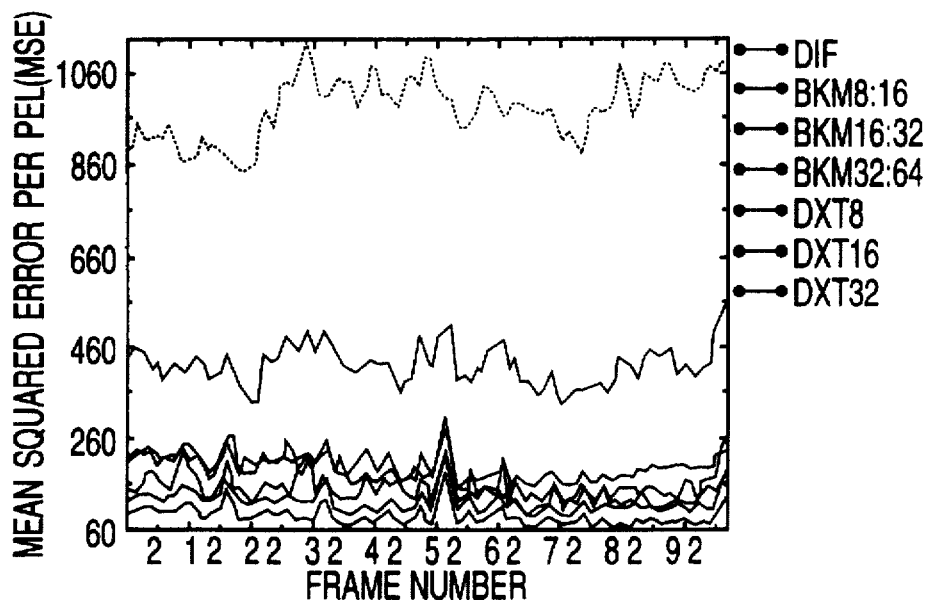
Figure 14D:
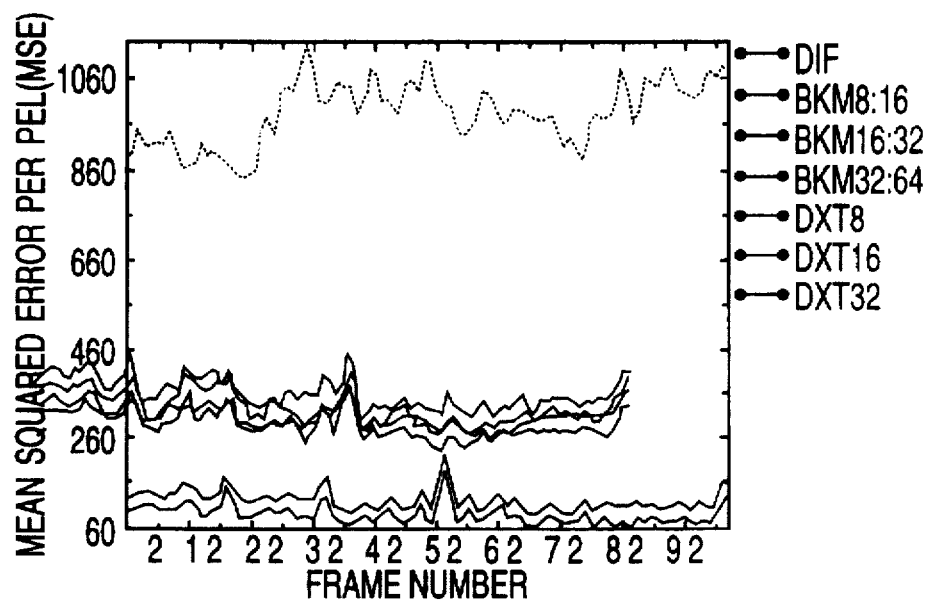

If the sequence is shrunk to half size (352×224 pixels) and forms the small "Flower Garden" sequence, then each block will capture more features than a block of the same size in the original "Flower Garden" sequence. The simulation results are plotted in FIGS. 14a and 14c for SE-DXT-ME, and in FIGS. 14b and 14d for Overlapping SE-DXT-ME discussed in Section IV. As expected, the MSE values for SE-DXT-ME of block size 16 now become as small as those for BMA-ME of block size 32 as shown. Some points of the curve for SE-DXT-ME of block size 32 (DXT32) with either preprocessing step are below the points of BMA-ME of search size 32 (BKM16:32). If the overlapping approach is adopted in determining the search region, the results suggest that both Overlapping SE-DXT-ME and BMA-ME have comparable performance for either preprocessing method. The fact that smaller frame size of the contents improves the performance of DXT-ME in terms of smaller MSE values recommends the hierarchical motion estimation technique combined with DXT-ME (SE-DXT-ME or Overlapping SE-DXT-ME).

Figure 15A:
FIGS. 15a, 15b, and 15c are comparisons of the original, the edge-extracted and the frame-differentiated imaegs in the sequence "Infrared Car"
Figure 15B:
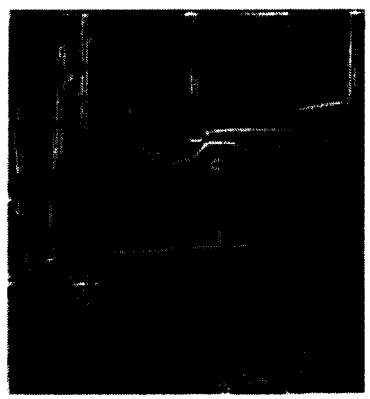
Figure 15C:
Figure 16A:
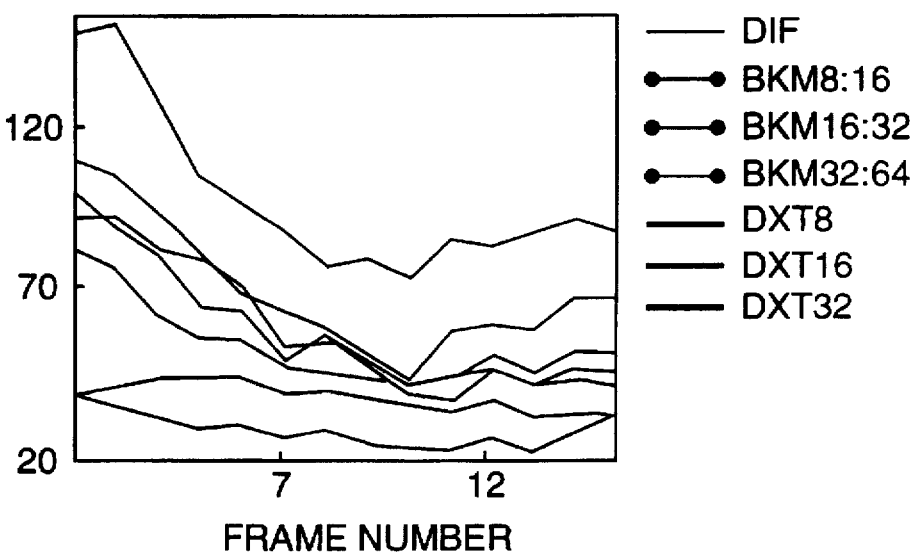
FIGS. 16a to 16d are comparisons of SE-DXT-ME and Overlapping SE-DXT-ME with BMA-ME, respectively, on the sequence "Infrared Car" for different block sizes and preprocessing functions.
Figure 16B:
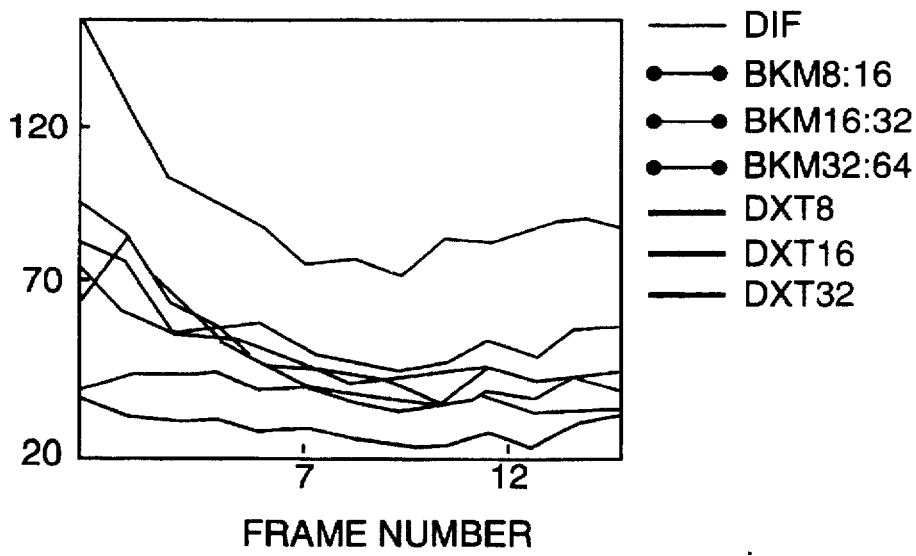
Figure 16C:
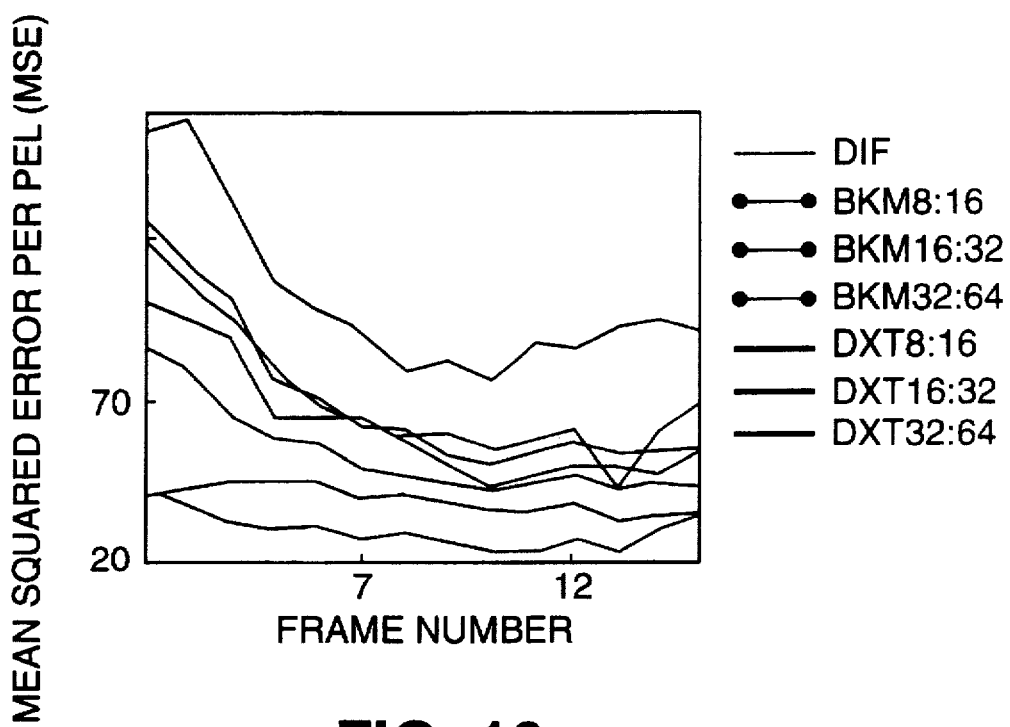
Figure 16D:
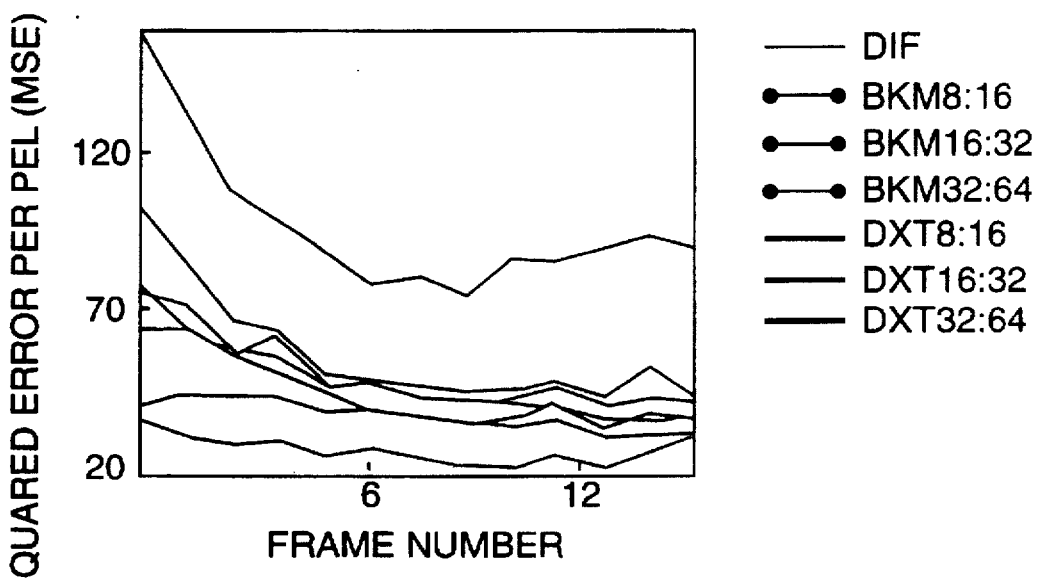

Another simulation is done on the "Infrared Car" sequence which has the frame size 192×224 and one obvious moving object, the car moving along the curved road towards the camera fixed on the ground. In FIG. 15b, the feature of both the car and the background are captured in the edge extracted frames. Even though the background features are not desirable, the simulation for SE-DXT-ME of various block sizes shows that the estimates of SE-DXT-ME produce low MSE values compared to the result of BMA-ME, especially in certain frames such as the 6th to 13th frames shown in FIG. 16a. This may be explained by taking a closer look at the edge extracted frame in FIG. 15b where the background features, such as the trees and poles, are far away from the car, especially in the 6th to 13th frames. For the first few frames, the features of the roadside behind the car mix with the features of the car and affect the performance of DXT-ME but then the car moves away from the roadside towards the camera so that the car features are isolated from the background features and so DXT-ME may estimate motion more accurately. As to the frame differentiated images as shown in FIG. 15c, the residual energy of the moving car is completely separated from the rest of the scene in most of the preprocessed frames and, therefore, lower MSE values are obtained with this preprocessing function than with edge extraction. As may be seen in FIGS. 16a and 16c, the MSE value of SE-DXT-ME of block size 32 at Frame 9 is smaller than that of BMA-ME of search area 32. In other words, SE-DXT-ME is better than BMA-ME in this particular case. However, the results of Overlapping SE-DXT-ME in FIGS. 16b and 16d show little improvement over SE-DXT-ME with fixed $\Phi = \{0, \ldots, N/2\}^2$, in contrary to the large gain in the performance of Overlapping SE-DXT-ME over SE-DXT-ME on the small "Flower Garden" sequence.

Figure 17A:
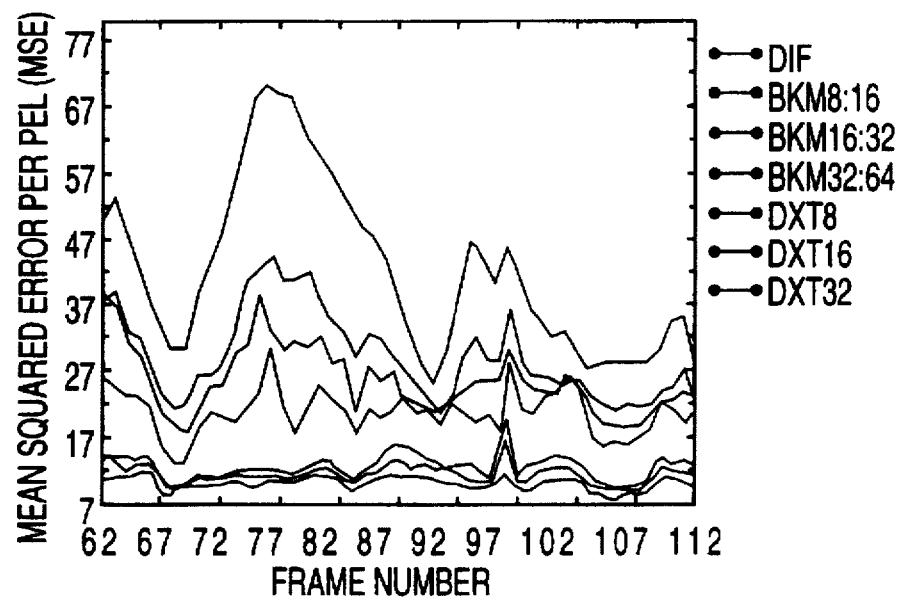
FIGS. 17a to 17d are comparisons of SE-DXT-ME and Overlapping SE-DXT-ME with BMA-ME, respectively, of the sequence "Miss America" for different block sizes and preprocessing functions.
Figure 17B:
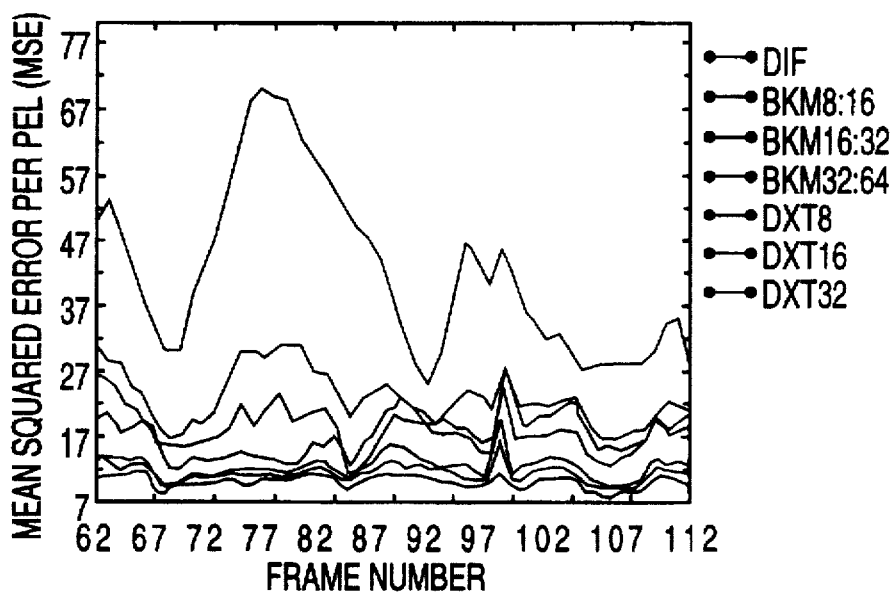
Figure 17C:
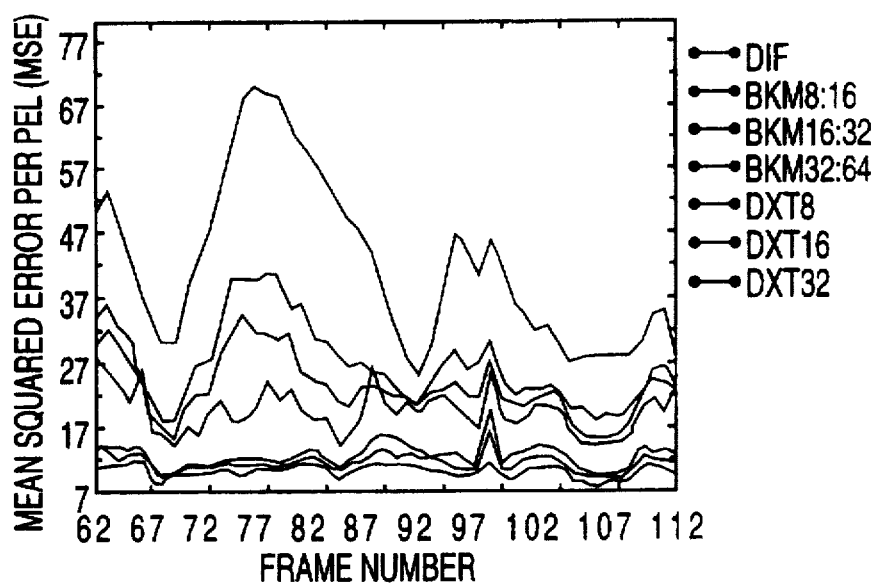
Figure 17D:
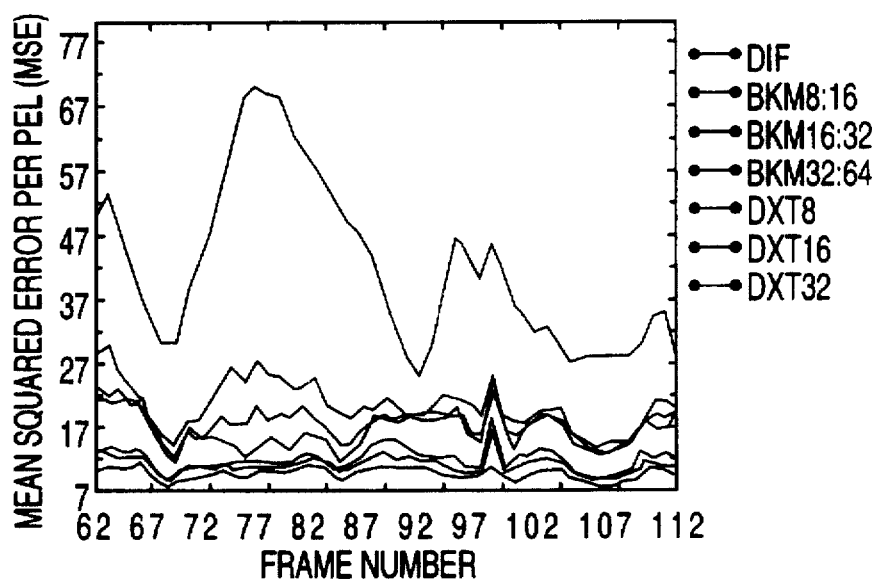

Simulation is also performed on the "Miss America" sequence, in which a lady is talking to the camera. Each frame has 352×288 pixels. This sequence has only translational motion of the head and shoulders, but mainly the mouth and eyes open and close. This makes the task of motion estimation difficult for this sequence but the DXT-ME method may still perform reasonably well compared to the BMA-ME method, as may be found in FIGS. 17a and 17c. Especially for the Overlapping SE-DXT-ME method with block size 32, the MSE values are very close to those of BMA-ME of different block size as shown in FIGS. 17b and 17d.

Figure 18A:
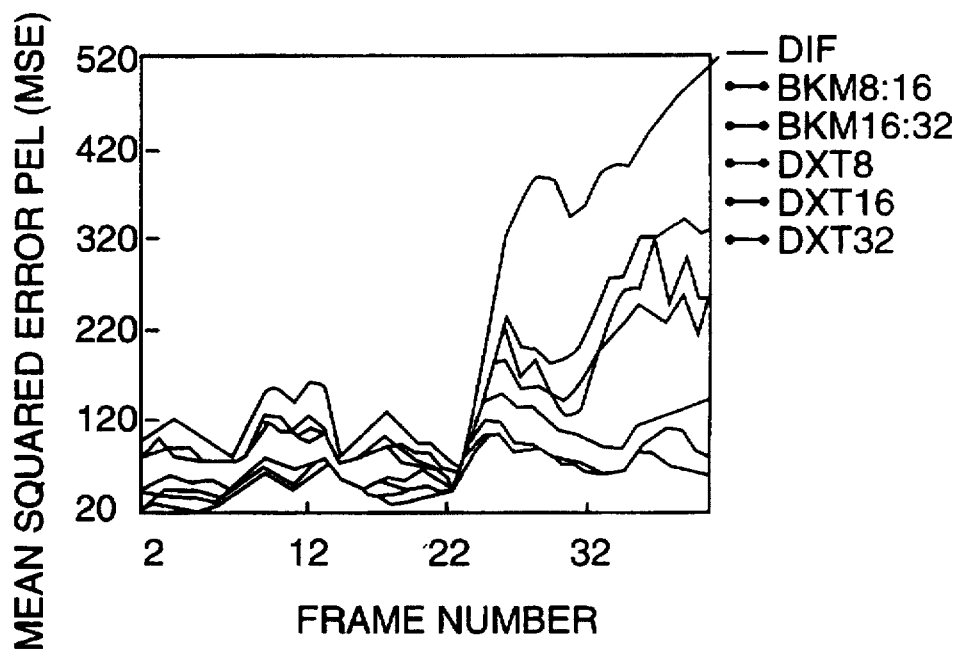
FIGS. 18a and 18b are comparisons of SE-DXT-ME and Overlapping SE-DXT-ME with BMA-ME, respectively, on the sequence "Table Tennis" for different block sizes and preprocessing functions.
Figure 18B:
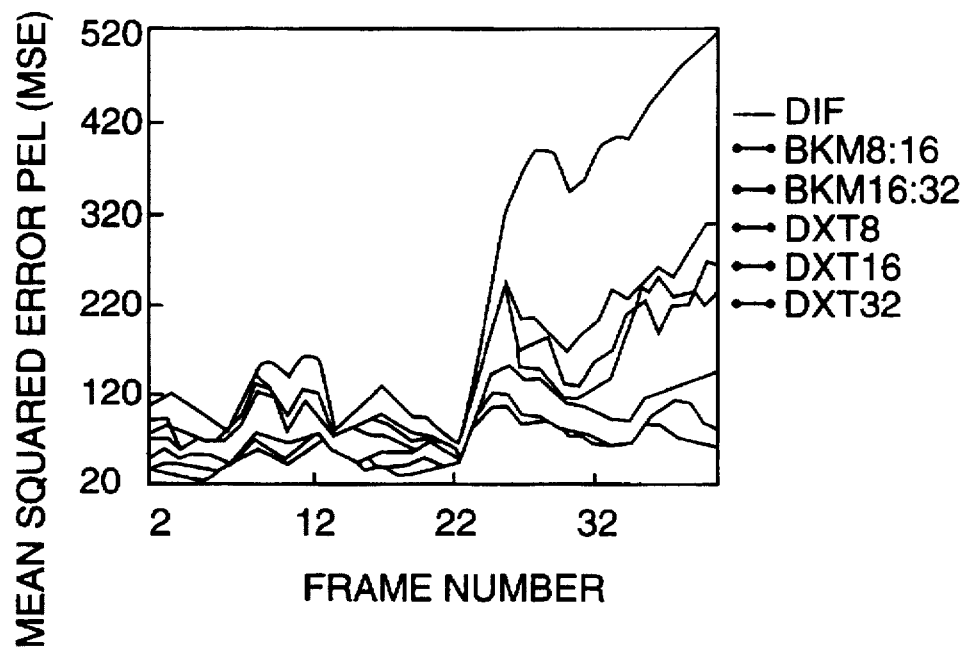

The last sequence is the small "Table Tennis" which has the frame size 352×224 pixels. In this sequence, the first twenty-three frames contain solely a bouncing ball with rough texture of the wall behind. Thus, the edge extracted frames capture a lot of background features mixed with the ball features. This influences negatively the estimation of DXT-ME. However, the frame differentiated images have no such background features and, as a result, Overlapping SE-DXT-ME of block size 32 (DXT32:64) with frame differences as input performs much better than Overlapping SE-DXT-ME after edge extraction (see FIG. 18b) even though the ball is not moving in a constant speed and its residual energy after frame subtraction is weak. After the 23rd frame, the camera is zooming out quickly, making no method predict well. Then the zooming action slows down. In this situation, the MSE values of SE-DXT-ME go down suddenly to as low as those of BMA-ME as shown in FIGS. 18a and 18b.

To further improve the coder gain, motion estimation with subpixel accuracy is essential because movements in a video sequence are not necessarily multiples of the sampling grid distance. Most currently existing subpixel motion estimation schemes estimate displacements from interpolated images. However, interpolation not only increases the complexity and data flow of a coder but also may adversely affect the accuracy of motion estimates from interpolated images. It is more desirable that subpixel accuracy of motion estimates can be obtained without interpolating the images. Based on the sinusoidal orthogonal principles at the subpixel level, it is possible to estimate subpixel motion without interpolation to a low computational cost in the DCT domain. Studies of pseudo phases and the sinusoidal orthogonal principles at the subpixel level enable us to provide half-pel or even quarter-pel DCT-based motion estimation schemes with minor modification of the algorithm proposed here.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method for estimating the translational motion of an object, the method comprising the steps of:

computing DCT-I and DST-I coefficients, $Z_1^C$ and $Z_1^S$ respectively, of a first signal $x_1(n)$ and the DCT-II and DST-II coefficients, $X_2^c$ and $Y_2^s$ respectively, of a second signal $_2x(n)$ displaced from the first signal;

computing the pseudo phase $\hat{g}_m^s(k)$ for $k=1, \ldots, N$ by solving this equation:

$$\hat{g}_m^s(k) = \begin{cases} \dfrac{Z_1^C(k) \cdot X_2^S(k) - Z_1^S(k) \cdot X_2^C(k)}{\{Z_1^C(k)\}^2 + \{Z_1^S(k)\}^2} & \text{for } k \neq N, \\ \dfrac{1}{\sqrt{2}} & \text{for } k = N \end{cases}$$

feeding the computed pseudo phase, $\{\hat{g}_m^s(k); k=1, \ldots, N\}$, into an IDST-II decoder to produce an output $\{d(n); n=0, \ldots, N-1\}$, searching for the peak value of the output of the decoder; and estimating the displacement $\hat{m}$ of the object by substituting the peak position into:

$$m = \begin{cases} I_p = i_{DCS}, \text{ if } d(i_p) > 0, \\ -(i_p + 1), \text{ if } d(i) < 0, \end{cases}$$

where $i_p = \arg \max_n |d(n)|$ is the index at which the peak value is located.

2. A method for estimating the translational motion of an object, the method comprising the steps of:

providing a previous image frame $x_{t-1}$ and a current image frame $x_t$ information into 2D-DCT-II and 2D-DCT-1 coders respectively;

computing four coefficient, DCCTII, DCSTII, DSCTII and DSSTII, each of which is defined as a two dimensional separable function formed by 1D–DCT/DST-II kernals:

$$DCCTII(x_t) = X_t^{CC}(k,l) =$$

$$\frac{4}{N^2} C(k)C(l) \sum_{m,n=0}^{N-1} x_t(m,n)\cos\left(\frac{k\pi}{N}(m+0.5)\right)\cos\left(\frac{l\pi}{N}(n+0.5)\right),$$

$$k,l \in \{0, \ldots, N-1\},$$

$$DCSTII(x_t) = X_t^{CS}(k,l) =$$

$$\frac{4}{n^2} C(k)C(l) \sum_{m,n=0}^{N-1} x_t(m,n)\cos\left(\frac{k\pi}{N}(m+0.5)\right)\sin\left(\frac{l\pi}{N}(n+0.5)\right),$$

$$k \in \{0, \ldots, N-1\}, l \in \{1, \ldots, N\},$$

$$DSCTII(x_t) = X_t^{SC}(k,l) =$$

$$\frac{4}{N^2} C(k)C(l) \sum_{m,n=0}^{N-1} x_t(m,n)\sin\left(\frac{k\pi}{N}(m+0.5)\right)\cos\left(\frac{l\pi}{N}(n+0.5)\right),$$

$$k \in \{1, \ldots, N\}, l \in \{0, \ldots, N-1\},$$

$$DSSTII(x_t) = X_t^{SS}(k,l) =$$

$$\frac{4}{N^2} C(k)C(l) \sum_{m,n=0}^{N-1} x_t(m,n)\sin\left(\frac{k\pi}{N}(m+0.5)\right)\sin\left(\frac{l\pi}{N}(n+0.5)\right),$$

$$k,l \in \{1, \ldots, N\}$$

computing four coefficients, DCCTI, DCSTI, DSCTI, DSSTI, the two-dimensional DCT coefficients of the first kind (2D-DCT-I) are calculated based on 1D-DCT/DST-I kernals:

$$DCCTI(x_{t-1}) = Z_{t-1}^{CC}(k,l) =$$

$$\frac{4}{N^2} C(k)C(l) \sum_{m,n=0}^{N-1} x_{t-1}(m,n)\cos\left(\frac{k\pi}{N}(m)\right)\cos\left(\frac{l\pi}{N}(n)\right),$$

$$k,l \in \{0, \ldots, N\},$$

$$DCSTI(x_{t-1}) = Z_{t-1}^{CS}(k,l) =$$

$$\frac{4}{n^2} C(l)C(k) \sum_{m,n=0}^{N-1} X_{t-1}(m,n)\cos\left(\frac{k\pi}{N}(m)\right)\sin\left(\frac{l\pi}{N}(n)\right),$$

$$k \in \{0, \ldots, N\}, l \in \{1, \ldots, N-1\},$$

$$DSCTI(x_{t-1}) = Z_{t-1}^{SC}(k,l) =$$

$$\frac{4}{N^2} C(k)C(l) \sum_{m,n=0}^{N-1} x_{t-1}(m,n)\sin\left(\frac{k\pi}{N}(m)\right)\cos\left(\frac{l\pi}{N}(n)\right),$$

$$k \in \{1, \ldots, N-1\}, l \in \{0, \ldots, N\},$$

$$DSSTI(x_{t-1}) = Z_{t-1}^{SS}(k,l) =$$

$$\frac{4}{N^2} C(k)C(l) \sum_{m,n=0}^{N-1} x_{t-1}(m,n)\sin\left(\frac{k\pi}{N}(m)\right)\sin\left(\frac{l\pi}{N}(n)\right),$$

$$k,l \in \{1, \ldots, N-1\}$$

determining the respective pseudo phase functions from the following equations:

$$f_{m_1 n_1}(k,l) = \begin{cases} \hat{g}_{m_1 n_1}^{CS}(k,l), & \text{for } k,l \in \{1, \ldots, N-1\}, \\ \frac{1}{\sqrt{2}} \frac{Z_{t-1}^{CC}(k,l)X_t^{CS}(k,l) - Z_{t-1}^{CS}(k,l)X_t^{CC}(k,l)}{(Z_{t-1}^{CC}(k,l))^2 + (Z_{t-1}^{SC}(k,l))^2}, & \text{for } k=0, l \in \{1, \ldots, N-1\}, \\ \frac{1}{\sqrt{2}} \frac{Z_{t-1}^{CC}(k,l)X_t^{CS}(k,l) + Z_{t-1}^{CS}(k,l)X_t^{SS}(k,l)}{(Z_{t-1}^{CC}(k,l))^2 + (Z_{t-1}^{SC}(k,l))^2}, & \text{for } k=N, l \in \{1, \ldots, N-1\}, \\ \frac{1}{2} \frac{X_t^{CS}(k,l)}{Z_{t-1}^{CC}(k,l)}, & \text{for } k=0, l=N, \text{ and } Z_{t-1}^{CC}(k,l) \neq 0, \\ \frac{1}{2}, & \text{for } k=0, l=N \text{ and } Z_{t-1}^{CC}(k,l) = 0 \end{cases}$$

$$g_{m_1 n_1}(k,l) = \begin{cases} \hat{g}^{SC}_{m_1 n_1}(k,l), & \text{for } k,l \in \{1,\ldots,N-1\}, \\ \dfrac{1}{\sqrt{2}} \dfrac{Z^{CC}_{r-1}(k,l)X^{CS}_r(k,l) - Z^{SS}_{r-1}(k,l)X^{CC}_r(k,l)}{(Z^{CC}_{r-1}(k,l))^2 + (Z^{CS}_{r-1}(k,l))^2}, & \text{for } l=0, k \in \{1,\ldots,N-1\}, \\ \dfrac{1}{\sqrt{2}} \dfrac{Z^{CC}_{r-1}(k,l)X^{SC}_r(k,l) + Z^{CS}_{r-1}(k,l)X^{SS}_r(k,l)}{(Z^{CC}_{r-1}(k,l))^2 + (Z^{SC}_{r-1}(k,l))^2}, & \text{for } k=N, l \in \{1,\ldots,N-1\}, \\ \dfrac{1}{2} \dfrac{X^{SC}_r(k,l)}{Z^{CC}_{r-1}(k,l)}, & \text{for } k=N, l=0, \text{ and } Z^{CC}_{r-1}(k,l) \neq 0, \\ \dfrac{1}{2}, & \text{for } k=N, l=0, \text{ and } Z^{CC}_{r-1}(k,l) = 0 \end{cases}$$

passing these two pseudo phase functions through 2D-IDCT-II coders (IDCSTII and IDSCTII) to generate two functions, DCS(•,•) and DSC(•,•):

$$\begin{aligned}
DCS(m,n) &= IDCSTII(f_{m_1 n_1}) \\
&= \frac{4}{N^2} \sum_{k=0}^{N-1} \sum_{l=1}^{N} C(k)C(l) f_{m_1 n_1}(k,l) \cos\frac{k\pi}{N}\left(m + \frac{1}{2}\right) \sin\frac{l\pi}{N}\left(n + \frac{1}{2}\right) \\
&= (\delta(m-m_1) + \delta(m+m_1+1)) \cdot \\
&\quad (\delta(n-n_1) - \delta(n+n_1+1)) \\
DSC(m,n) &= IDSCTII(g_{m_1 n_1}) \\
&= \frac{4}{N^2} \sum_{k=1}^{N} \sum_{l=0}^{N-1} C(k)C(l) g_{m_1 n_1}(k,l) \sin\frac{k\pi}{N}\left(m + \frac{1}{2}\right) \cos\frac{l\pi}{N}\left(n + \frac{1}{2}\right) \\
&= (\delta(m-m_1) - \delta(m+m_1+1)) \cdot \\
&\quad (\delta(n-n_1) + \delta(n+n_1+1))
\end{aligned}$$

searching for the peak values in the generated functions; and estimating the displacement of an object in the image by substituting the peak positions into:

$$\hat{m}_1 = \begin{cases} i_{DSC} = i_{DCS}, & \text{if } DCS(i_{DSC}, j_{DSC}) > 0, \\ -(i_{DSC}+1) = -(i_{DCS}+1), & \text{if } DCS(i_{DCS}, j_{DCS}) < 0, \end{cases}$$

$$\hat{n}_1 = \begin{cases} j_{DCS} = j_{DSC}, & \text{if } DCS(i_{DCS}, j_{DCS}) > 0 \\ -(j_{DCS}+1) = -(j_{DSC}+1), & \text{if } DCS(i_{DCS}, j_{DCS}) < 0, \end{cases}$$

where $$(i_{DCS}, j_{DCS}) = \arg \max_{m,n \in \Phi} |DCS(m,n)|$$

$$(i_{DSC}, j_{DSC}) = \arg \max_{m,n \in \Phi} |DSC(m,n)|.$$

\* \* \* \* \*